(12) United States Patent
Aoi et al.

(10) Patent No.: US 12,489,974 B2
(45) Date of Patent: Dec. 2, 2025

(54) IMAGING APPARATUS, IMAGING METHOD, AND PROGRAM

(71) Applicant: FUJIFILM Corporation, Tokyo (JP)

(72) Inventors: Toshihiro Aoi, Saitama (JP); Masahiko Sugimoto, Saitama (JP); Shinichi Shimotsu, Saitama (JP); Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 198 days.

(21) Appl. No.: 18/165,931

(22) Filed: Feb. 8, 2023

(65) Prior Publication Data

US 2023/0185214 A1    Jun. 15, 2023

Related U.S. Application Data

(63) Continuation of application No. PCT/JP2021/026153, filed on Jul. 12, 2021.

(30) Foreign Application Priority Data

Aug. 20, 2020    (JP) ................... 2020-139633

(51) Int. Cl.
    *H04N 23/67*    (2023.01)
    *H04N 23/10*    (2023.01)
    *H04N 23/11*    (2023.01)

(52) U.S. Cl.
    CPC ........... *H04N 23/673* (2023.01); *H04N 23/11* (2023.01); *H04N 23/125* (2023.01)

(58) Field of Classification Search
    USPC ....................................................... 348/164
    See application file for complete search history.

(56) References Cited

U.S. PATENT DOCUMENTS

| 7,215,885 B2 * | 5/2007 | Yamane ............. G02B 27/1073 385/47 |
| 9,689,669 B2 | 6/2017 | Ross, Jr. et al. |
| 10,732,390 B2 * | 8/2020 | Bone .................... G02B 13/008 |
| 11,022,549 B2 * | 6/2021 | Kohda .................. G01M 11/00 |
| 11,108,968 B2 | 8/2021 | Numata |

(Continued)

FOREIGN PATENT DOCUMENTS

| JP | 2002148511 A * | 5/2002 | ............... G02B 7/28 |
| JP | 2003338982 | 11/2003 | |

(Continued)

OTHER PUBLICATIONS

Office Action of Japan Counterpart Application, with English translation thereof, issued on Jan. 9, 2024, pp. 1-8.

(Continued)

*Primary Examiner* — Helen Shibru
(74) *Attorney, Agent, or Firm* — JCIPRNET

(57) ABSTRACT

An imaging apparatus includes an optical element that extracts a plurality of pieces of band light from incident light incident on an optical system, a photoelectric conversion device capable of imaging the plurality of pieces of band light extracted from the incident light by the optical element, and a processor that outputs image data obtained by imaging band light, among the plurality of pieces of band light, selected according to an imaging condition determined based on a field of view by the photoelectric conversion device.

16 Claims, 30 Drawing Sheets

(56) References Cited

U.S. PATENT DOCUMENTS

| | | | | |
|---|---|---|---|---|
| 12,111,560 | B2* | 10/2024 | Shimotsu | .............. H04N 23/11 |
| 2004/0239785 | A1 | 12/2004 | Nanjo et al. | |
| 2005/0104990 | A1* | 5/2005 | Kokuwa | ................ H04N 23/55 |
| | | | | 348/337 |
| 2008/0012963 | A1* | 1/2008 | Nanjo | .................. G02B 15/173 |
| | | | | 348/240.99 |
| 2008/0080019 | A1* | 4/2008 | Hayashi | ............. G02B 27/0075 |
| | | | | 348/E5.079 |
| 2018/0224333 | A1 | 8/2018 | Sakakibara et al. | |
| 2020/0117073 | A1 | 4/2020 | Nakamura et al. | |
| 2020/0228762 | A1* | 7/2020 | Jeong | .................... H04N 7/181 |
| 2021/0208476 | A1* | 7/2021 | Shimotsu | ............... G02B 5/285 |
| 2023/0185214 | A1* | 6/2023 | Aoi | ...................... H04N 23/125 |
| | | | | 399/38 |
| 2025/0133276 | A1* | 4/2025 | Shimotsu | ............. G01J 5/0865 |

FOREIGN PATENT DOCUMENTS

| | | |
|---|---|---|
| JP | 2005165298 | 6/2005 |
| JP | 2015210124 | 11/2015 |
| JP | 2017112433 | 6/2017 |
| JP | 2017112433 A * 6/2017 | .............. G02B 7/28 |
| JP | 2017156464 | 9/2017 |
| JP | 2017156464 A * 9/2017 | ............. H04N 5/232 |
| JP | 2018518859 | 7/2018 |
| JP | 2019159107 | 9/2019 |
| JP | 2019211234 | 12/2019 |
| JP | 2020509661 | 3/2020 |
| JP | 2020064164 | 4/2020 |
| JP | 2020091328 | 6/2020 |
| WO | 2017061432 | 4/2017 |
| WO | 2020095513 | 5/2020 |

OTHER PUBLICATIONS

"International Search Report (Form PCT/ISA/210) of PCT/JP2021/026153", mailed on Sep. 21, 2021, with English translation thereof, pp. 1-7.

"Written Opinion of the International Searching Authority (Form PCT/ISA/237) of PCT/JP2021/026153," mailed on Sep. 21, 2021, with English translation thereof, pp. 1-8.

* cited by examiner

FIG. 6A
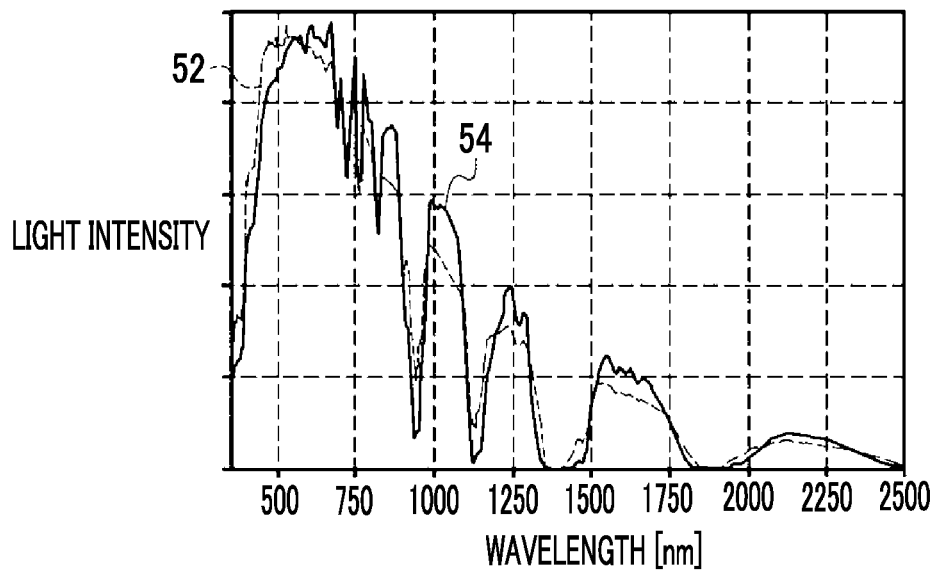
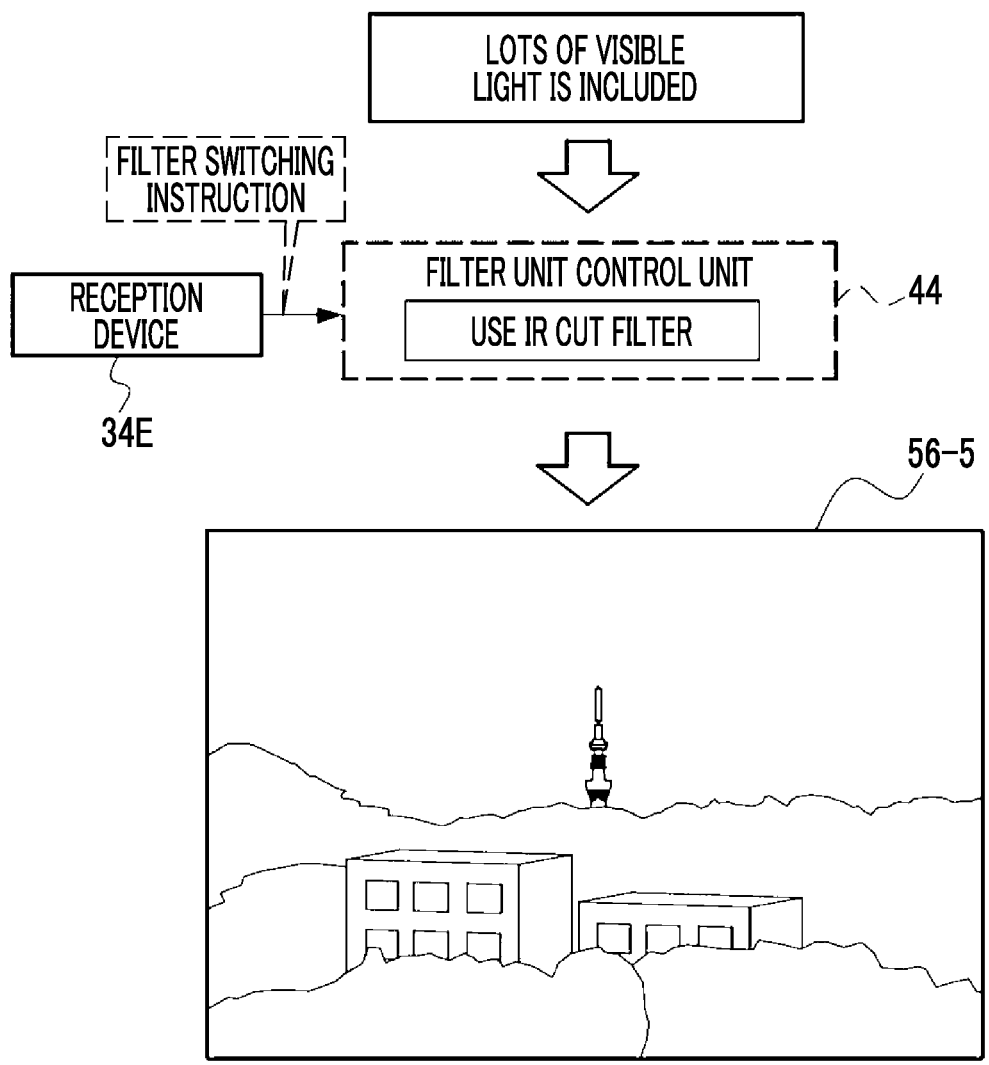

[IN CASE WHERE FIELD OF VIEW IS 10 km AND SUBJECT DISTANCE IS 10 km]

FIG. 6C
[IN CASE WHERE FIELD OF VIEW IS 3 km AND SUBJECT DISTANCE IS 10 km]
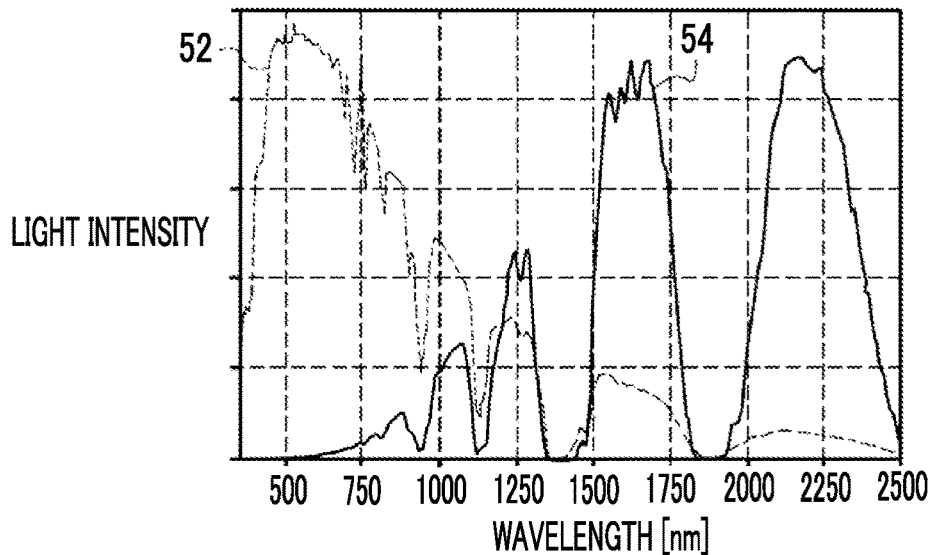
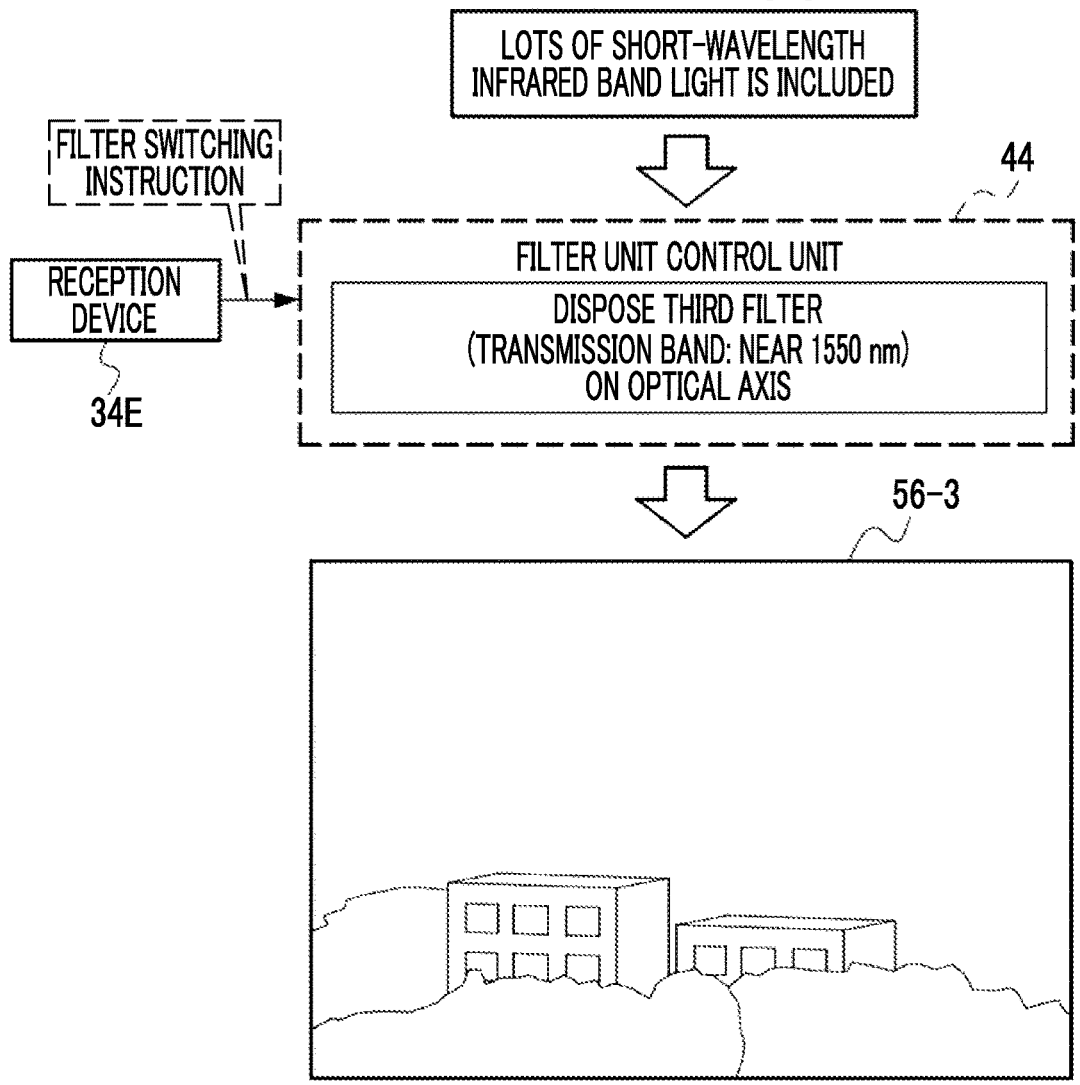

(IN CASE WHERE FIELD OF VIEW IS 100 km AND SUBJECT DISTANCE IS 0.1 km)

(IN CASE WHERE FIELD OF VIEW IS 100 km AND SUBJECT DISTANCE IS 1.0 km)

IMAGING APPARATUS, IMAGING METHOD, AND PROGRAM

CROSS-REFERENCE TO RELATED APPLICATIONS

This application is a continuation application of International Application No. PCT/JP2021/026153, filed on Jul. 12, 2021, which is incorporated herein by reference in its entirety. Further, this application claims priority from Japanese Patent Application No. 2020-139633, filed on Aug. 20, 2020, the disclosure of which is incorporated by reference herein in their entirety.

BACKGROUND

Technical Field

The technique of the present disclosure relates to an imaging apparatus, an imaging method, and a non-transitory storage medium storing a program.

Related Art

Disclosed in JP2019-159107A is a lens device comprising a convex lens, a primary mirror, a secondary mirror, and an optical filter. Light from a subject is incident on the convex lens. The primary mirror is a concave mirror having a hole portion formed in a central portion and reflects light from the convex lens toward the convex lens. The secondary mirror is a convex mirror provided on a light emission surface side of a central portion of the convex lens and reflects light from the primary mirror toward the hole portion of the primary mirror. The optical filter is disposed on an optical path of light that has passed through the hole portion of the primary mirror and can continuously switch between a plurality of bandpass filters that transmit light in any band from a visible light band to a near-infrared light band.

Disclosed in JP2019-211234A is a distance measurement device comprising a laser distance measurement device that emits laser light and receives the laser light reflected from an object to measure a distance to the object and a surveillance camera that images the surroundings including a laser light irradiation point of the object irradiated with the laser light from the laser distance measurement device. The surveillance camera includes a stop into which an optical image condensed by a lens is input, an imaging element that photoelectrically converts the input optical image and outputs the converted image as imaging information, and a filter switching unit. The filter switching unit is disposed between the stop and the imaging element, and any one of a near-infrared cut filter that cuts light in a near infrared range, an optical bandpass filter that passes a wavelength of the laser light in the near infrared range, or an optical filter that adjusts an optical path length from the lens to the imaging element is disposed to face between the stop and the imaging element.

Disclosed in JP2015-210124A is an agricultural surveillance camera comprising a 550 nm bandpass filter, an 850 nm bandpass filter, an infrared cut filter, a transparent filter, a filter switching mechanism, and an imaging element that performs imaging. The filter switching mechanism switches between the 550 nm bandpass filter, the 850 nm bandpass filter, the infrared cut filter, and the transparent filter. This agricultural surveillance camera normally inserts an infrared cut filter to capture a color image and inserts the 550 nm bandpass filter or the 850 nm bandpass filter to capture a black-and-white image in a case of detecting a growth state of a crop.

Disclosed in JP2020-64164A is an optical device comprising an optical system and a holding member that holds the optical system. The holding member is provided on an object side of the optical system and has a first coupling portion for coupling to a lens device and a second coupling portion, provided between the optical system and the lens device, for coupling to an optical element. The lens device can be attached/detached via the first coupling portion, and the optical element can be attached/detached via the second coupling portion.

Disclosed in WO2017/061432A is an imaging apparatus comprising a plurality of bandpass filters having a wavelength of visible light as a passing band, an imaging element that images light from a subject that has passed through the plurality of bandpass filters, and a control unit. The control unit causes the imaging element to image the light from the subject irradiated with first irradiation light having first spectral characteristics in passing bands of the plurality of bandpass filters, and causes the imaging element to image the light from the subject irradiated with second irradiation light having second spectral characteristics different from the first spectral characteristic in the passing bands of the plurality of bandpass filters.

Disclosed in WO2020/095513A is an imaging lens having a plurality of lenses. With coating of at least a part of the plurality of lenses, in a near-infrared light wavelength range, light transmittance on a shorter wavelength side than a near-infrared light peak wavelength range including 1550 nm decreases as a wavelength becomes shorter from light transmittance at a short wavelength end of the near-infrared light peak wavelength range, and light transmittance on a longer wavelength side than the near-infrared light peak wavelength range decreases as the wavelength becomes longer from light transmittance at a long wavelength end of the near-infrared light peak wavelength range.

SUMMARY

One embodiment according to the technique of the present disclosure provides an imaging apparatus, an imaging method, and a non-transitory storage medium storing a program that can prevent an image obtained by imaging band light selected from a plurality of pieces of band light from being insufficient in a light amount.

A first aspect according to the technique of the present disclosure is an imaging apparatus comprising an optical element that extracts a plurality of pieces of band light from incident light incident on an optical system, a photoelectric conversion device capable of imaging the plurality of pieces of band light extracted from the incident light by the optical element, and a processor that outputs image data obtained by imaging band light, among the plurality of pieces of band light, selected according to an imaging condition determined based on a field of view by the photoelectric conversion device.

A second aspect of the technique of the present disclosure is the imaging apparatus according to the first aspect, in which the imaging condition is a condition determined based on the field of view and a subject distance and is a condition in which an input light amount to the photoelectric conversion device is maximized.

A third aspect according to the technique of the present disclosure is the imaging apparatus according to the first or second aspect, in which the photoelectric conversion device is an image sensor, the optical element is a plurality of optical filters that selectively guide the plurality of pieces of band light to the image sensor, and the plurality of optical filters are switched on an optical axis of the optical system.

A fourth aspect according to the technique of the present disclosure is the imaging apparatus according to the third aspect further comprising a switching mechanism capable of switching the plurality of optical filters on the optical axis, in which the processor causes the switching mechanism to control of switching the plurality of optical filters on the optical axis based on the imaging condition.

A fifth aspect according to the technique of the present disclosure is the imaging apparatus according to the fourth aspect, in which in a case where a subject is irradiated with irradiation light corresponding to a wavelength range of designated band light, among the plurality of pieces of band light, by an illuminator, the processor causes the switching mechanism to switch an optical filter corresponding to a wavelength range of the irradiation light, among the plurality of optical filters, on the optical axis.

A sixth aspect according to the technique of the present disclosure is the imaging apparatus according to any one of the third to fifth aspects, in which an optical filter switched on the optical axis among the plurality of optical filters is an optical filter determined according to contrasts of a plurality of specific subject images obtained by imaging the plurality of pieces of band light for a specific subject determined in response to an instruction received by a reception device, as a target to be focused, using the image sensor.

A seventh aspect according to the technique of the present disclosure is the imaging apparatus according to the sixth aspect, in which the optical filter switched on the optical axis is an optical filter used in a case where the image sensor images the band light corresponding to a specific subject image having a contrast exceeding a default value among the plurality of specific subject images.

An eighth aspect according to the technique of the present disclosure is the imaging apparatus according to any one of the third to seventh aspects, in which the processor moves at least one of the image sensor or a movable-lens group included in the optical system to correct image-forming deviation due to the switching between the plurality of optical filters.

A ninth aspect according to the technique of the present disclosure is the imaging apparatus according to any one of the third to eighth aspects, in which the processor composes a plurality of band images obtained by performing imaging using the image sensor each time the optical filter is switched on the optical axis.

A tenth aspect according to the technique of the present disclosure is the imaging apparatus according to the first or second aspect, in which the optical element is a light separation element having a spectral prism that splits the incident light into the plurality of pieces of band light, the photoelectric conversion device includes a plurality of image sensors corresponding to the plurality of pieces of band light, and the processor outputs image data obtained by performing imaging using an image sensor corresponding to the band light selected according to the imaging condition among the plurality of image sensors.

An eleventh aspect according to the technique of the present disclosure is the imaging apparatus according to the tenth aspect, in which the processor composes a plurality of images obtained by performing imaging using the plurality of image sensors.

A twelfth aspect according to the technique of the present disclosure is the imaging apparatus according to any one of the first to eleventh aspects, in which the processor derives a subject distance based on a contrast of a band image obtained by imaging at least one of the plurality of pieces of band light using the photoelectric conversion device or displacement of an image-forming position.

A thirteenth aspect according to the technique of the present disclosure is the imaging apparatus according to the twelfth aspect, in which the band light is low transmittance band light having lower atmospheric transmittance than other pieces of band light in short-wavelength infrared band light.

A fourteenth aspect according to the technique of the present disclosure is the imaging apparatus according to any one of the first to twelfth aspects, in which at least one of the plurality of pieces of band light is high transmittance band light having higher atmospheric transmittance than other pieces of band light in short-wavelength infrared band light.

A fifteenth aspect according to the technique of the present disclosure is the imaging apparatus according to any one of the first to fourteenth aspects, in which the field of view is a field of view measured by a field-of-view meter for a subject.

A sixteenth aspect according to the technique of the present disclosure is an imaging method comprising extracting a plurality of pieces of band light from incident light incident on an optical system using an optical element, and outputting image data obtained by imaging band light, among the plurality of pieces of band light, selected according to an imaging condition determined based on a field of view from a processor, using a photoelectric conversion device capable of imaging the plurality of pieces of band light extracted from the incident light by the optical element.

A seventeenth aspect according to the technique of the present disclosure is a non-transitory storage medium storing a program that caused a computer, which is applied to an imaging apparatus including an optical element that extracts a plurality of pieces of band light from incident light incident on an optical system and a photoelectric conversion device capable of imaging the plurality of pieces of band light extracted from the incident light by the optical element, to execute a process comprising outputting image data obtained by imaging band light, among the plurality of pieces of band light, selected according to an imaging condition determined based on a field of view using the photoelectric conversion device.

BRIEF DESCRIPTION OF THE DRAWINGS

FIG. 6A is an explanatory diagram showing a spectrum of subject light and an example of filter selection in a case where a field of view is 100 km and a subject distance is 10 km.

FIG. 6C is an explanatory diagram showing a spectrum of subject light and an example of filter selection in a case where the field of view is 3 km and the subject distance is 10 km.

DETAILED DESCRIPTION

An example of an embodiment of an imaging apparatus, an imaging method, and a program according to the technique of the present disclosure will be described with reference to accompanying drawings.

First, terms used in the following description will be described.

A CPU designates an abbreviation for "central processing unit". A RAM designates an abbreviation for "random access memory". An SSD designates an abbreviation for "solid state drive". An HDD designates an abbreviation for "hard disk drive". An EEPROM designates an abbreviation for "electrically erasable and programmable read only memory". An ASIC designates an abbreviation for "application specific integrated circuit". A PLD designates an abbreviation for "programmable logic device". An FPGA designates an abbreviation for "field-programmable gate array". An SoC designates an abbreviation for "system-on-a-chip". An EL designates an abbreviation for "electro-luminescence". An A/D designates an abbreviation for "analog to digital". A USB designates an abbreviation for "universal serial bus". A GPU is an abbreviation for "graphics processing unit". An AF is an abbreviation for "auto focus". An IR is an abbreviation for "infrared". A T2SL is an abbreviation for "type-ii superlattice". A CMOS is an abbreviation for "complementary metal oxide semiconductor". A CCD is an abbreviation for "charge coupled device".

In the description of the present specification, the meaning of "identical" includes a completely identical meaning and a substantially identical meaning including an error allowed in the technical field to which the technique of the present disclosure belongs and within a range not departing from the gist of the technique of the present disclosure. In the description of the present specification, the meaning of "match" includes a meaning of a completely match and a meaning of a substantial match including an error allowed in the technical field to which the technique of the present disclosure belongs and within a range not departing from the gist of the technique of the present disclosure. In the description of the present specification, the meaning of "equal interval" includes a meaning of a completely equal interval and a meaning of a substantially equal interval including an error allowed in the technical field to which the technique of the present disclosure belongs and within a range not departing from the gist of the technique of the present disclosure.

First Embodiment

Figure 1:
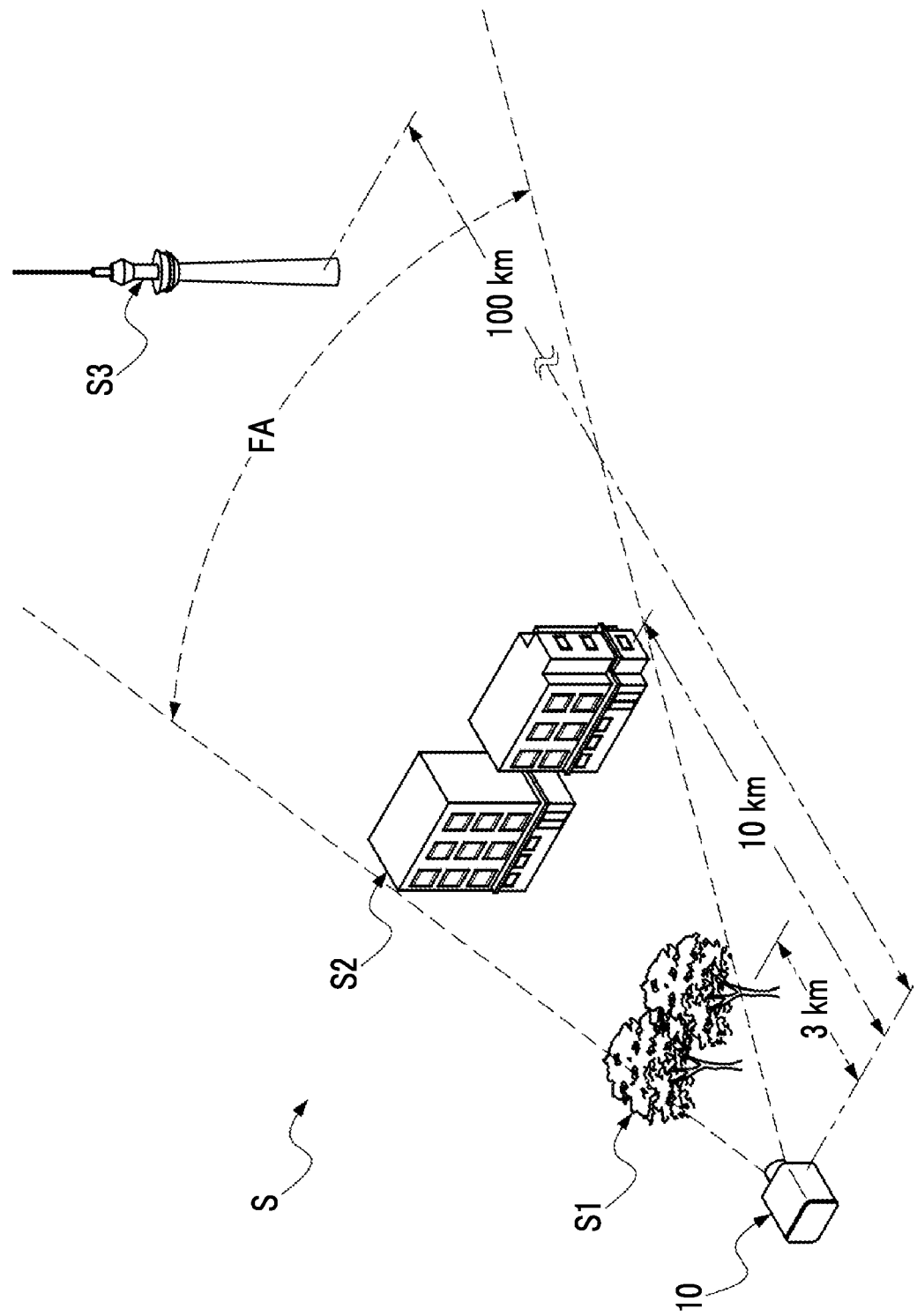
FIG. 1 is a perspective view of an example of an aspect in which a subject is imaged by an imaging apparatus.

As shown in FIG. 1 as an example, an imaging apparatus 10 images a subject S defined by an angle of view FA. The subject S includes, for example, a short-range subject S1 closest to the imaging apparatus 10, a medium-range subject S2 far from the short-range subject S1, and a long-range subject S3 further far from the medium-range subject S2. In the present embodiment, for example, the short-range subject S1 is located at a position of 3 kilometers (km) from the imaging apparatus 10. The medium-range subject S2 is located at a position 10 km from the imaging apparatus 10. The long-range subject S3 is located at a position 100 km from the imaging apparatus 10. In the example shown in FIG. 1, several trees are shown as an example of the short-range subject S1, several multi-tenant buildings are shown as an example of the medium-range subject S2, and a radio wave tower is shown as an example of the long-range subject S3. However, these are merely examples, and the subject may be any object that can be imaged.

Figure 2:
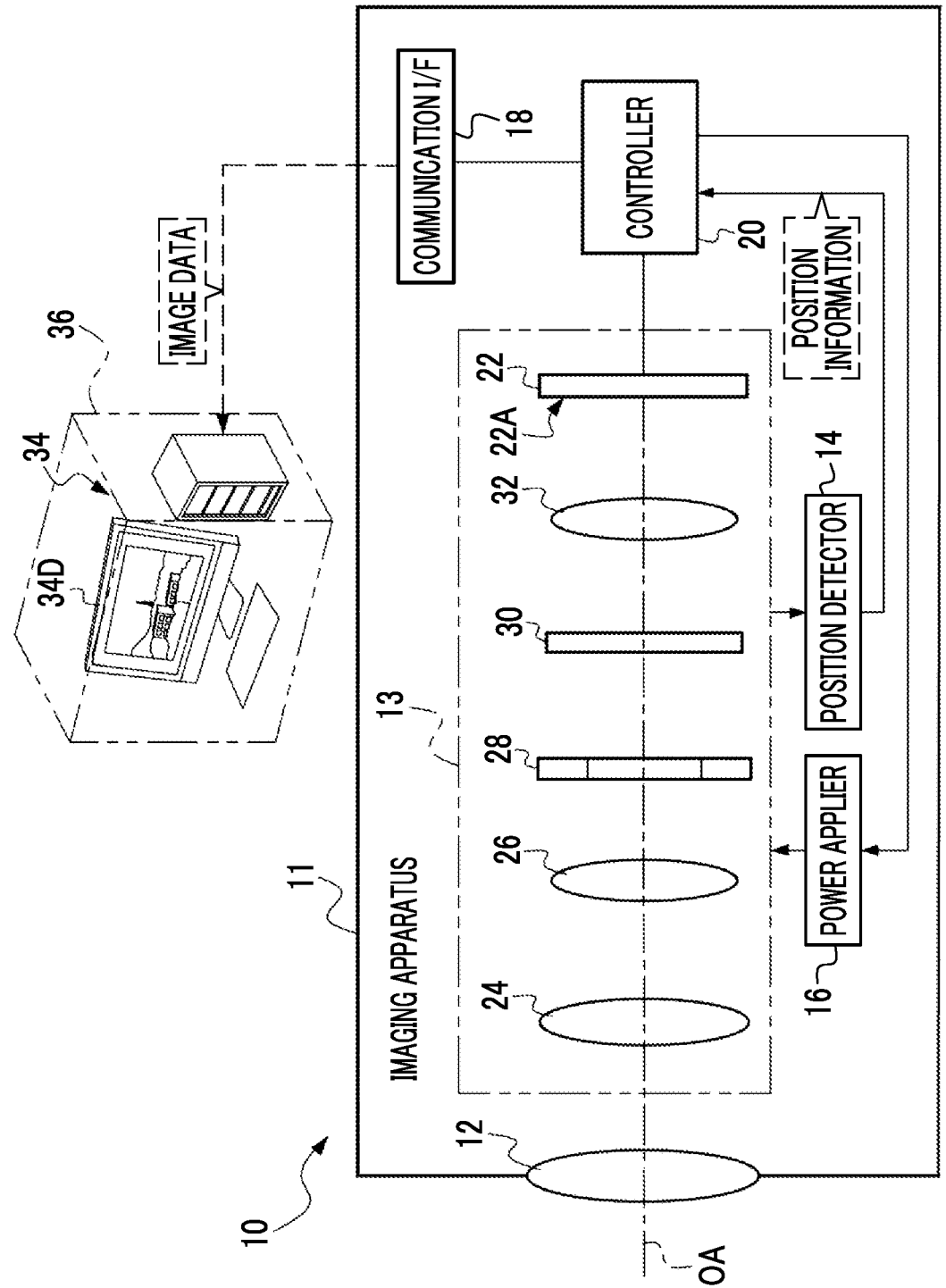
FIG. 2 is a block diagram showing an example of a configuration of the imaging apparatus according to a first embodiment.

As shown in FIG. 2 as an example, an objective lens 12 is attached to a housing 11 of the imaging apparatus 10. An imaging unit 13, a position detector 14, a power applier 16, a communication I/F 18, and a controller 20 are built in the housing 11. The imaging apparatus 10 is an example of an "imaging apparatus" according to the technique of the present disclosure.

The imaging unit 13 includes a plurality of types of optical elements and an imaging element 22. The plurality of types of optical elements guide incident light incident on the imaging unit 13 through the objective lens 12 to the imaging element 22. The imaging element 22 images the incident light guided by the optical element.

The plurality of types of optical elements include, for example, a focus-lens group 24, a zoom-lens group 26, a stop 28, a filter unit 30, and a master-lens group 32. Although simplified in FIG. 2, each of the focus-lens group 24, the zoom-lens group 26, and the master-lens group 32 actually includes a plurality of lenses. Further, the objective lens 12, the focus-lens group 24, the zoom-lens group 26, the stop 28, the filter unit 30, and the master-lens group 32 are examples of an "optical system" according to the technique of the present disclosure.

The imaging element 22 is an image sensor, for example, an InGaAs (indium gallium arsenic) sensor having an InGaAs layer and a CMOS readout circuit and capable of performing the imaging from visible light to short-wavelength infrared light, which is invisible light. The imaging element 22 may have a CCD readout circuit instead of the CMOS readout circuit. Further, although the InGaAs sensor is used here as the imaging element 22, the technique of the present disclosure is not limited thereto. An image sensor in which an InGaAs diode capable of detecting short-wavelength infrared light and a silicon photodiode capable of detecting the visible light are arranged in a specific arrangement may be used as the imaging element 22. Further, a diode having a T2SL structure or the like may be used instead of the InGaAs diode. The imaging element 22 is an example of a "photoelectric conversion device" and an "image sensor" according to the technique of the present disclosure.

The objective lens 12, the focus-lens group 24, the zoom-lens group 26, the stop 28, the filter unit 30, the master-lens group 32, and the imaging element 22 are disposed in this order from a subject side to an image-forming side (imaging element 22 side) along an optical axis OA. The optical axis OA matches a center of a light-receiving surface 22A of the imaging element 22. The optical axis OA is an example of an "optical axis" according to the technique of the present disclosure.

The focus-lens group 24 moves along the optical axis OA to adjust focus. The zoom-lens group 26 moves along the optical axis OA to perform zooming of a subject range. The stop 28 has an opening 28A. The incident light guided by the zoom-lens group 26 passes through the opening 28A. The stop 28 is a movable stop in which a diameter of the opening 28A can be changed.

The incident light transmitted through the opening 28A is incident on the filter unit 30. The filter unit 30 has a plurality of optical filters that extract light in a plurality of wavelength ranges (hereinafter referred to as "plurality of pieces of band light") from the incident light and selectively guide the extracted light to the imaging element 22.

The band light transmitted through the filter unit 30 is incident on the master-lens group 32. The master-lens group 32 forms an image of the incident band light on the light-receiving surface 22A of the imaging element 22.

The position detector 14 and the power applier 16 are connected to the imaging unit 13. The position detector 14 detects a position of the focus-lens group 24, a position of the zoom-lens group 26, a diameter of the opening 28A, a rotational position of the filter unit 30, a position of the master-lens group 32, and a position of the imaging element 22. The power applier 16 applies power to the focus-lens group 24, the zoom-lens group 26, the stop 28, the filter unit 30, the master-lens group 32, and the imaging element 22.

The controller 20 is connected to the imaging element 22, the position detector 14, and the power applier 16, and integrally controls the operation of the imaging apparatus 10. The controller 20 receives position information on the position of the focus-lens group 24, the position of the zoom-lens group 26, the diameter of the opening 28A, the rotational position of the filter unit 30, the position of the master-lens group 32, and the position of the imaging element 22, from the position detector 14. The controller 20 controls the power applier 16 based on the received position information. That is, the power applier 16 applies the power to the focus-lens group 24, the zoom-lens group 26, the stop 28, the filter unit 30, the master-lens group 32, and the imaging element 22 based on the position information received by the controller 20.

The communication I/F 18 is connected to the controller 20. The communication I/F 18 is realized, for example, by a device having an FPGA. The communication I/F 18 is connected to a controlling device 34 via a wired or wireless communication network, and controls exchange of various types of information between the controller 20 and the controlling device 34. The controlling device 34 is installed in, for example, a controlling room 36 away from an installation location of the imaging apparatus 10. The controller 20 transmits image data acquired by performing the imaging with the imaging element 22 to the controlling device 34 via the communication I/F 18. The controlling device 34 displays an image on a display 34D based on the received image data.

Figure 3:
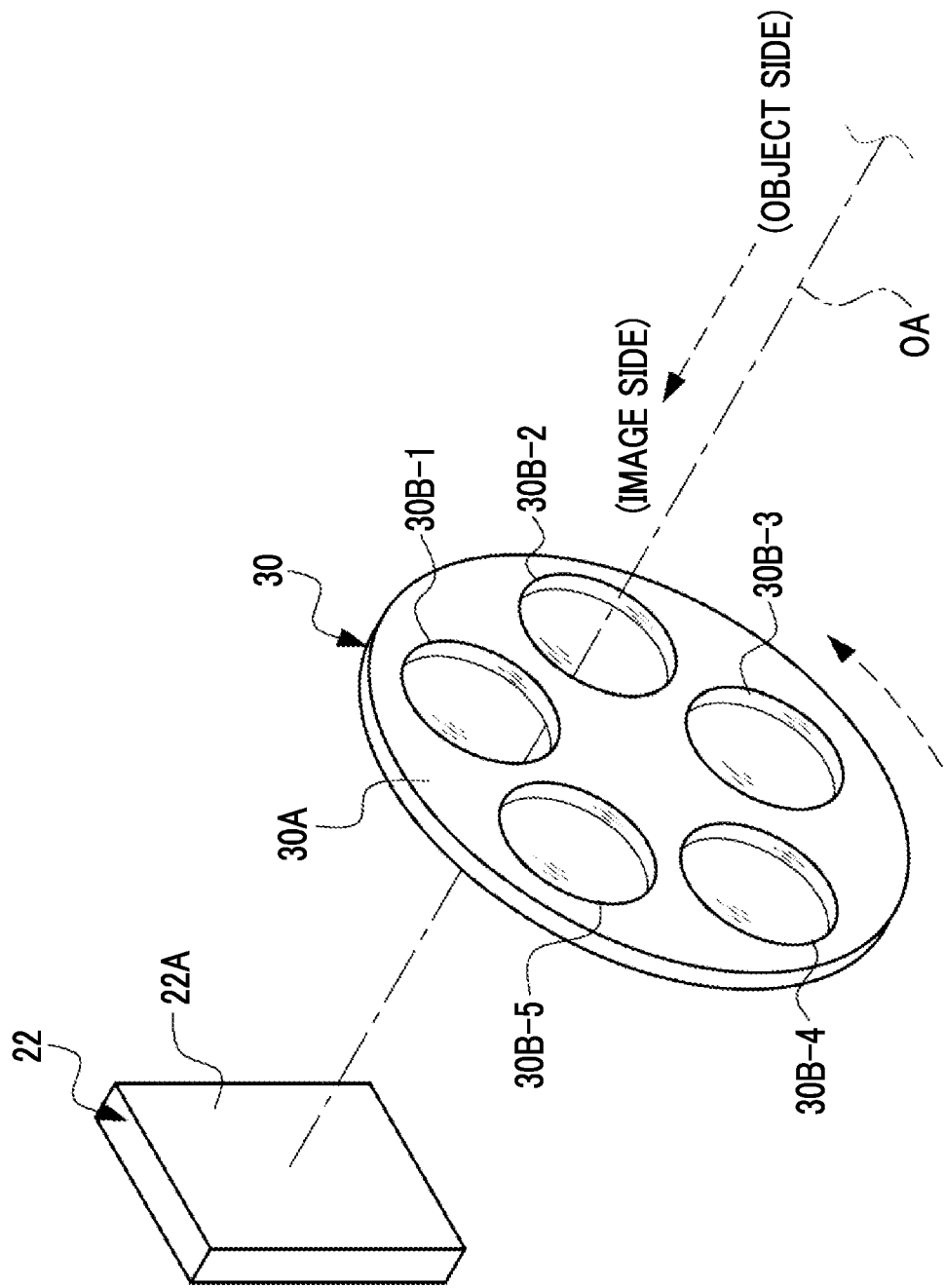
FIG. 3 is a perspective view of a filter unit included in the imaging apparatus according to the first embodiment.

As shown in FIG. 3 as an example, the filter unit 30 comprises a disk 30A, and the disk 30A is provided with a first optical filter 30B-1, a second optical filter 30B-2, a third optical filter 30B-3, a fourth optical filter 30B-4, and an IR cut filter 30B-5 at equal intervals along a circumferential direction. Hereinafter, for convenience of description, in a case where it is not necessary to distinguishably describe between the first optical filter 30B-1, the second optical filter 30B-2, the third optical filter 30B-3, the fourth optical filter 30B-4, and the IR cut filter 30B-5, the filters are comprehensively referred to as "optical filter 30B". The optical filter 30B is an example of an "optical element" and a "plurality of optical filters" according to the technique of the present disclosure.

The filter unit 30 switches between a plurality of optical filters 30B on the optical axis OA in a turret system. Specifically, the disk 30A rotates along a circumferential direction (for example, direction of arc dashed arrow shown in FIG. 3) to dispose the plurality of optical filters 30B to be switchable on the optical axis OA.

In a case where the optical filter 30B is inserted into the optical path, the optical axis OA penetrates a center of the optical filter 30B inserted into the optical path and the center of the light-receiving surface 22A. In the example shown in FIG. 3, the second optical filter 30B-2 is inserted into the optical path, and the optical axis OA penetrates the center of the second optical filter 30B-2.

The first optical filter 30B-1 is a filter that causes near-infrared light near 1000 nanometers (nm) to transmit. Hereinafter, the near-infrared light near 1000 nm transmitted through the first optical filter 30B-1 is referred to as "first band light". The second optical filter 30B-2 is a filter that causes the near-infrared light near 1250 nm to transmit. Hereinafter, the near-infrared light near 1250 nm transmitted through the second optical filter 30B-2 is referred to as "second band light". Among near-infrared rays, the first band light and the second band light are band light in a wavelength range corresponding to an atmospheric window, which is less affected by absorption by the atmosphere and has high atmospheric transmittance as compared with other wavelength ranges, that is, high transmittance band light.

Here, the term "near" is a degree of difference allowed in the technical field to which the technique of the present disclosure belongs, and designates a range including the degree of difference within a range not departing from the gist of the technique of the present disclosure. In the present embodiment, the degree of difference is, for example, from ± several nm to ± several tens nm, and is a value derived by a test using an actual machine and/or a computer simulation or the like. The degree of difference may be a fixed value or a variable value. Further, the degree of difference may be changed depending on imaging conditions, the subject, and the like.

The third optical filter 30B-3 is a filter that causes short-wavelength infrared light near 1550 nm to transmit. Hereinafter, the short-wavelength infrared light near 1550 nm transmitted through the third optical filter 30B-3 is referred to as "third band light". The fourth optical filter 30B-4 is a filter that causes the short-wavelength infrared light near 2150 nm to transmit. Hereinafter, the short-wavelength infrared light near 2150 nm transmitted through the fourth optical filter 30B-4 is referred to as "fourth band light". Among short-wavelength infrared rays, the third band light and the fourth band light are band light in a wavelength range corresponding to the atmospheric window, which is less affected by absorption by the atmosphere and has high atmospheric transmittance as compared with other wavelength ranges, that is, the high transmittance band light.

The IR cut filter 30B-5 is a filter that causes the visible light to transmit and blocks the near-infrared light that becomes noise in a case where the visible light is imaged. Specifically, the IR cut filter 30B-5 causes the visible light of less than 800 nm to transmit and blocks the near-infrared light of 800 nm or more. Hereinafter, the visible light transmitted through the fifth optical filter 30B-5 is referred to as "fifth band light". Hereinafter, in a case where it is not necessary to distinguishably describe between the first band light to the fifth band light, the filters are comprehensively referred to as "band light". The first band light to the fifth band light are examples of a "plurality of pieces of band light" according to the technique of the present disclosure.

Although the visible light of less than 800 nm is illustrated here, this is merely an example, and the technique of the present disclosure is not limited thereto. That is, since there are various interpretations of the wavelength range of the visible light depending on theories and the like, the wavelength range defined as the wavelength range of the visible light may be decided according to the use of the imaging apparatus 10 and the like. The same applies to the wavelength range of the near-infrared light and the wavelength range of the short-wavelength infrared light.

Figure 4:
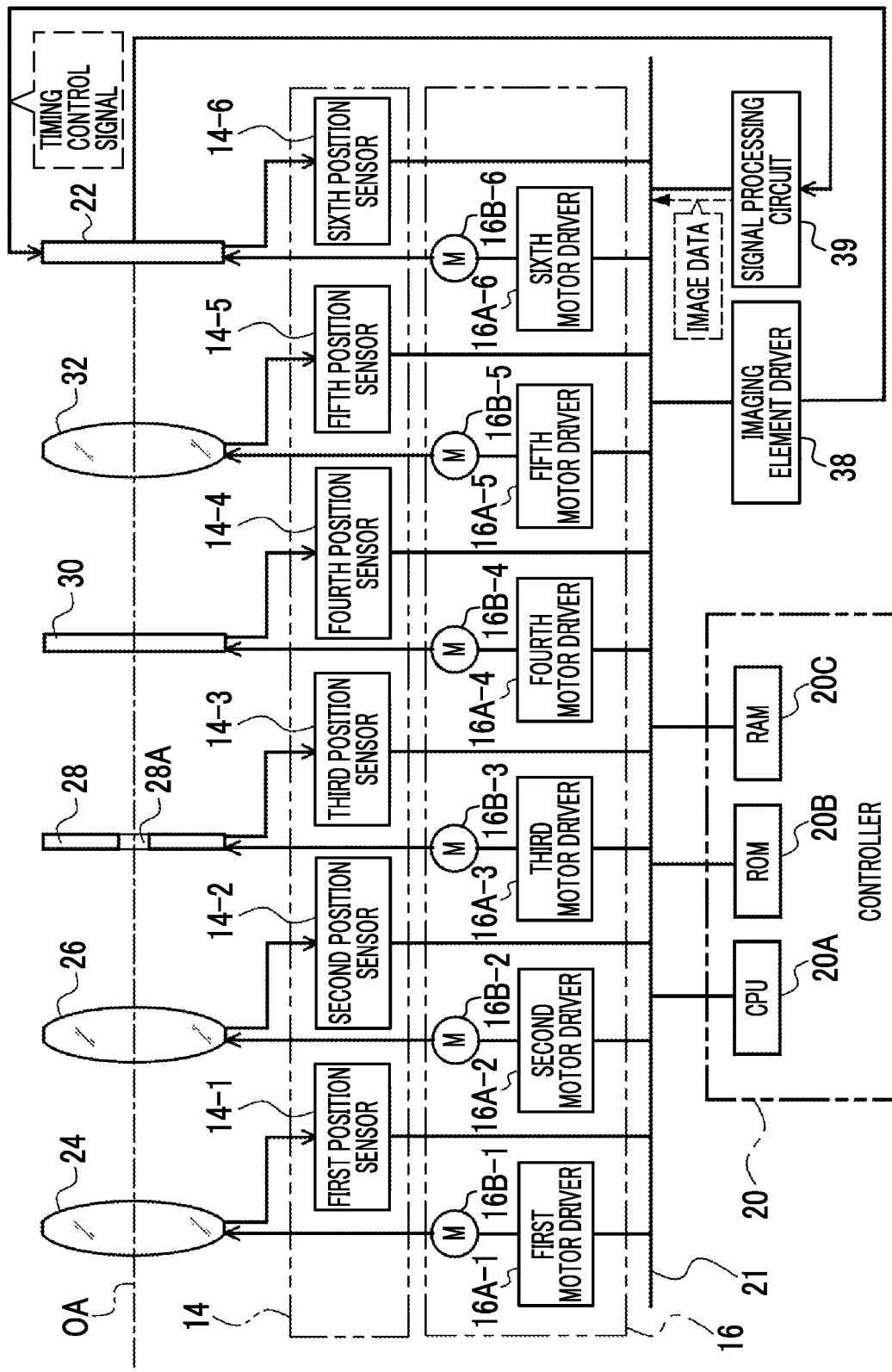
FIG. 4 is a block diagram showing an example of a hardware configuration of a power applier and a position detector included in the imaging apparatus according to the first embodiment.

As shown in FIG. 4 as an example, the position detector 14 comprises first to sixth position sensors 14-1 to 14-6. The first to sixth position sensors 14-1 to 14-6 are connected to the controller 20 via a bus 21. Here, a potentiometer is employed as an example of each of the first to sixth position sensors 14-1 to 14-6. In the example shown in FIG. 4, one bus is illustrated as the bus 21 for convenience of illustration, but a plurality of buses may be used. The bus 21 may be a serial bus or a parallel bus including a data bus, an address bus, a control bus, and the like.

The power applier 16 comprises first to sixth motor drivers 16A-1 to 16A-6 and first to sixth motors 16B-1 to 16B-6. The first to sixth motor drivers 16A-1 to 16A-6 are connected to the controller 20 via the bus 21. The first to sixth motor drivers 16A-1 to 16A-6 are controlled by the controller 20. Further, the first to sixth motors 16B-1 to 16B-6 are connected to the first to sixth motor drivers 16A-1 to 16A-6 and controlled by the first to sixth motor drivers 16A-1 to 16A-6, respectively.

The controller 20 comprises a CPU 20A, a ROM 20B, and a RAM 20C, and the CPU 20A, the ROM 20B, and the RAM 20C are connected to the bus 21. The ROM 20B is a non-volatile memory. The EEPROM is used as the ROM 20B, but the technique of the present disclosure is not limited thereto, and a mask ROM may be used, for example. Various programs including an imaging control program (refer to FIG. 5) and various parameters are stored in the ROM 20B. The RAM 20C is a volatile memory. The RAM 20C is used as a work memory by the CPU 20A. The CPU 20A reads out various programs from the ROM 20B and executes the readout various programs on the RAM 20C. The CPU 20A controls the entire imaging apparatus 10 according to various programs developed in the RAM 20C. The CPU 20A is an example of a "processor" according to the technique of the present disclosure.

The first position sensor 14-1 detects the position of the focus-lens group 24 and outputs a focus-lens position signal indicating the detected position to the CPU 20A. The CPU 20A stores the focus-lens position signal input from the first position sensor 14-1 in the RAM 20C. The CPU 20A applies the power of the first motor 16B-1 to the focus-lens group 24 via the first motor driver 16A-1 to control the position of the focus-lens group 24 on the optical axis OA.

The second position sensor 14-2 detects the position of the zoom-lens group 26 and outputs a zoom-lens position signal indicating the detected position to the CPU 20A. The CPU 20A stores the zoom-lens position signal input from the second position sensor 14-2 in the RAM 20C. The CPU 20A applies the power of the second motor 16B-2 to the zoom-lens group 26 via the second motor driver 16A-2 to control the position of the zoom-lens group 26 on the optical axis OA.

The stop 28 has a plurality of stop leaf blades and an opening/closing mechanism for opening and closing the stop leaf blades. The opening/closing mechanism changes a position of the stop leaf blade using the power of the third motor 16B-3 to change the diameter of the opening 28A. The third position sensor 14-3 detects the diameter of the opening 28A and outputs a diameter signal indicating the detected diameter to the CPU 20A. The CPU 20A stores the diameter signal input from the third position sensor 14-3 in the RAM 20C. The CPU 20A applies the power of the third motor 16B-3 to the opening/closing mechanism via the third motor driver 16A-3 to control the diameter of the opening 28A.

The filter unit 30 rotates the disk 30A to switch the plurality of optical filters 30B on the optical axis OA. The disk 30A rotates under the power of the fourth motor 16B-4. The fourth position sensor 14-4 detects the rotational position of the disk 30A and outputs a filter-rotation position signal indicating the detected rotational position to the CPU 20A. The CPU 20A stores the filter-rotation position signal input from the fourth position sensor 14-4 in the RAM 20C. The CPU 20A applies the power of the fourth motor 16B-4 to the disk 30A via the fourth motor driver 16A-4 to perform the switching control on the optical filter 30B. The filter unit 30 is an example of a "switching mechanism" according to the technique of the present disclosure.

The fifth position sensor 14-5 detects the position of the master-lens group 32 and outputs a master-lens position signal acquired by the detection to the CPU 20A. The CPU 20A stores the master-lens position signal input from the fifth position sensor 14-5 in the RAM 20C. The CPU 20A applies the power of the fifth motor 16B-5 to the master-lens group 32 via the fifth motor driver 16A-5 to control the position the master-lens group 32 on the optical axis OA, based on the master-lens position signal.

The imaging element 22 comprises a moving mechanism that moves the imaging element 22 along the optical axis OA by using the power of the sixth motor 16B-6. The sixth position sensor 14-6 detects the position of the imaging element 22 on the optical axis OA and outputs an imaging-element position signal indicating the detected position to the CPU 20A. The CPU 20A stores the imaging-element position signal input from the sixth position sensor 14-6 in the RAM 20C. The CPU 20A applies the power of the sixth motor 16B-6 to the moving mechanism via the sixth motor driver 16A-6 to control the position of the imaging element 22 on the optical axis OA.

The imaging element 22 is located on the optical axis OA after the master-lens group 32, that is, on the image-forming side. The imaging element 22 is a photoelectric conversion device capable of imaging the plurality of pieces of band light extracted from the incident light by the filter unit 30. The imaging element 22 images the subject S based on the band light imaged on the light-receiving surface 22A to generate image data.

An imaging element driver 38 and a signal processing circuit 39 are connected to the imaging element 22. The imaging element driver 38 and the signal processing circuit 39 are connected to the bus 21. The imaging element driver 38 outputs a timing control signal to the imaging element 22 under the control of the CPU 20A. The timing control signal is a signal that defines a timing of the imaging by the imaging element 22 at a period of a several tenths of a second (for example, a sixtieth of a second). The imaging element 22 outputs the generated image data to the signal processing circuit 39 according to the timing control signal input from the imaging element driver 38.

Under the control of the CPU 20A, the signal processing circuit 39 performs processing, such as demosaicing processing, noise removal processing, gradation correction processing, and color correction processing, on the image data. The signal processing circuit 39 outputs the processed image data to the CPU 20A. The CPU 20A stores the image data in the RAM 20C. The image data is data obtained by imaging the band light transmitted through the optical filter 30B disposed on the optical axis OA among the plurality of pieces of band light by the imaging element 22. The image data is an example of "image data" according to the technique of the present disclosure. In the following description, the image data will be referred to as "band image data", and an image indicated by the band image data will be referred to as a band image.

Figure 5:
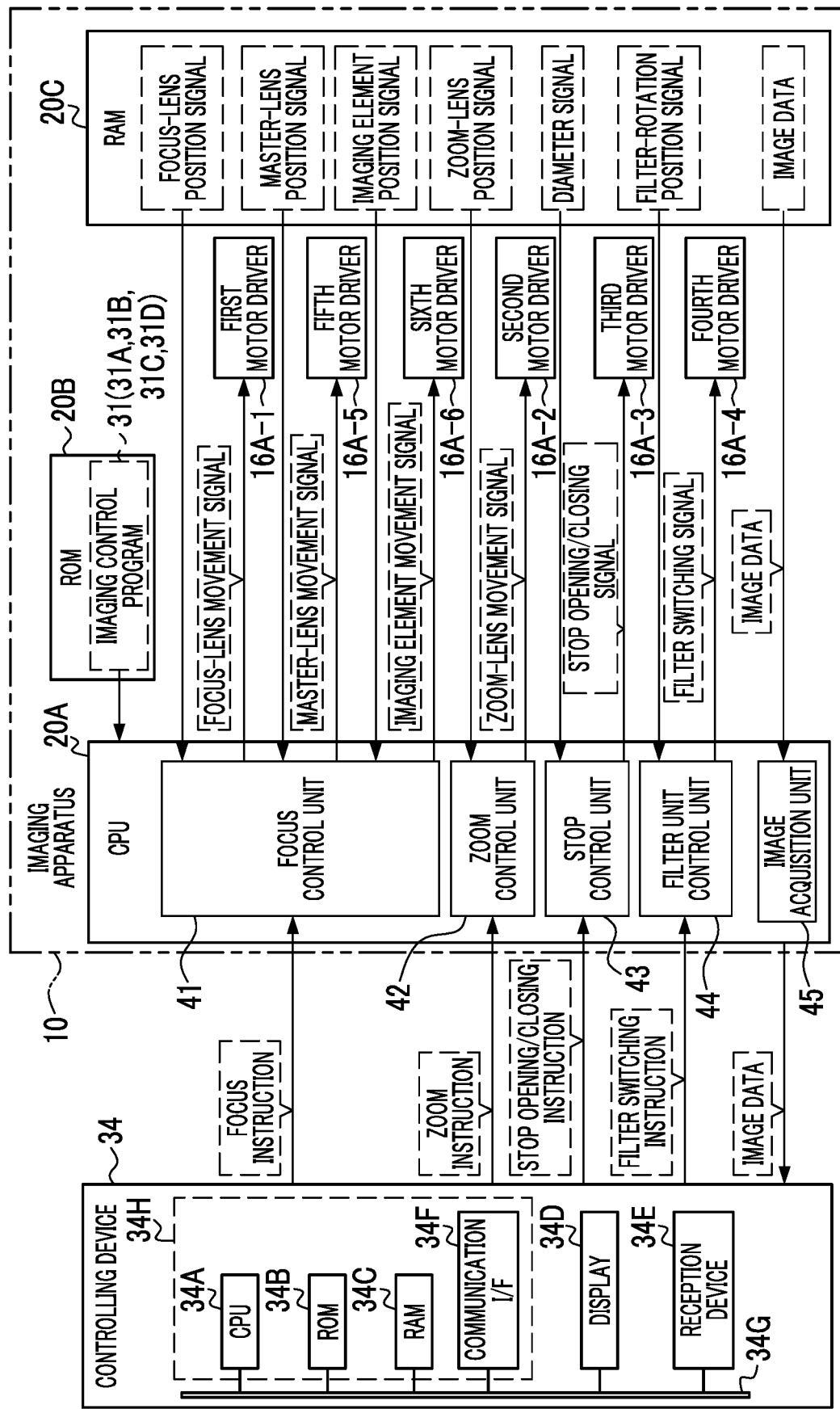
FIG. 5 is a block diagram showing an example of a main part function of a CPU included in the imaging apparatus according to the first embodiment.

As shown in FIG. 5 as an example, the controlling device 34 includes a computer 34H, a display 34D, and a reception device 34E. The computer 34H includes a CPU 34A, a ROM 34B, a RAM 34C, and a communication I/F 34F. The CPU 34A, the ROM 34B, the RAM 34C, the communication I/F 34F, the display 34D, and the reception device 34E are connected to each other via a bus 34G.

The CPU 34A controls the entire controlling device 34. The ROM 34B is a non-volatile memory. The EEPROM is used as the ROM 34B, but the technique of the present disclosure is not limited thereto, and a mask ROM may be used, for example. Various programs for the controlling device 34 are stored in the ROM 34B. The RAM 34C is a volatile memory. The RAM 34C is used as a work memory by the CPU 34A.

The display 34D is, for example, an organic EL display. Under the control of the CPU 34A, the display 34D displays the band image based on the band image data received from the imaging apparatus 10. The display 34D is not limited to the organic EL display, and may be an inorganic EL display, a liquid crystal display, or the like.

The reception device 34E includes, for example, a keyboard, a touch panel, a mouse, and the like. The reception device 34E receives an instruction from a user. The instruction received by the reception device 34E is acquired by the CPU 34A via the bus 34G. In the example shown in FIG. 5, one bus is illustrated as the bus 34G for convenience of illustration, but a plurality of buses may be used. The bus 34G may be a serial bus or a parallel bus including a data bus, an address bus, a control bus, and the like.

The communication I/F 34F is realized, for example, by a device having an FPGA. The communication I/F 34F is connected to the imaging apparatus 10 by wired or wireless communication, and controls exchange of various types of information between the CPU 34A and the imaging apparatus 10. The communication I/F 34F transmits the instruction from the user acquired by the CPU 34A to the imaging apparatus 10.

The CPU 20A of the imaging apparatus 10 reads out the imaging control program 31 from the ROM 20B and executes the readout imaging control program 31 on the RAM 20C to operate as a focus control unit 41, a zoom control unit 42, a stop control unit 43, a filter unit control unit 44, and an image acquisition unit 45. That is, the focus control unit 41, the zoom control unit 42, the stop control unit 43, the filter unit control unit 44, and the image acquisition unit 45 cooperate to realize imaging control processing.

The focus control unit 41 moves the focus-lens group 24 on the optical axis OA in response to a focus instruction received by the reception device 34E of the controlling device 34 to perform focus adjustment of the optical system. In a case where the focus instruction is received, the focus control unit 41 reads out the focus-lens position signal from the RAM 20C. The focus control unit 41 generates a focus-lens movement signal based on the focus instruction and the focus-lens position signal, and outputs the generated focus-lens movement signal to the first motor driver 16A-1. Accordingly, the focus control unit 41 moves the focus-lens group 24 on the optical axis OA via the first motor driver 16A-1.

Further, the focus control unit 41 may move at least one of the master-lens group 32 or the imaging element 22 to perform the focus adjustment of the optical system. In general, the focus-lens group 24 is moved to perform the focus adjustment on a telephoto side of the optical system, whereas at least one of the master-lens group 32 or the imaging element 22 is moved to perform the focus adjustment on a wide-angle side of the optical system. The focus control unit 41 may move one of the focus-lens group 24, the master-lens group 32, and the imaging element 22, move two thereof, or move all thereof. The aspect of moving the master-lens group 32 or the imaging element 22 is the same as the aspect of moving the focus-lens group 24, and thus the description thereof will be omitted here. The focus-lens group 24 and the master-lens group 32 are examples of a "movable-lens group" according to the technique of the present disclosure.

The zoom control unit 42 moves the zoom-lens group 26 on the optical axis OA in response to a zoom instruction received by the reception device 34E of the controlling device 34 to perform the zooming of the subject range. In a case where the zoom instruction is received, the zoom control unit 42 reads out the zoom-lens position signal from the RAM 20C. The zoom control unit 42 generates a zoom-lens movement signal based on the zoom instruction and the zoom-lens position signal, and outputs the generated zoom-lens movement signal to the second motor driver 16A-2. Accordingly, the zoom control unit 42 moves the zoom-lens group 26 on the optical axis OA via the second motor driver 16A-2.

The stop control unit 43 changes the diameter of the stop 28 in response to a stop opening/closing instruction received by the reception device 34E of the controlling device 34. In a case where the stop opening/closing instruction is received, the stop control unit 43 reads out the diameter signal from the RAM 20C. The stop control unit 43 generates a stop opening/closing signal based on the stop opening/closing instruction and the diameter signal, and outputs the generated stop opening/closing signal to the third motor driver 16A-3. Accordingly, the stop control unit 43 changes the diameter of the opening 28A via the third motor driver 16A-3.

The filter unit control unit 44 causes the filter unit 30 to switch the optical filter 30B disposed on the optical axis OA in response to a filter switching instruction received by the reception device 34E of the controlling device 34. In a case where the filter switching instruction is received, the filter unit control unit 44 reads out the filter-rotation position signal from the RAM 20C. The filter unit control unit 44 generates a filter switching signal based on the filter switching instruction and the filter-rotation position signal, and outputs the generated filter switching signal to the fourth motor driver 16A-4. Accordingly, the filter unit control unit 44 switches the optical filter 30B on the optical axis OA via the fourth motor driver 16A-4.

The image acquisition unit 45 reads out the band image data stored in the RAM 20C at the period of a several tenths of a second (for example, a sixtieth of a second) and transmits the band image data to the controlling device 34 via the communication I/F 18.

The controlling device 34 causes the display 34D to display the band image based on the received band image data. Accordingly, the band image obtained by imaging the band light by the imaging element 22 is displayed on the display 34D as, for example, a moving image having a frame rate of 60 fps (hereinafter referred to as a "band moving image").

In the present first embodiment, the user selects the band light according to the imaging condition determined based on the field of view and operates the imaging apparatus 10 via the controlling device 34 such that the optical filter 30B causing the selected band light to transmit is disposed on the optical axis OA. Further, in the present first embodiment, the imaging condition is, for example, a condition determined based on the field of view and a subject distance, and is a condition in which an input light amount to the imaging element 22 is maximized. The user may visually check the band moving image displayed on the display 34D each time the optical filter 30B is switched on the optical axis OA to select the band light in which the input light amount is maximized, that is, the band light according to the imaging condition. Further, the user may select the band light in which the input light amount is maximized based on a measured value obtained by a measuring device or the like that measures the input light amount to the imaging element 22. The filter unit control unit 44 performs the control of causing the filter unit 30 to switch the optical filter 30B causing the selected band light to transmit on the optical axis OA. Hereinafter, an example of a method of selecting the band light in which the input light amount is maximized will be described with reference to FIGS. 6A to 6C.

Figure 6B:
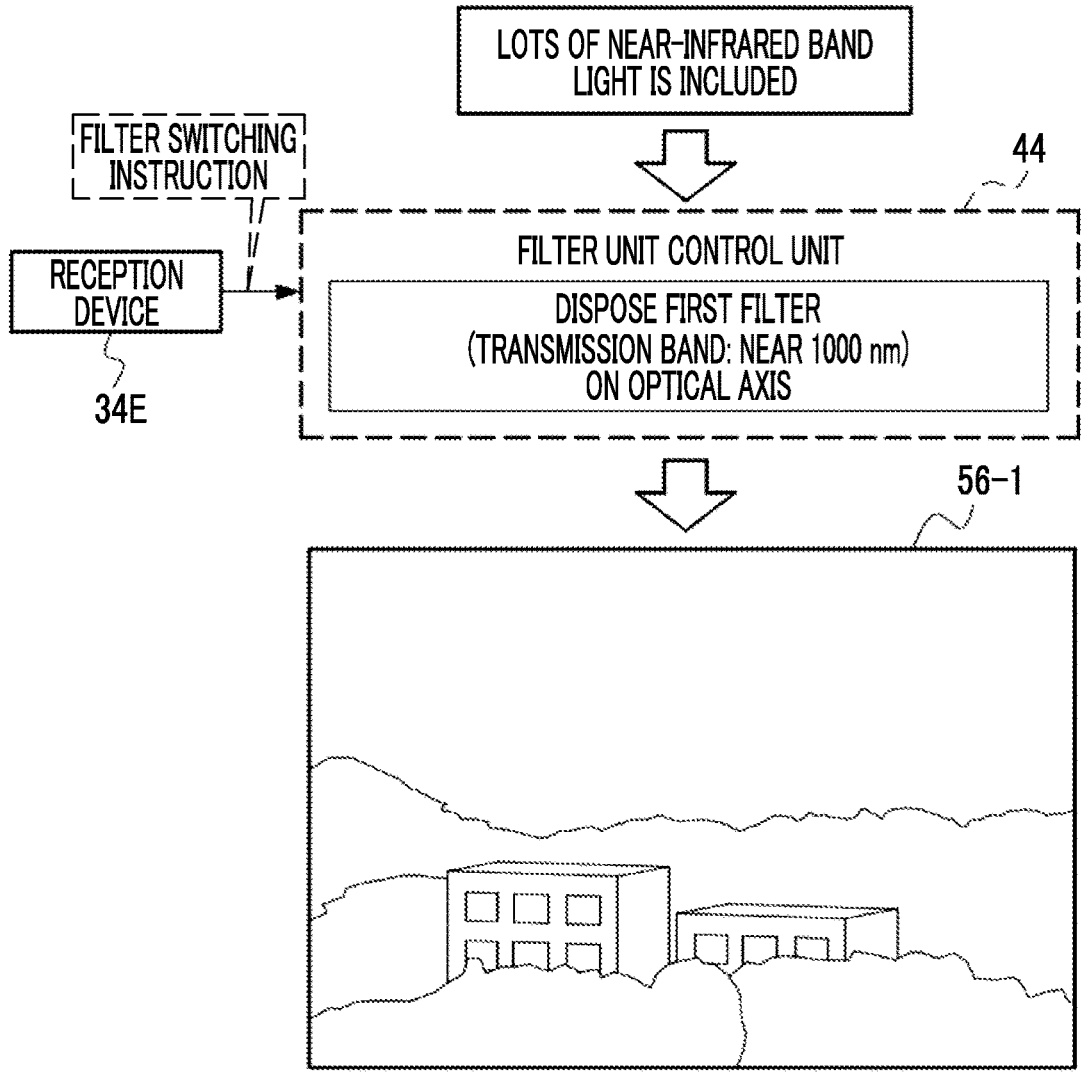
FIG. 6B is an explanatory diagram showing a spectrum of subject light and an example of filter selection in the case where the field of view is 10 km and the subject distance is 10 km.

As an example, in graphs shown in FIGS. 6A to 6C, a reference numeral 52 represents a solar spectrum. The reference numeral 54 represents a spectrum of subject light (hereinafter referred to as "subject light spectrum"). The graphs of FIGS. 6A to 6C show a subject light spectrum 54 in a case where the field of view is different and the subject distance is the same. The subject light spectrum 54 is a product of a solar spectrum 52 and the atmospheric transmittance in a case where the subject light transmits the atmosphere between the subject and the imaging apparatus 10, and is normalized by a maximum value to facilitate comparison between wavelengths.

Here, the field of view is a distance that a person can view with the naked eye. At night, the field of view is worse than during the day. Further, the field of view changes according to a type and amount of a substance contained in the atmosphere. For example, under a weather condition in which clouds or fog are generated, amounts of a water particle and an ice particle contained in the atmosphere are larger than those in fine weather. In this case, due to the influence of light scattering by the water particle and the ice particle, the field of view is deteriorated as compared with the case of fine weather. Further, in a case where volcanic ash, an air pollutant, or the like is contained in the atmosphere, the field of view is similarly deteriorated due to the influence of light scattering by the substance contained in the atmosphere.

As shown in FIG. 6A as an example, in a case where the field of view is 100 km and the subject distance is 10 km, the subject light includes a large amount of visible light of less than 800 nm as compared with near-infrared band light near 1000 nm and 1250 nm, and short-wavelength infrared band light near 1550 nm and 2150 nm. Therefore, with the use of the fifth band light, it is possible to increase the input light amount to the imaging element 22 and to acquire the band image with good image quality.

The reception device 34E receives the filter switching instruction for disposing the IR cut filter 30B-5 on the optical axis OA and transmits the received filter switching instruction to the filter unit control unit 44. The imaging element 22 images the fifth band light transmitted through the IR cut filter 30B-5 to output the band image data indicating a fifth band image 56-5. The fifth band image 56-5 is an image obtained by imaging the short-range subject S1, the medium-range subject S2, and the long-range subject S3 by the imaging element 22.

As shown in FIG. 6B as an example, in a case where the field of view is 10 km and the subject distance is 10 km, the subject light includes a lot of near-infrared band light near 1000 nm and near 1250 nm as compared with the visible light of less than 800 nm and the short-wavelength infrared band light near 1550 nm and 2150 nm. Therefore, the first or second band light is used to obtain the band image with good image quality.

The reception device 34E receives, for example, the filter switching instruction for disposing the first optical filter 30B-1 on the optical axis OA and transmits the received filter switching instruction to the filter unit control unit 44. The imaging element 22 images the first band light transmitted through the first optical filter 30B-1 to output the image data indicating a first band image 56-1. The first band image 56-1 is an image obtained by imaging the short-range subject S1 and the medium-range subject S2 by the imaging element 22. The second band light may be used instead of the first band light. Which of the first band light and the second band light is used may be decided based on the measured value obtained by the measuring device that measures the input light amount to the imaging element 22. Alternatively, the user may decide, for example, by observing the band moving image while switching between the first band light and the second band light.

As shown in FIG. 6C as an example, in a case where the field of view is 3 km and the subject distance is 10 km, the subject light includes a lot of short-wavelength infrared band light near 1550 nm and near 2150 nm as compared with the visible light of less than 800 nm and the near-infrared band light near 1000 nm and near 1250 nm. Therefore, the third or fourth band light is used to obtain the band image with good image quality.

The reception device 34E receives, for example, the filter switching instruction for disposing the third optical filter 30B-3 on the optical axis OA and transmits the received filter switching instruction to the filter unit control unit 44. The imaging element 22 images the third band light transmitted through the third optical filter 30B-3 to output the image data indicating a third band image 56-3. The third band light is an image obtained by imaging the short-range subject S1 and the medium-range subject S2 by the imaging element 22. In a case where the field of view is 3 km, only the short-range subject S1 is shown in the image captured by the visible light, but the short-range subject S1 and the medium-range subject S2 are shown in the third band image 56-3. The fourth band light may be used instead of the third band light. Which of the third band light and the fourth band light is used may be decided based on the measured value obtained by the measuring device that measures the input light amount to the imaging element 22. Alternatively, the user may decide, for example, by observing the band moving image while switching between the third band light and the fourth band light.

Figure 7:
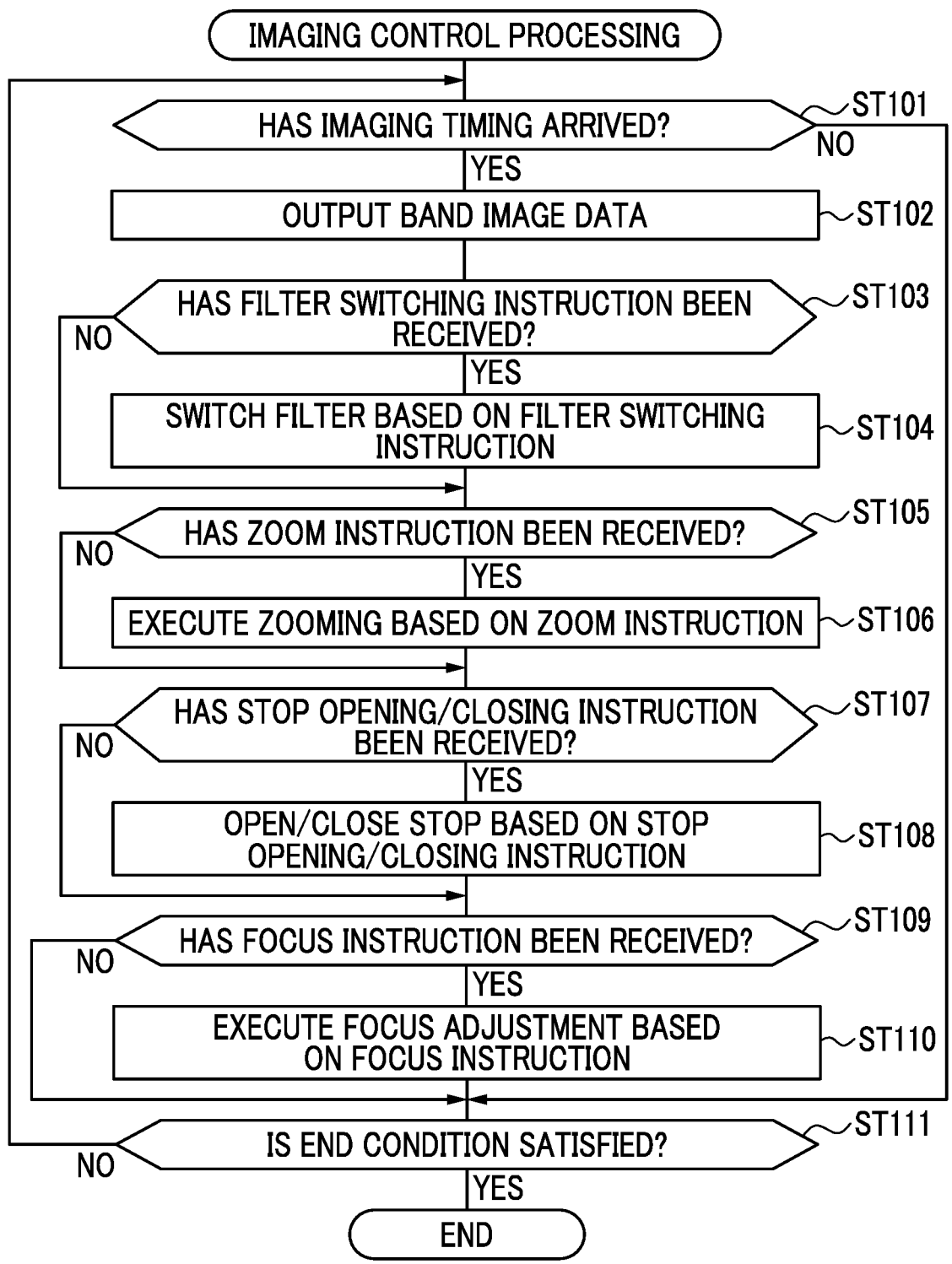
FIG. 7 is a flowchart showing an example of a flow of imaging control processing according to the first embodiment.

Next, an action of the imaging apparatus 10 according to the first embodiment will be described with reference to FIG. 7. The imaging control processing shown in FIG. 7 is realized by the CPU 20A executing the imaging control program 31. Further, the imaging control processing shown in FIG. 7 is started in a case where an imaging start button of the imaging apparatus 10 is operated.

In the imaging control processing, first, in step ST101, the image acquisition unit 45 determines whether or not an imaging timing has arrived. The imaging timing arrives every several tenths of a second (for example, a sixtieth of a second). In step ST101, in a case where the imaging timing has arrived, the determination is positive, and the imaging control processing proceeds to step ST102. In step ST101, in a case where the imaging timing has not arrived, the determination is negative, and the imaging control processing proceeds to step ST111.

In step ST102, the image acquisition unit 45 reads out the band image data from the RAM 20C and outputs the readout band image data to the controlling device 34. The band image data is data obtained by imaging the band light transmitted through the optical filter 30B disposed on the optical axis OA by the imaging element 22, and is stored in the RAM 20C. After that, the imaging control processing proceeds to step ST103.

In step ST103, the filter unit control unit 44 determines whether or not the filter switching instruction has been received. In step ST103, in a case where the filter switching instruction has been received, the determination is positive, and the imaging control processing proceeds to step ST104. In step ST103, in a case where the filter switching instruction has not been received, the determination is negative, and the imaging control processing proceeds to step ST105.

In step ST104, the filter unit control unit 44 switches the optical filter 30B disposed on the optical axis OA based on the filter switching instruction. After that, the imaging control processing proceeds to step ST105.

In step ST105, the zoom control unit 42 determines whether or not the zoom instruction has been received. In step ST105, in a case where the zoom instruction has been received, the determination is positive, and the imaging control processing proceeds to step ST106. In step ST105, in a case where the zoom instruction has not been received, the determination is negative, and the imaging control processing proceeds to step ST107.

In step ST106, the zoom control unit 42 performs the zooming of the subject range based on the zoom instruction. After that, the imaging control processing proceeds to step ST107.

In step ST107, the stop control unit 43 determines whether or not the stop opening/closing instruction has been received. In step ST107, in a case where the stop opening/closing instruction has been received, the determination is positive, and the imaging control processing proceeds to step ST108. In step ST107, in a case where the stop opening/closing instruction has not been received, the determination is negative, and the imaging control processing proceeds to step ST109.

In step ST108, the stop control unit 43 opens and closes the stop 28 based on the stop opening/closing instruction. After that, the imaging control processing proceeds to step ST109.

In step ST109, the focus control unit 41 determines whether or not the focus instruction has been received. In step ST109, in a case where the focus instruction has been received, the determination is positive, and the imaging control processing proceeds to step ST110. In step ST109, in a case where the focus instruction has not been received, the determination is negative, and the imaging control processing proceeds to step ST111.

In step ST110, the focus control unit 41 performs the focus adjustment based on the focus instruction. After that, the imaging control processing proceeds to step ST111.

In step ST111, the image acquisition unit 45 determines whether or not an end condition is satisfied. An example of the end condition includes a condition that an imaging stop button of the imaging apparatus 10 is operated. The imaging stop button may be, for example, a hard key or a soft key displayed on the display 34D of the controlling device 34. Specifically, the imaging stop button is displayed on a screen on which the band moving image is displayed. In step ST111, in a case where the end condition is satisfied, the determination is positive, and the imaging control processing ends. In step ST111, in a case where the end condition is not satisfied, the determination is negative, and the imaging control processing proceeds to step ST101.

As described above, in the present first embodiment, the imaging apparatus 10 includes the optical filter 30B, the imaging element 22, and the CPU 20A. The optical filter 30B extracts the plurality of pieces of band light from the incident light incident on the objective lens 12 and the imaging unit 13. The imaging element 22 images the plurality of pieces of band light extracted from the incident light by the optical filter 30B. The CPU 20A outputs the band image data obtained by imaging the band light selected by the imaging element 22 according to the imaging condition determined based on the field of view, among the plurality of pieces of band light. Therefore, with the present configuration, it is possible to prevent the band image obtained by imaging the selected band light from being insufficient in the light amount as compared with a case where the selected band light is imaged regardless of the field of view.

Further, in the present first embodiment, the imaging condition is a condition determined based on the field of view and the subject distance, and is a condition in which the input light amount to the imaging element 22 is maximized. Therefore, with the present configuration, the band light in which the input light amount to the imaging element 22 is maximized is imaged as compared with the case where the selected band light is imaged regardless of the subject distance. Therefore, it is possible to prevent the band image from being insufficient in the light amount.

Further, in the present first embodiment, the imaging element 22 is an image sensor. The optical filters 30B are a plurality of optical filters that selectively guide the plurality of pieces of band light to the imaging element 22. The plurality of optical filters 30B are switched on the optical axis OA of the objective lens 12 and the imaging unit 13. Therefore, with the present configuration, it is possible to cause the imaging element 22 to selectively image the plurality of pieces of band light.

Further, in the present first embodiment, the third band light and the fourth band light are the short-wavelength infrared band light and are the high transmittance band light having higher atmospheric transmittance than other pieces of band light. Therefore, with the present configuration, it is possible to increase the input light amount of the short-wavelength infrared band light to the imaging element 22 as compared with a case where the third band light or the fourth band light is not the high transmittance band light.

Further, in the first embodiment described above, the example of the aspect in which the controller 20 controls the imaging apparatus 10 based on the signal transmitted from the controlling device 34, which is separate from the imaging apparatus 10, has been described. However, the technique of the present disclosure is not limited thereto. For example, the imaging apparatus 10 may comprise a display and a reception device, and may have the same functions as the controlling device 34.

Further, in the first embodiment, the example of the aspect in which the image acquisition unit 45 performs the live view imaging method of reading out the band image data at a constant period and transmitting the band image data to the controlling device 34 via the communication I/F 18 has been described. However, the technique of the present disclosure is not limited thereto. In a case where a still image capturing instruction is received from the user, the image acquisition unit 45 may perform still image capturing for one frame, or may perform still image capturing for a plurality of frames in continuous capturing.

Second Embodiment

In the first embodiment, the example of the aspect has been described in which the imaging apparatus 10 is operated via the controlling device 34 such that the user selects the band light and the optical filter 30B causing the selected band light to transmit is disposed on the optical axis OA. In the present second embodiment, an example of an aspect will be described in which the imaging apparatus 10 is controlled such that the CPU 20A focuses on a specific subject designated by the user from within the subject S and a contrast of a specific subject image indicating the specific subject in the band image is maximized. In the present second embodiment, the identical reference numerals are assigned to components identical to the components described in the first embodiment, and the description thereof will be omitted.

In the present second embodiment, the CPU 20A reads out an imaging control program 31A (refer to FIG. 5) from the ROM 20B and executes the readout imaging control program 31A to further operate as a specific subject setting unit 46.

Figure 8:
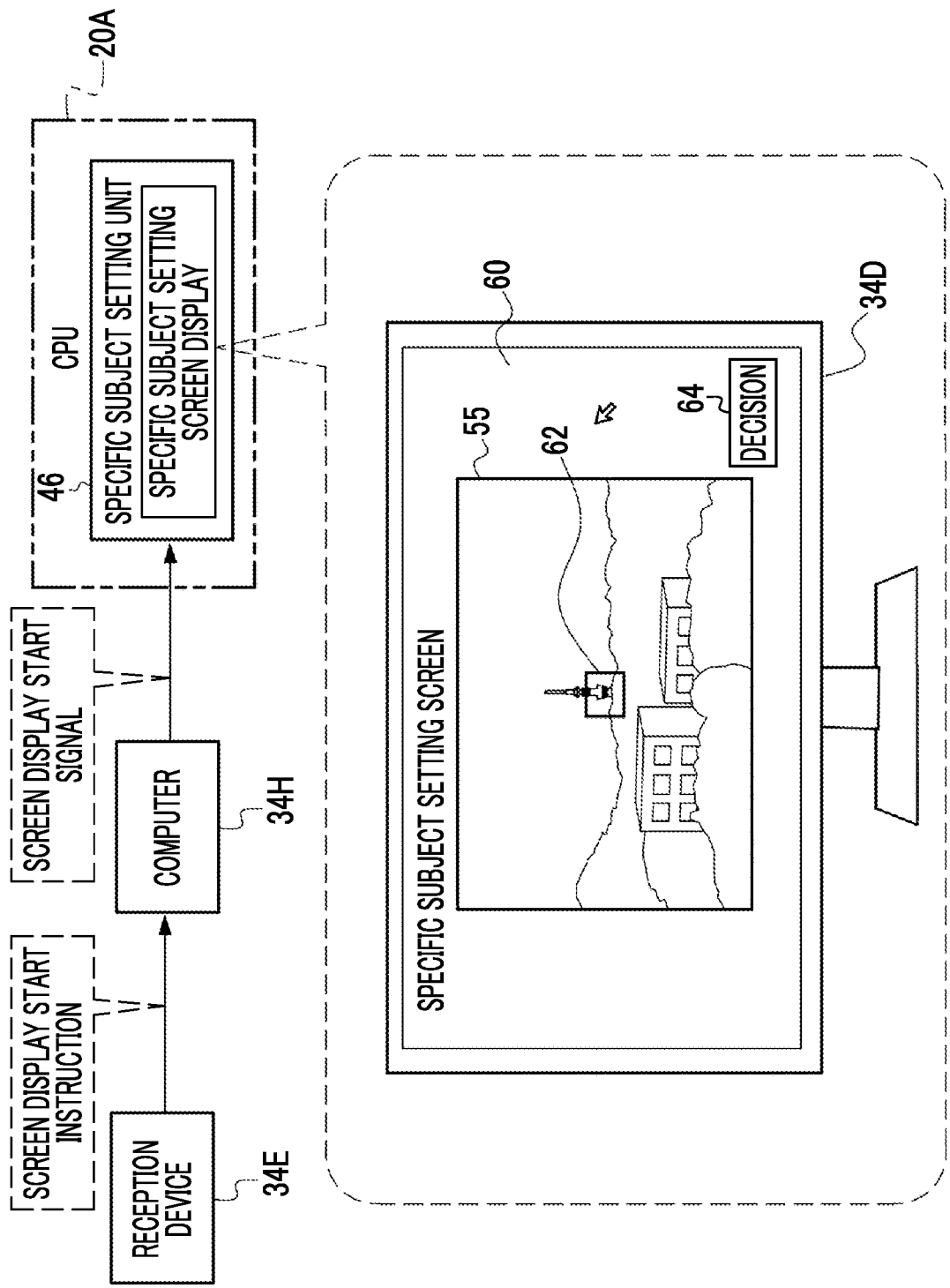
FIG. 8 is a conceptual diagram showing an example of an aspect in which a specific subject setting screen is displayed on a computer monitor in a second embodiment.

In the imaging control processing according to the present second embodiment, the specific object within the subject S is set as the specific subject. As shown in FIG. 8 as an example, in a case where the specific object within the subject S is set as the specific subject, for example, the reception device 34E outputs a screen display start instruction to the computer 34H in response to the operation by the user. The screen display start instruction is an instruction to start the display of a specific subject setting screen 60 on the display 34D.

The computer 34H generates a screen display start signal based on the screen display start instruction input from the reception device 34E. The computer 34H outputs the generated screen display start signal to the specific subject setting unit 46. The specific subject setting unit 46 performs display control of the specific subject setting screen 60 based on the screen display start signal.

Specifically, the specific subject setting unit 46 generates screen data indicating the specific subject setting screen 60 and transmits the generated screen data to the controlling device 34. The controlling device 34 displays the specific subject setting screen 60 on the display 34D based on the received screen data.

The specific subject setting screen 60 includes a band moving image 55, a rectangular frame 62, and a decision button 64. The band moving image 55 is displayed at a center of the specific subject setting screen 60. The band moving image 55 is a moving image having a frame rate of 60 fps, which is composed of the band image. The frame 62 is superimposed and displayed at a central portion of the band image. The frame 62 is used for setting the specific subject by the user. The decision button 64 is operated by the user in a case where the setting of the specific subject is output to the computer 34H.

Figure 9:
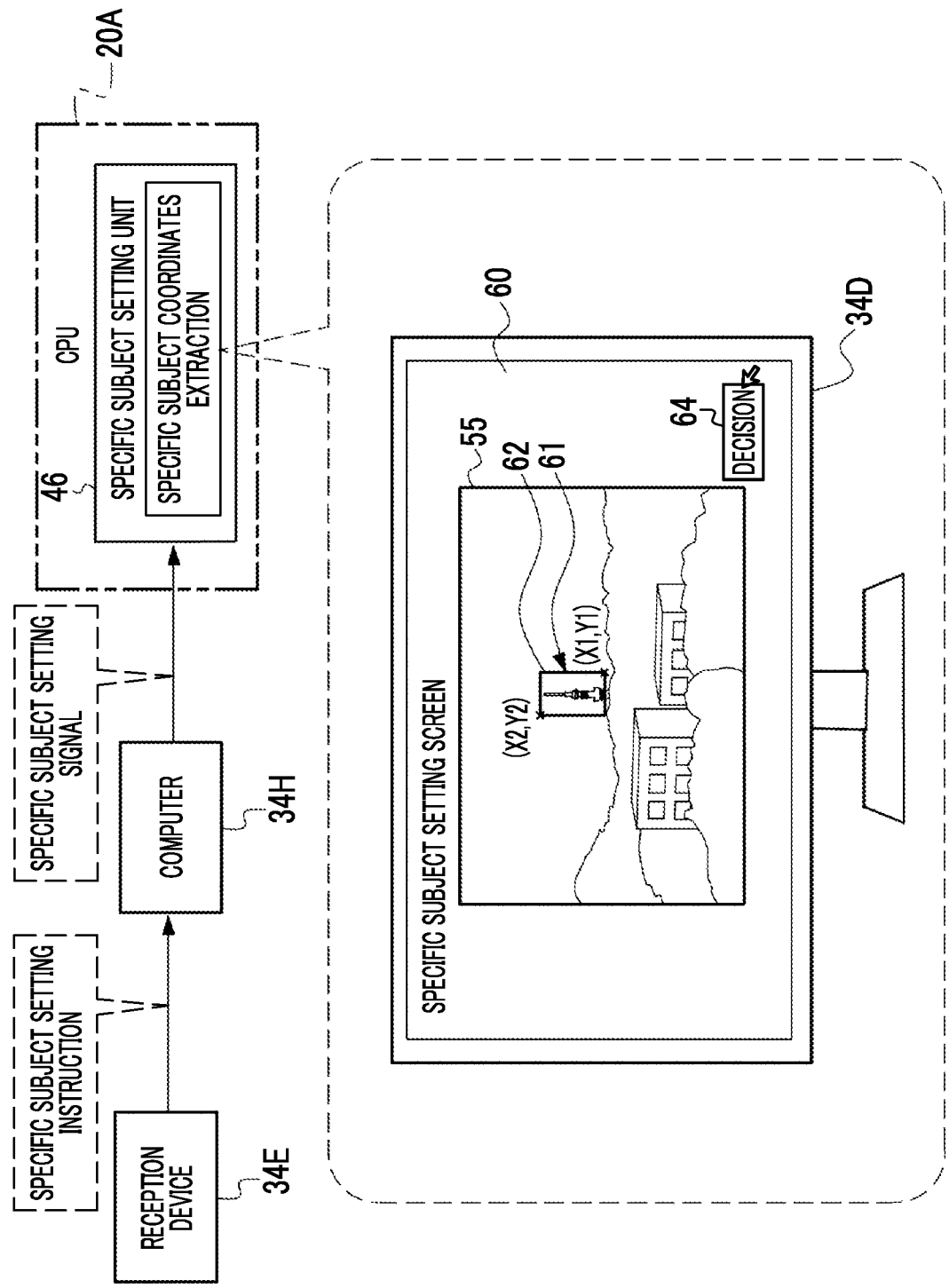
FIG. 9 is a conceptual diagram showing an example of an aspect in which a specific subject is designated on the specific subject setting screen.

As shown in FIG. 9 as an example, a position and size of the frame 62 can be changed. The CPU 20A performs control of changing the position and size of the frame 62 within the specific subject setting screen 60 in response to the instruction from the reception device 34E. After the position and size of the frame 62 are changed, the user clicks the decision button 64 with the mouse of the reception device 34E to cause the reception device 34E to output a specific subject setting instruction to the computer 34H. The computer 34H generates a specific subject setting signal based on the specific subject setting instruction input from the reception device 34E and transmits the generated specific subject setting signal to the specific subject setting unit 46. The specific subject setting unit 46 designates a specific subject image 61 among the band images based on the received specific subject setting signal. The specific subject image 61 is an image surrounded by the frame 62 within the band image. Further, the specific subject setting unit 46 extracts coordinates of the specific subject image 61. For example, the specific subject setting unit 46 extracts lower right and upper left coordinates of the specific subject image 61 as specific subject coordinates.

Figure 10:
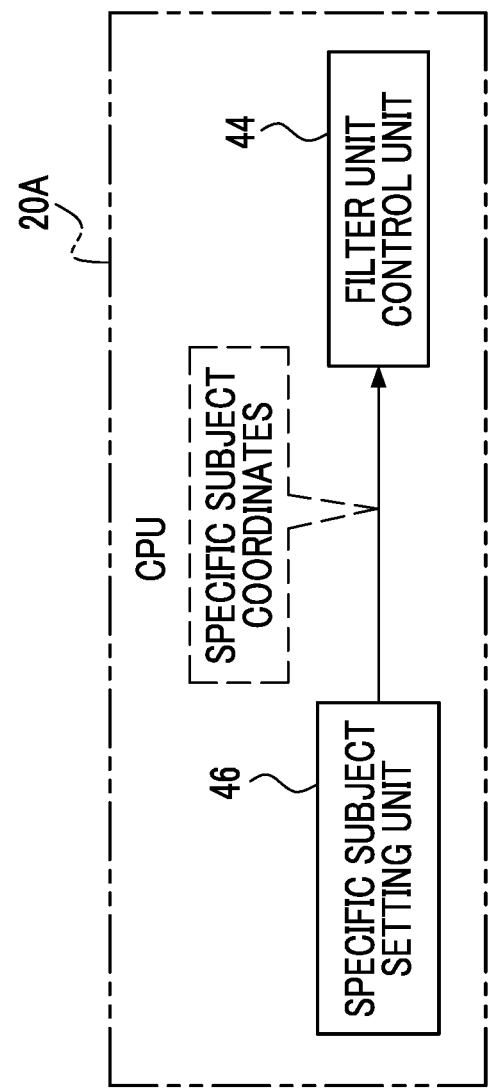
FIG. 10 is a block diagram showing an example of a main part function of a CPU included in an imaging apparatus according to the second embodiment.

As shown in FIG. 10 as an example, the specific subject setting unit 46 outputs the extracted specific subject coordinates to the filter unit control unit 44. The filter unit control unit 44 performs filter switching control of selecting the band light based on the specific subject coordinates input from the specific subject setting unit 46 and the imaging condition and of causing the filter unit 30 to dispose the optical filter 30B causing the selected band light to transmit on the optical axis OA. The imaging apparatus 10 stops the output of the band image data to the controlling device 34 while the filter switching control is performed. Thus, the display of the display 34D is stopped for several seconds. Hereinafter, the filter switching control will be specifically described.

Figure 11:
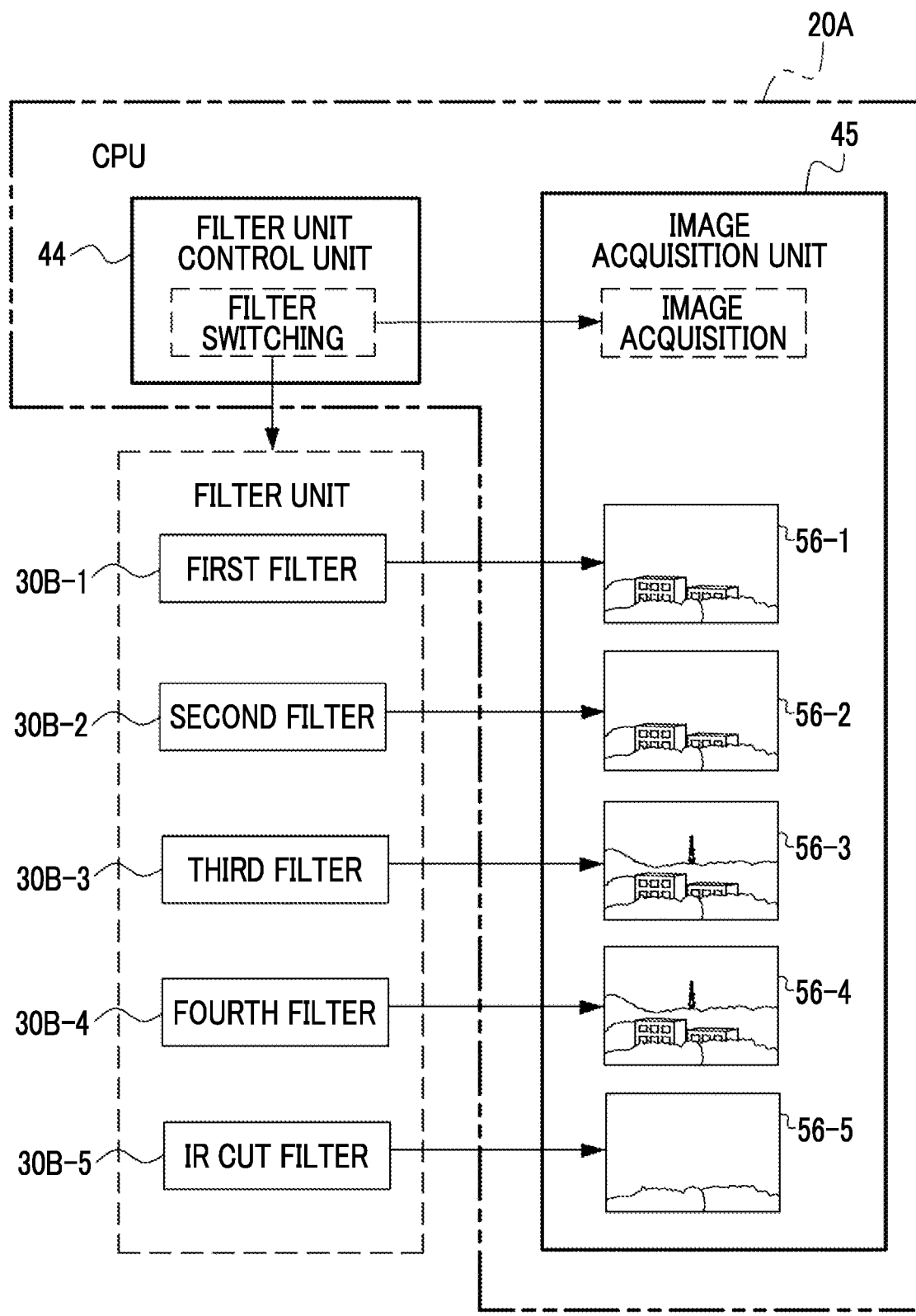
FIG. 11 is a block diagram showing an example of a main part function of the CPU included in the imaging apparatus according to the second embodiment.

As shown in FIG. 11 as an example, the filter unit control unit 44 causes the filter unit 30 to switch the first to fifth optical filters 30B-1 to 30B-5 at a period of a several tenths of a second (for example, a thirtieth of a second). During this period, the imaging element 22 images the band light transmitted through each optical filter 30B at a timing of a several tenths of a second (for example, a thirtieth of a second). The band image data obtained by imaging is stored in the RAM 20C.

The image acquisition unit 45 reads out the band image data from the RAM 20C. The band image data includes the first to fifth band images 56-1 to 56-5. The first band image 56-1 is an image obtained by imaging the first band light by the imaging element 22. The second band image 56-2 is an image obtained by imaging the second band light by the imaging element 22. The third band image 56-3 is an image obtained by imaging the third band light by the imaging element 22. The fourth band image 56-4 is an image obtained by imaging the fourth band light by the imaging element 22. The fifth band image 56-5 is an image obtained by imaging the fifth band light by the imaging element 22. Hereinafter, in a case where it is not necessary to distinguishably describe between the first to fifth band images 56-1 to 56-5, the images are comprehensively referred to as "band image 56".

Figure 12:
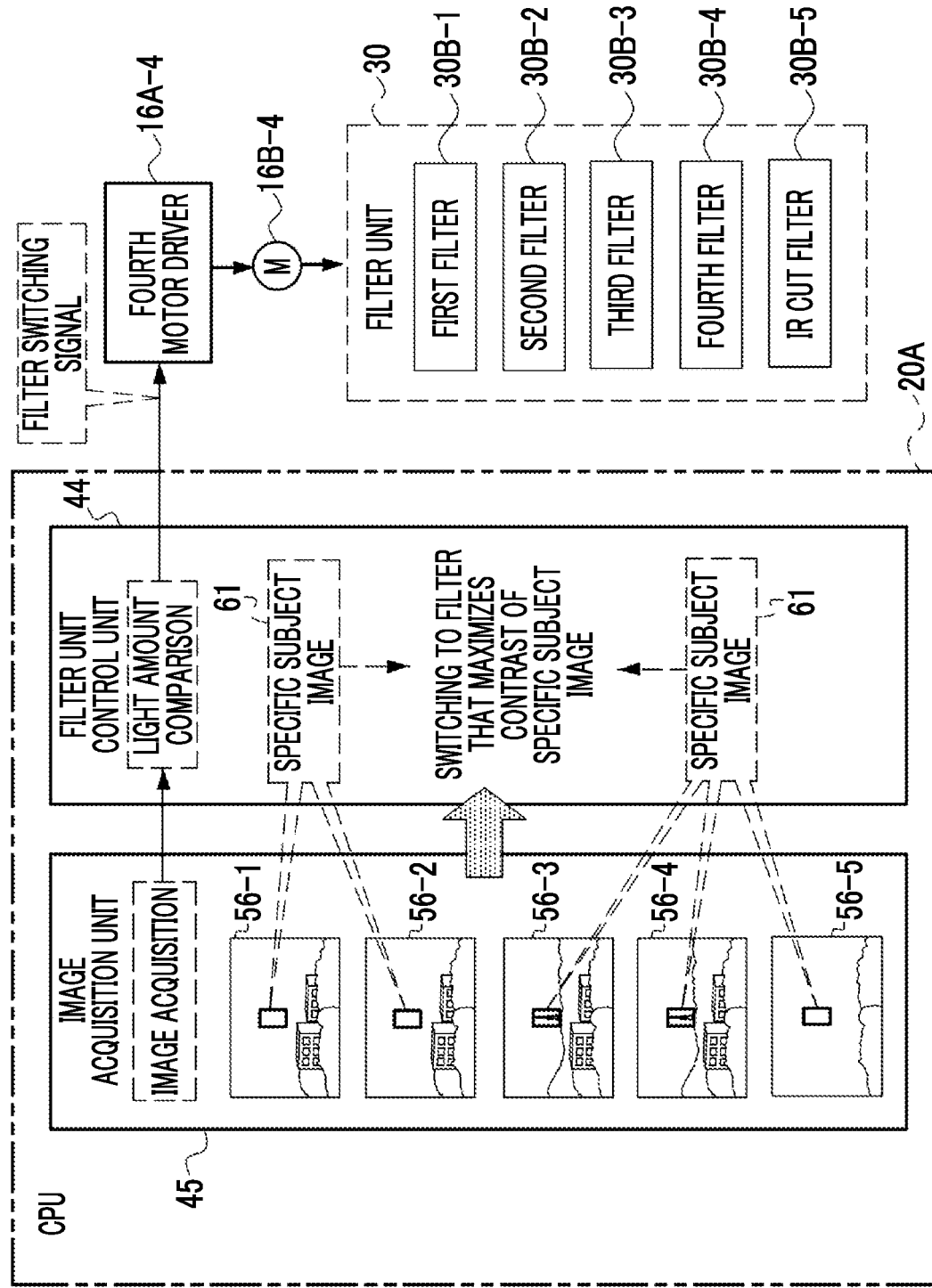
FIG. 12 is a block diagram showing an example of a main part function of the CPU included in the imaging apparatus according to the second embodiment.

As shown in FIG. 12 as an example, the filter unit control unit 44 cuts out the specific subject image 61 from each of the first to fifth band images 56-1 to 56-5 based on the specific subject coordinates input from the specific subject setting unit 46.

In the present second embodiment, the imaging condition is a condition in which a contrast of the specific subject image 61 is maximized. That is, the filter unit control unit 44 performs control of causing the filter unit 30 to dispose the optical filter 30B that maximizes the contrast of the specific subject image 61 among the plurality of optical filters 30B on the optical axis OA.

The filter unit control unit 44 compares specific subject images 61 cut out from the first to fifth band images 56-1 to 56-5 to detect the band light at which the contrast of the specific subject image 61 is maximized. In the example of FIG. 11, the long-range subject S3 is not shown in the specific subject images 61 cut out from the first, second, and fifth band images 56-1, 56-2, and 56-5. The long-range subject S3 is shown in the specific subject images 61 cut out from the third and fourth band images 56-3 and 56-4. Therefore, the specific subject image 61 cut out from the third or fourth band image 56-3 or 56-4 is the specific subject image 61 having a maximum contrast.

For example, in a case where the specific subject image 61 cut out from the third band image 56-3 has the maximum contrast, the filter unit control unit 44 performs control of causing the filter unit 30 to dispose the third optical filter 30B-3 on the optical axis OA. Specifically, the filter unit control unit 44 outputs the filter switching signal for causing the fourth motor driver 16A-4 to dispose the third optical filter 30B-3 on the optical axis OA. The fourth motor driver 16A-4 drives the fourth motor 16B-4 based on the filter switching signal input from the filter unit control unit 44. The power of the driven fourth motor 16B-4 is transmitted to the disk 30A of the filter unit 30. Accordingly, the third optical filter 30B-3 is disposed on the optical axis OA.

Figure 13:
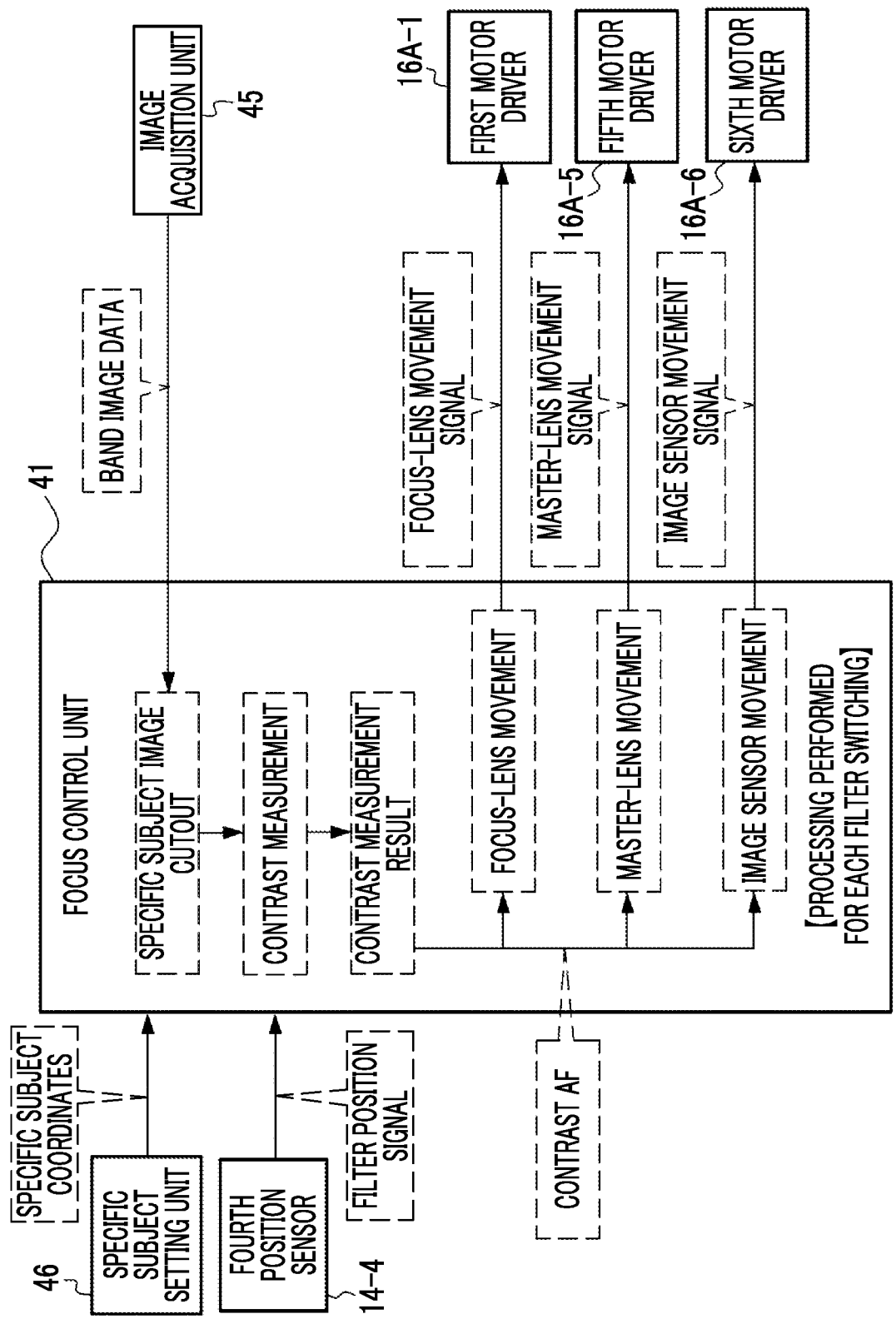
FIG. 13 is a block diagram showing an example of a main part function of the CPU included in the imaging apparatus according to the second embodiment.

Further, the specific subject is used as a target to be focused. As shown in FIG. 13 as an example, the focus control unit 41 performs a contrast AF using the contrast of the specific subject image 61 indicating the specific subject. Specifically, the focus control unit 41 acquires the band image data acquired by the image acquisition unit 45 and the specific subject coordinates extracted by the specific subject setting unit 46. The focus control unit 41 cuts out the specific subject image 61 from the band image included in the band image data based on the specific subject coordinates, and measures the contrast of the cutout specific subject image 61. The focus control unit 41 outputs the focus-lens movement signal to the first motor driver 16A-1 based on a contrast measurement result to move the focus-lens group 24. The focus control unit 41 moves the focus-lens group 24 while feeding back the contrast measurement result to adjust the position of the focus-lens group 24 such that the contrast of the specific subject image 61 is maximized. Since the same applies to the adjustment of the positions of the master-lens group 32 and the imaging element 22, the description thereof will be omitted.

A filter-rotation position signal output from the fourth position sensor 14-4 is input to the focus control unit 41. The focus control unit 41 executes the contrast AF each time the filter-rotation position signal is input, that is, each time the optical filter 30B is switched on the optical axis OA. This is because the wavelength of the band light incident on the imaging element 22 changes with the switching of the optical filter 30B and thus image-forming deviation occurs due to chromatic aberration. The focus control unit 41 moves at least one of the focus-lens group 24, the master-lens group 32, or the imaging element 22 to correct the image-forming deviation due to the switching between the optical filters 30B. Accordingly, the filter unit control unit 44 decides which of the plurality of optical filters 30B is to be used based on the first to fifth band images 56-1 to 56-5 focused on the specific subject.

Figure 14:
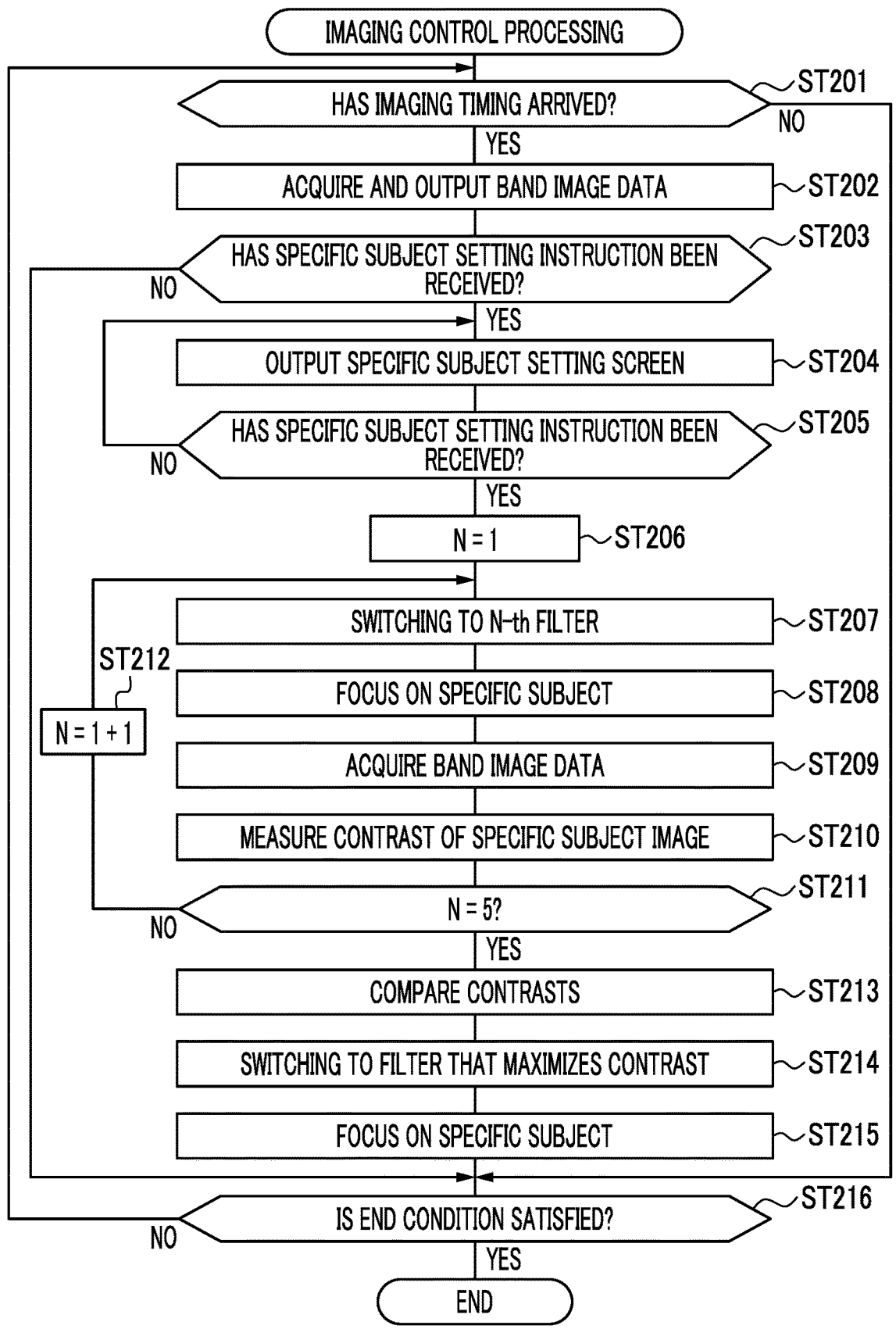
FIG. 14 is a flowchart showing an example of a flow of imaging control processing according to the second embodiment.

Next, an action of the imaging apparatus 10 according to the second embodiment will be described with reference to FIG. 14. The imaging control processing shown in FIG. 14 is realized by the CPU 20A executing the imaging control program 31A. Further, the imaging control processing shown in FIG. 14 is started in a case where the imaging start button of the imaging apparatus 10 is operated.

In the imaging control processing, first, in step ST201, the image acquisition unit 45 determines whether or not the imaging timing has arrived. The imaging timing arrives every several tenths of a second (for example, a sixtieth of a second). In step ST201, in a case where the imaging timing has arrived, the determination is positive, and the imaging control processing proceeds to step ST202. In step ST201, in a case where the imaging timing has not arrived, the determination is negative, and the imaging control processing proceeds to step ST216.

In step ST202, the image acquisition unit 45 reads out, from the RAM 20C, the band image data acquired by the imaging element 22 and stored in the RAM 20C, and outputs the readout band image data to the controlling device 34. The controlling device 34 displays the band image 56 on the display 34D based on the band image data input from the image acquisition unit 45. After that, the imaging control processing proceeds to step ST203.

In step ST203, the specific subject setting unit 46 determines whether or not the screen display start instruction has been received. In step ST203, in a case where the screen display start instruction has been received, the determination is positive, and the imaging control processing proceeds to step ST204. In step ST203, in a case where the screen display start instruction has not been received, the determination is negative, and the imaging control processing proceeds to step ST215.

In step ST204, the specific subject setting unit 46 outputs the specific subject setting screen 60 to the controlling device 34. The controlling device 34 displays the specific subject setting screen 60 input from the specific subject setting unit 46 on the display 34D. After that, the imaging control processing proceeds to step ST205.

In step ST205, the specific subject setting unit 46 determines whether or not the specific subject setting instruction has been received. In step ST205, in a case where the specific subject setting instruction has been received, the determination is positive, and the imaging control processing proceeds to step ST206. In step ST205, in a case where the specific subject setting instruction has not been received, the determination is negative, and the imaging control processing proceeds to step ST204.

In step ST206, the filter unit control unit 44 sets N=1. After that, the imaging control processing proceeds to step ST207.

In step ST207, the filter unit control unit 44 performs control of causing the filter unit 30 to dispose an Nth optical filter 30B on the optical axis OA. After that, the imaging control processing proceeds to step ST208.

In step ST208, the focus control unit 41 focuses on the specific subject using the contrast AF. After that, the imaging control processing proceeds to step ST209.

In step ST209, the image acquisition unit 45 acquires the band image data from the RAM 20C. This band image data is image data that is obtained by imaging the band light transmitted through the Nth optical filter 30B using the imaging element 22 and that indicates the band image 56 focused on the specific subject. The image acquisition unit 45 outputs the acquired band image data to the filter unit control unit 44. After that, the imaging control processing proceeds to step ST210.

In step ST210, the filter unit control unit 44 measures the contrast of the specific subject image 61 in the band image 56 indicated by the band image data input from the image acquisition unit 45. After that, the imaging control processing proceeds to step ST211.

In step ST211, the filter unit control unit 44 determines whether or not a condition of N=5 is satisfied. In step ST211, in a case where the condition of N=5 is satisfied, the determination is positive, and the imaging control processing proceeds to step ST213. In step ST211, in a case where the condition of N=5 is not satisfied, the determination is negative, and the imaging control processing proceeds to step ST212.

In step ST212, the filter unit control unit 44 increments N by 1. After that, the imaging control processing proceeds to step ST207.

In step ST213, the filter unit control unit 44 compares contrasts of the five specific subject images 61 obtained by switching the five optical filters 30B. After that, the imaging control processing proceeds to step ST214.

In step ST214, the filter unit control unit 44 causes the filter unit 30 to switch the optical filter 30B that maximizes the contrast of the specific subject image 61 among the five optical filters 30B on the optical axis OA. After that, the imaging control processing proceeds to step ST215.

In step ST215, the focus control unit 41 moves the focus-lens group 24, the master-lens group 32, and the imaging element 22 to a position focused on the specific subject using the contrast AF. After that, the imaging control processing proceeds to step ST216.

In step ST216, the image acquisition unit 45 determines whether or not the end condition is satisfied. An example of the end condition includes the same condition as that in the first embodiment. In step ST216, in a case where the end condition is satisfied, the determination is positive, and the imaging control processing ends. In step ST216, in a case where the end condition is not satisfied, the determination is negative, and the imaging control processing proceeds to step ST201.

As described above, in the present second embodiment, the imaging apparatus 10 comprises the filter unit 30 capable of switching between the plurality of optical filters 30B on the optical axis OA. The filter unit control unit 44 performs control of causing the filter unit 30 to switch the plurality of optical filters 30B on the optical axis OA based on the imaging condition in which the contrast of the specific subject image 61 is maximized. Therefore, with the present configuration, it is possible to easily perform the switching of the optical filters 30B as compared with a case where the filter unit 30 is manually controlled.

Further, among the plurality of optical filters 30B, the optical filter 30B switched on the optical axis OA is the optical filter 30B determined according to the contrasts of the plurality of specific subject images 61. Further, the plurality of specific subject images 61 are images obtained by imaging the plurality of pieces of band light for the specific subject, which is determined in response to the specific subject setting instruction received by the reception device 34E as the target to be focused, by the imaging element 22. Therefore, with the present configuration, it is possible to dispose the optical filter 30B necessary for obtaining the specific subject image 61 having a contrast intended by the user on the optical axis OA.

Further, the focus control unit 41 moves at least one of the focus-lens group 24, the master-lens group 32, or the imaging element 22 to correct the image-forming deviation due to the switching between the plurality of optical filters 30B. Therefore, with the present configuration, it is possible to acquire the band image 56 with high sharpness as compared with a case where the image-forming deviation is not corrected by the switching between the plurality of optical filters 30B.

In the second embodiment, the filter unit control unit 44 performs the control of causing the filter unit 30 to dispose the optical filter 30B that maximizes the contrast of the specific subject image 61 on the optical axis OA. However, the technique of the present disclosure is not limited thereto. The filter unit control unit 44 may perform control of disposing the optical filter 30B causing the band light corresponding to the specific subject image 61 having the contrast exceeding a default value to transmit, among the plurality of optical filters 30B, on the optical axis OA. The default value is a value derived as a lower limit value of the contrast by a test using an actual machine and/or a computer simulation or the like. The default value may be a fixed value or a variable value. Further, the default value may be changed according to at least one of the field of view or the subject distance. With the present configuration, the imaging element 22 images the band light corresponding to the specific subject image 61 having the contrast exceeding the default value. Therefore, it is possible to obtain the band image 56 with high contrast by the imaging using the imaging element 22.

Third Embodiment

In the first and second embodiments, the example of the aspect has been described in which the band image data indicating the band image 56 is output to the controlling device 34. In the present third embodiment, an example of an aspect will be described in which composite image data indicating a composite image of the plurality of band images 56 is output to the controlling device 34. Hereinafter, the imaging apparatus 10 according to the present third embodiment will be described. In the present third embodiment, components identical to the components described in the first and second embodiments are represented by the identical reference numerals as those in the first and second embodiments, and the description thereof will be omitted.

In the present third embodiment, the CPU 20A reads out an imaging control program 31B (refer to FIG. 5) from the ROM 20B and executes the readout imaging control program 31B to perform the imaging control processing. In the imaging control processing according to the present third embodiment, the CPU 20A further operates as an image composition unit 48.

Figure 15:
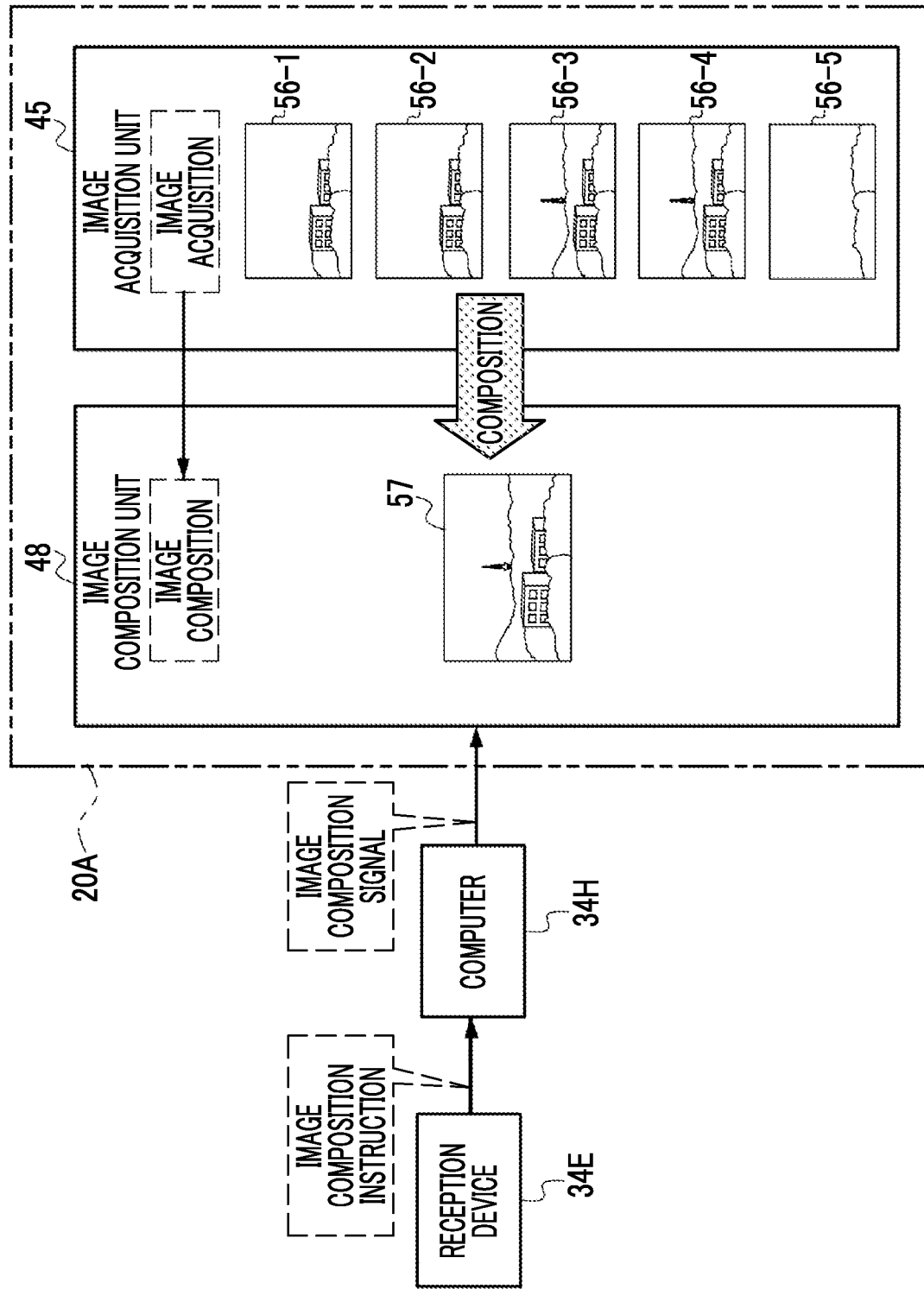
FIG. 15 is a block diagram showing an example of a main part function of a CPU included in an imaging apparatus according to a third embodiment.

In the imaging control processing according to the present third embodiment, as shown in FIG. 15 as an example, the reception device 34E outputs an image composition instruction to the computer 34H in response to the operation by the user. The image composition instruction is an instruction to cause the imaging apparatus 10 to generate the composite image data and output the generated composite image data to the controlling device 34.

The computer 34H generates an image composition signal based on the image composition instruction input from the reception device 34E. The computer 34H outputs the generated image composition signal to the image composition unit 48. The image composition unit 48 composes the plurality of band images 56 obtained by performing the imaging using the imaging element 22 each time the optical filter 30B is switched on the optical axis OA, based on the image composition signal.

Specifically, the imaging element 22 performs the imaging at an imaging timing of a several tenths of a second (for example, a thirtieth of a second) each time the first to fifth optical filters 30B-1 to 30B-5 are switched on the optical axis OA at a period of a several tenths of a second (for example, a thirtieth of a second). The band image data obtained by imaging is stored in the RAM 20C. The image acquisition unit 45 reads out the band image data from the RAM 20C at a period of a fraction of a second (for example, a sixth of a second). That is, the image acquisition unit 45 acquires the band image data every time the disk 30A makes one rotation and the imaging is performed five times. The band image data acquired by the image acquisition unit 45 is data including the first to fifth band images 56-1 to 56-5. In the image composition unit 48, the band image data is acquired from the image acquisition unit 45 and the acquired band image data is added to generate the composite image data. The composite image data is data indicating a composite image 57 in which the band images 56-1 to 56-5 are superimposed.

The image composition unit 48 stores the generated composite image data in the RAM 20C. The image acquisition unit 45 reads out the composite image data from the RAM 20C and outputs the readout composite image data to the controlling device 34. The controlling device 34 displays the composite image 57 on the display 34D based on the composite image data input from the image acquisition unit 45. Since the composite image 57 is an image obtained by compositing the first to fifth band images 56-1 to 56-5, the composite image 57 has a larger amount of light than each of the first to fifth band images 56-1 to 56-5.

Figure 16:
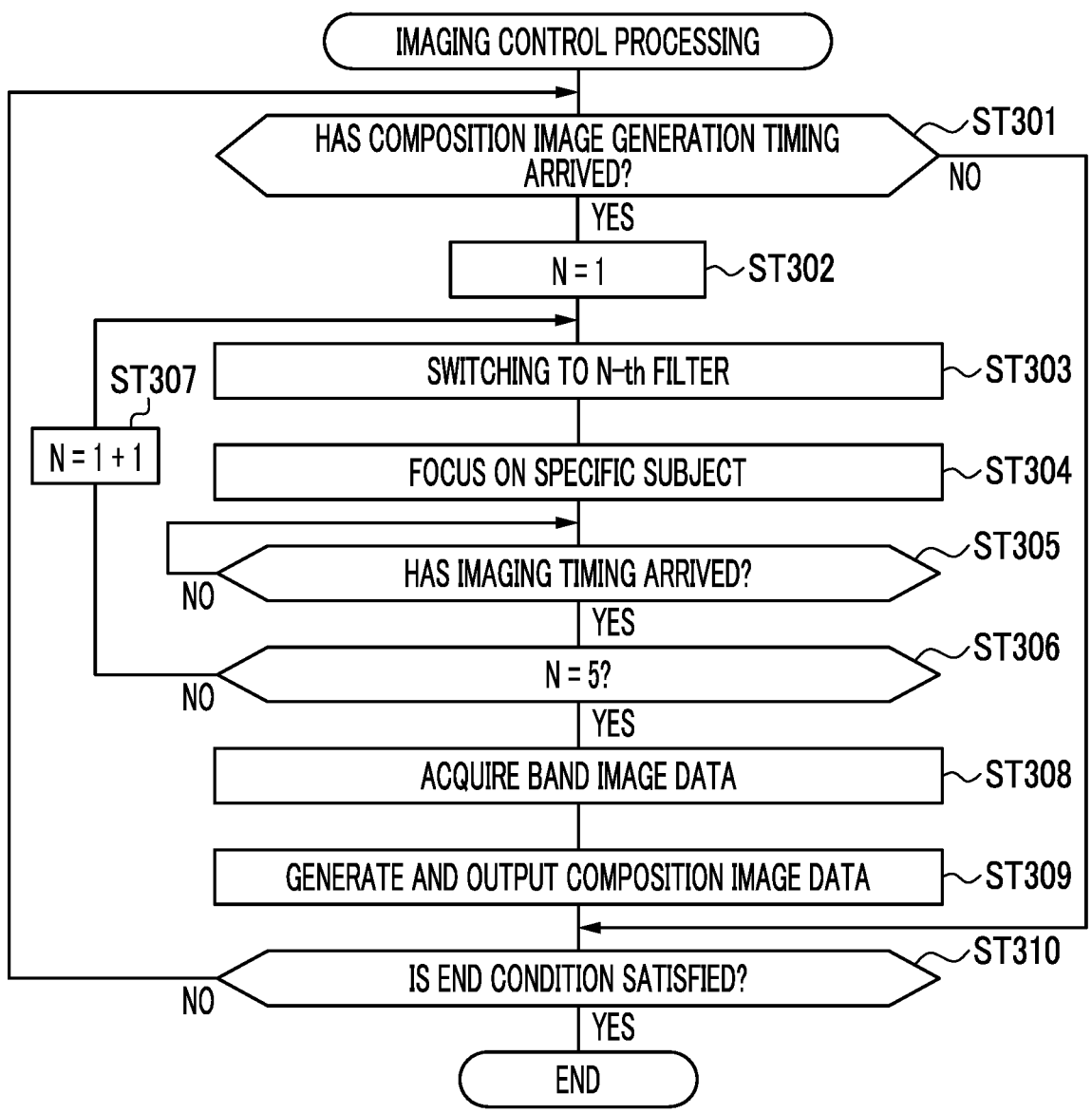
FIG. 16 is a flowchart showing an example of a flow of imaging control processing according to the third embodiment.

Next, an action of the imaging apparatus 10 according to the third embodiment will be described with reference to FIG. 16. The imaging control processing shown in FIG. 16 is realized by the CPU 20A executing the imaging control program 31B. Further, the imaging control processing shown in FIG. 16 is started in a case where the imaging start button of the imaging apparatus 10 is operated.

In the imaging control processing, first, in step ST301, the image acquisition unit 45 determines whether or not a composite image generation timing has arrived. The composite image generation timing arrives every fraction of a second (for example, a sixth of a second). In step ST301, in a case where the composite image generation timing has arrived, the determination is positive, and the imaging control processing proceeds to step ST302. In step ST301, in a case where the composite image generation timing has not arrived, the determination is negative, and the imaging control processing proceeds to step ST309.

In step ST302, the filter unit control unit 44 sets N=1. After that, the imaging control processing proceeds to step ST303.

In step ST303, the filter unit control unit 44 performs control of causing the filter unit 30 to dispose the Nth optical filter 30B on the optical axis OA. After that, the imaging control processing proceeds to step ST304.

In step ST304, the focus control unit 41 moves the focus-lens group 24, the master-lens group 32, and the imaging element 22 to a position focused on the specific subject using the contrast AF. After that, the imaging control processing proceeds to step ST305.

In step ST305, the image acquisition unit 45 determines whether or not the imaging timing has arrived. The imaging timing arrives every several tenths of a second (for example, a thirtieth of a second). In step ST305, in a case where the imaging timing has arrived, the imaging element 22 performs the imaging, and the band image data obtained by the imaging is stored in the RAM 20C. After that, the imaging control processing proceeds to step ST306. In step ST305, in a case where the imaging timing has not arrived, the determination is negative, and the imaging control processing proceeds to step ST305.

In step ST306, the filter unit control unit 44 determines whether or not the condition of N=5 is satisfied. In step ST306, in a case where the condition of N=5 is satisfied, the determination is positive, and the imaging control processing proceeds to step ST308. In step ST306, in a case where the condition of N=5 is not satisfied, the determination is negative, and the imaging control processing proceeds to step ST307.

In step ST307, the filter unit control unit 44 increments N by 1. After that, the imaging control processing proceeds to step ST303.

In step ST308, the image acquisition unit 45 acquires the band image data stored in the RAM 20C while repeating ST302 to ST306 five times. After that, the imaging control processing proceeds to step ST309.

In step ST309, in the image composition unit 48, the band image data is acquired from the image acquisition unit 45 and the acquired band image data is added to generate the composite image data. The image composition unit 48 stores the generated composite image data in the RAM 20C. The image acquisition unit 45 reads out the composite image data from the RAM 20C and outputs the readout composite image data to the controlling device 34. After that, the imaging control processing proceeds to step ST310.

In step ST310, the image acquisition unit 45 determines whether or not the end condition is satisfied. Examples of the end condition include an operation of an image composition stop button. The image composition stop button may be displayed as a soft key on the display 34D of the controlling device 34, for example. Specifically, the image composition stop button is displayed on a screen on which the band moving image is displayed. In step ST310, in a case where the end condition is satisfied, the determination is positive, and the imaging control processing ends. In step ST310, in a case where the end condition is not satisfied, the determination is negative, and the imaging control processing proceeds to step ST301.

As described above, in the present third embodiment, the image composition unit 48 composes the first to fifth band images 56-1 to 56-5 obtained by performing the imaging using the imaging element 22 each time the optical filter 30B is switched on the optical axis OA. Therefore, with the present configuration, it is possible to obtain an image with good image quality as compared with a case where the image composition unit 48 does not compose the first to fifth band images 56-1 to 56-5.

Fourth Embodiment

In the first to third embodiments described above, the example of the aspect has been described in which the band light obtained by using the filter unit 30 is imaged by the imaging element 22 to acquire the band image data. In the present fourth embodiment, an example of an aspect will be described in which band light obtained by using a spectral prism is imaged by a plurality of imaging elements to acquire the band image data. In the present fourth embodiment, components identical to the components described in the first to third embodiments are represented by the identical reference numerals as those in the first to third embodiments, and the description thereof will be omitted.

Figure 17:
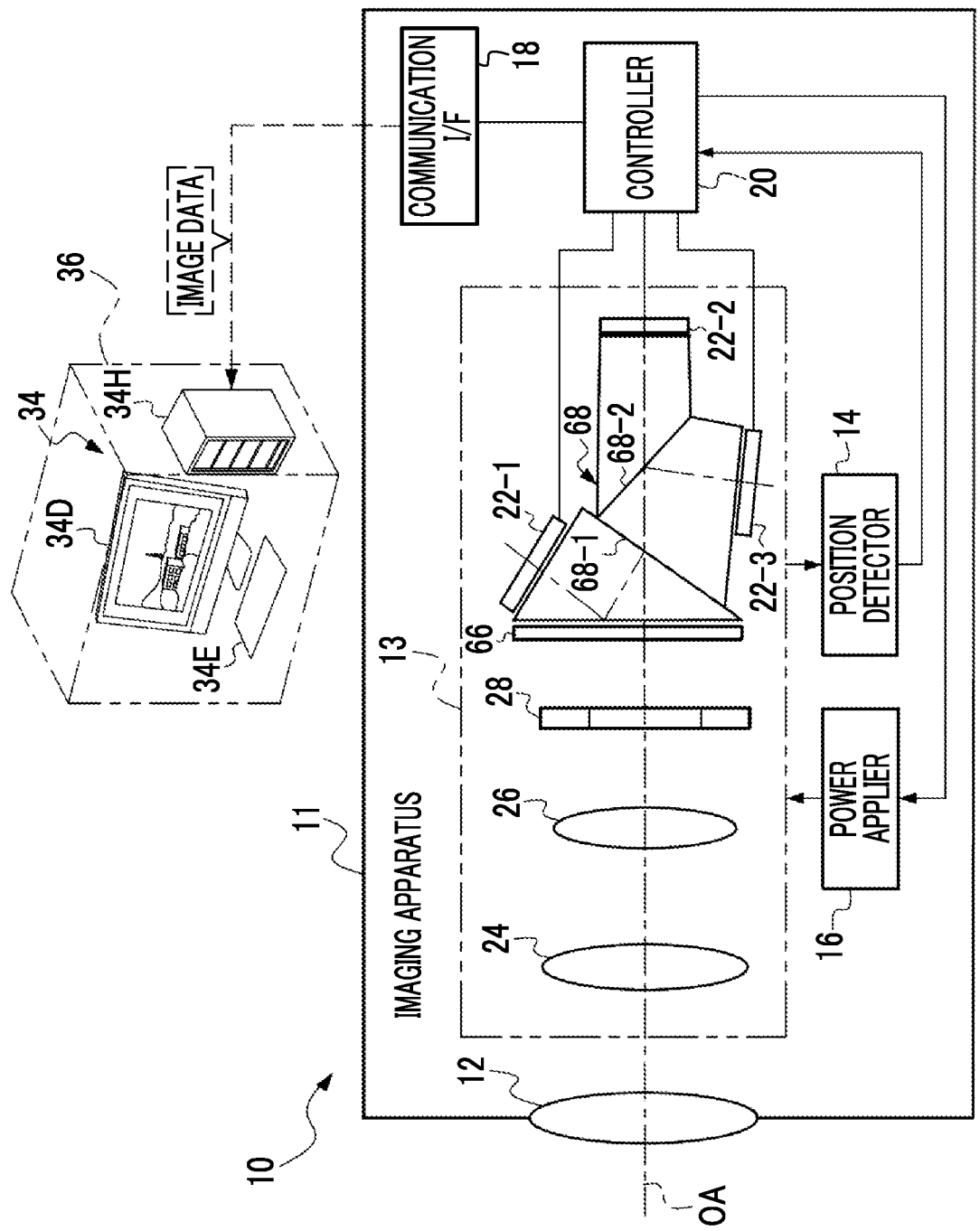
FIG. 17 is a block diagram showing a configuration of an imaging apparatus according to a fourth embodiment.

As shown in FIG. 17 as an example, in the imaging apparatus 10 according to the present fourth embodiment, the optical element includes a light separation element having the spectral prism that splits incident light into a plurality of pieces of band light, and the imaging element 22 includes a plurality of image sensors corresponding to the plurality of pieces of band light. Specifically, the imaging unit 13 comprises an infrared light transmission filter 66 and a spectral prism 68 instead of the filter unit 30. Further, the imaging unit 13 comprises first to third image sensors 22-1 to 22-3 as the imaging element 22. The first to third image sensors 22-1 to 22-3 are, for example, InGaAs sensors having an InGaAs (indium gallium arsenic) layer and capable of imaging the infrared light. The spectral prism 68 is an example of a "spectral prism" according to the technique of the present disclosure. Further, the first to third image sensors 22-1 to 22-3 are examples of a "plurality of image sensors" according to the technique of the present disclosure.

The infrared light transmission filter 66 is an optical filter that absorbs the visible light and causes the infrared light to transmit. The infrared light transmission filter 66 is disposed between the stop 28 and the spectral prism 68. The infrared light transmission filter 66 causes the infrared light near 1000 nm to 1550 nm to transmit among the light incident on the imaging unit 13. The infrared light transmission filter 66 guides transmitted infrared light to the spectral prism 68.

The spectral prism 68 is, for example, a dichroic prism. The dichroic prism is configured by combining a plurality of dichroic mirrors that reflect light of a specific wavelength and transmit light of other wavelengths.

The spectral prism 68 has a first reflecting surface 68-1 and a second reflecting surface 68-2. The first reflecting surface 68-1 reflects, for example, the first band light near 1000 nm and transmits the infrared light having other wavelengths. The first reflecting surface 68-1 guides the reflected first band light near 1000 nm to the first image sensor 22-1. Therefore, the first band light near 1000 nm is incident on the first image sensor 22-1. The second reflecting surface 68-2 reflects, for example, the third band light near 1550 nm and transmits the infrared light having other wavelengths. The second reflecting surface 68-2 guides the reflected third band light near 1550 nm to the third image sensor 22-3. Therefore, the third band light near 1550 nm is incident on the third image sensor 22-3.

The infrared light transmitted through the first reflecting surface 68-1 and the second reflecting surface 68-2 includes the second band light near 1250 nm. The infrared light transmitted through the first reflecting surface 68-1 and the second reflecting surface 68-2 is guided to the second image sensor 22-2. Therefore, the infrared light including the second band light near 1250 nm is incident on the second image sensor 22-2.

The first to third image sensors 22-1 to 22-3 respectively image the incident first band light to third band light according to the imaging timing of a several tenths of a second (for example, a sixtieth of a second) to generate the band image data. The first to third image sensors 22-1 to 22-3 output the generated band image data to the CPU 20A. The CPU 20A stores the band image data input from the first to third image sensors 22-1 to 22-3 in the RAM 20C.

Figure 18:
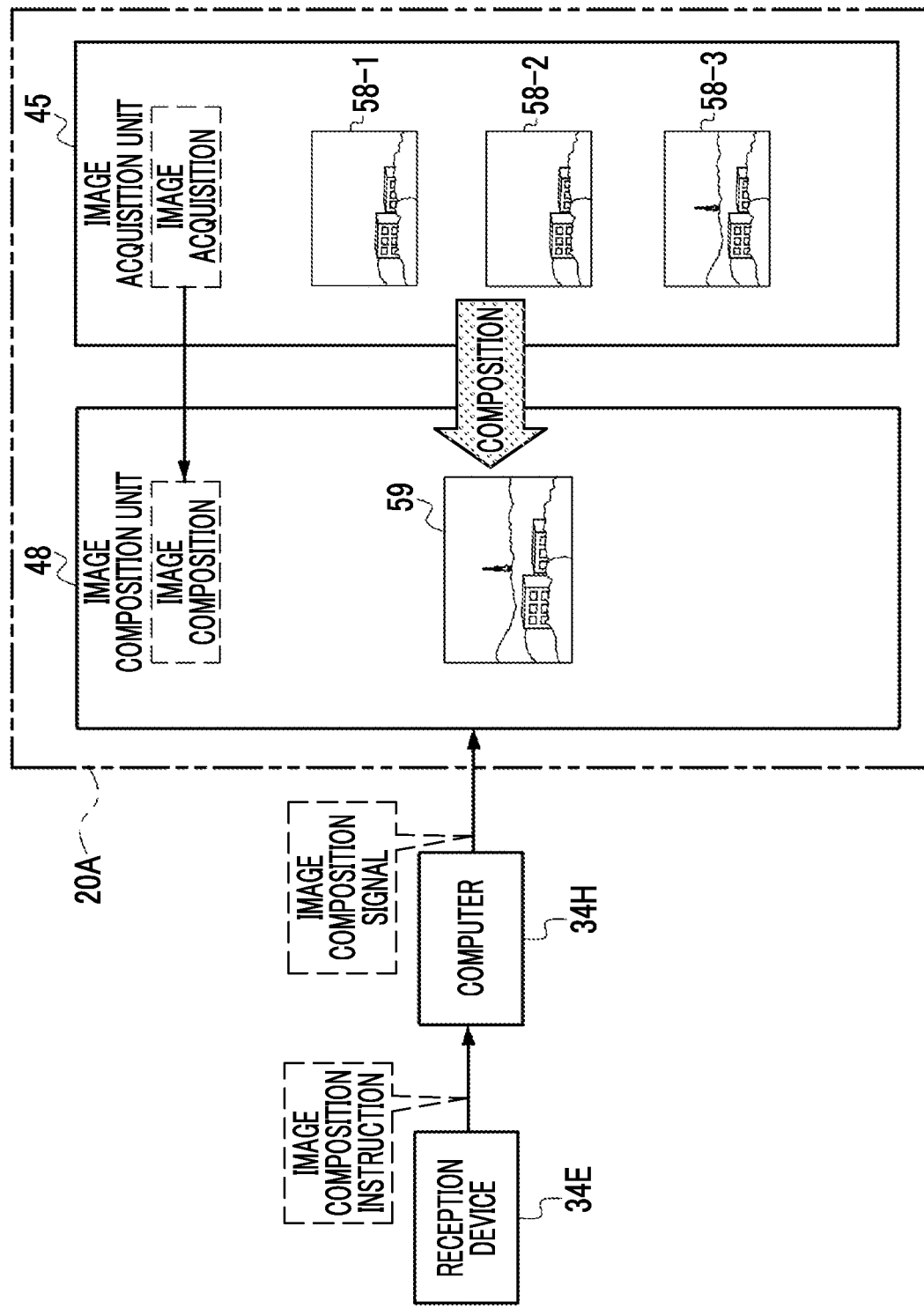
FIG. 18 is a block diagram showing an example of a main part function of a CPU included in the imaging apparatus according to the fourth embodiment.

As shown in FIG. 18 as an example, the band image data generated by the first image sensor 22-1 is data indicating a first band image 58-1 obtained by imaging the first band light near 1000 nm. The band image data generated by the second image sensor 22-2 is data indicating a second band image 58-2 obtained by imaging the second band light near 1250 nm. The band image data generated by the third image sensor 22-3 is data indicating a third band image 58-3 obtained by imaging the third band light near 1550 nm. The image acquisition unit 45 reads out the band image data acquired by the first to third image sensors 22-1 to 22-3 from the RAM 20C and outputs the readout band image data to the image composition unit 48. In the image composition unit 48, the band image data input from the image acquisition unit 45 is added to generate the composite image data. The composite image data is data indicating a composite image 59 in which the first to third band images 58-1 to 58-3 are superimposed.

The image composition unit 48 stores the generated composite image data in the RAM 20C. The image acquisition unit 45 reads out the composite image data from the RAM 20C and outputs the readout composite image data to the controlling device 34. The controlling device 34 displays the composite image 59 on the display 34D based on the composite image data input from the image acquisition unit 45. Since the composite image 59 is an image obtained by compositing the first to third band images 58-1 to 58-3, the composite image 59 has a larger amount of light than each of the first to third band images 56-1 to 56-3.

As described above, in the present fourth embodiment, the image composition unit 48 composes the first to third band images 58-1 to 58-3 obtained by performing the imaging using the first to third image sensors 22-1 to 22-3. Therefore, with the present configuration, it is possible to generate an image having a larger amount of light than an image obtained by performing the imaging using one image sensor.

In the fourth embodiment, the composite image 59 generated from the first to third band images 58-1 to 58-3 is output to the controlling device 34. However, the technique of the present disclosure is not limited thereto. The image acquisition unit 45 may output the image data obtained by performing the imaging using an image sensor corresponding to the band light selected according to the imaging condition, among the first to third image sensors 22-1 to 22-3, to the controlling device 34. According to this configuration, it is possible to image the plurality of pieces of band light in parallel by using the first to third image sensors 22-1 to 22-3.

Fifth Embodiment

In the present fifth embodiment, the imaging apparatus 10 having a distance measurement function will be described. In the present fifth embodiment, components identical to the components described in the first to fourth embodiments are represented by the identical reference numerals as those in the first to fourth embodiments, and the description thereof will be omitted.

In the present fifth embodiment, the CPU 20A reads out an imaging control program 31C (refer to FIG. 5) from the ROM 20B and executes the readout imaging control program 31C to further operate as a distance measurement unit 47.

Figure 19:
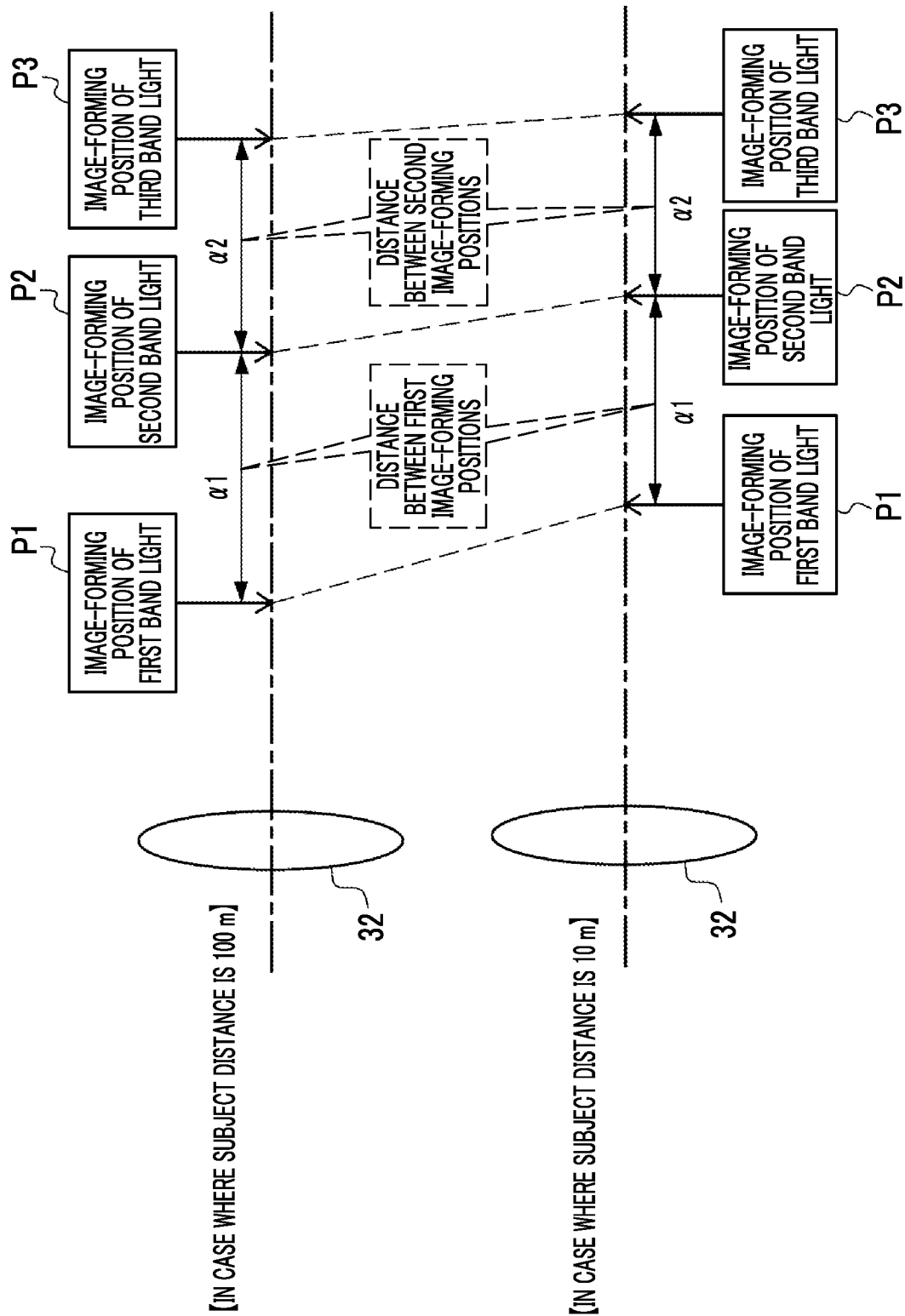
FIG. 19 is an explanatory diagram describing that an image-forming position is different according to a subject distance in a case where imaging is performed using each piece of band light.

As shown in FIG. 19 as an example, in a case where the positions of the focus-lens group 24, the zoom-lens group 26, and the master-lens group 32 are caused to be focused on the subject, which is a fixed state, an image-forming position is changed according to a type of the band light. Further, even in a case where the same band light is used, the image-forming position changes according to the subject distance of the subject to be focused.

A distance between an image-forming position P1 of the first band light and an image-forming position P2 of the second band light is set as a distance between first image-forming positions $\alpha 1$. A distance between the image-forming position P2 of the second band light and an image-forming position P3 of the third band light is set as a distance between second image-forming positions $\alpha 2$. In this case, the distance between first image-forming positions $\alpha 1$ and the distance between second image-forming positions $\alpha 2$ change according to the subject distance of the subject to be focused.

Figure 20:
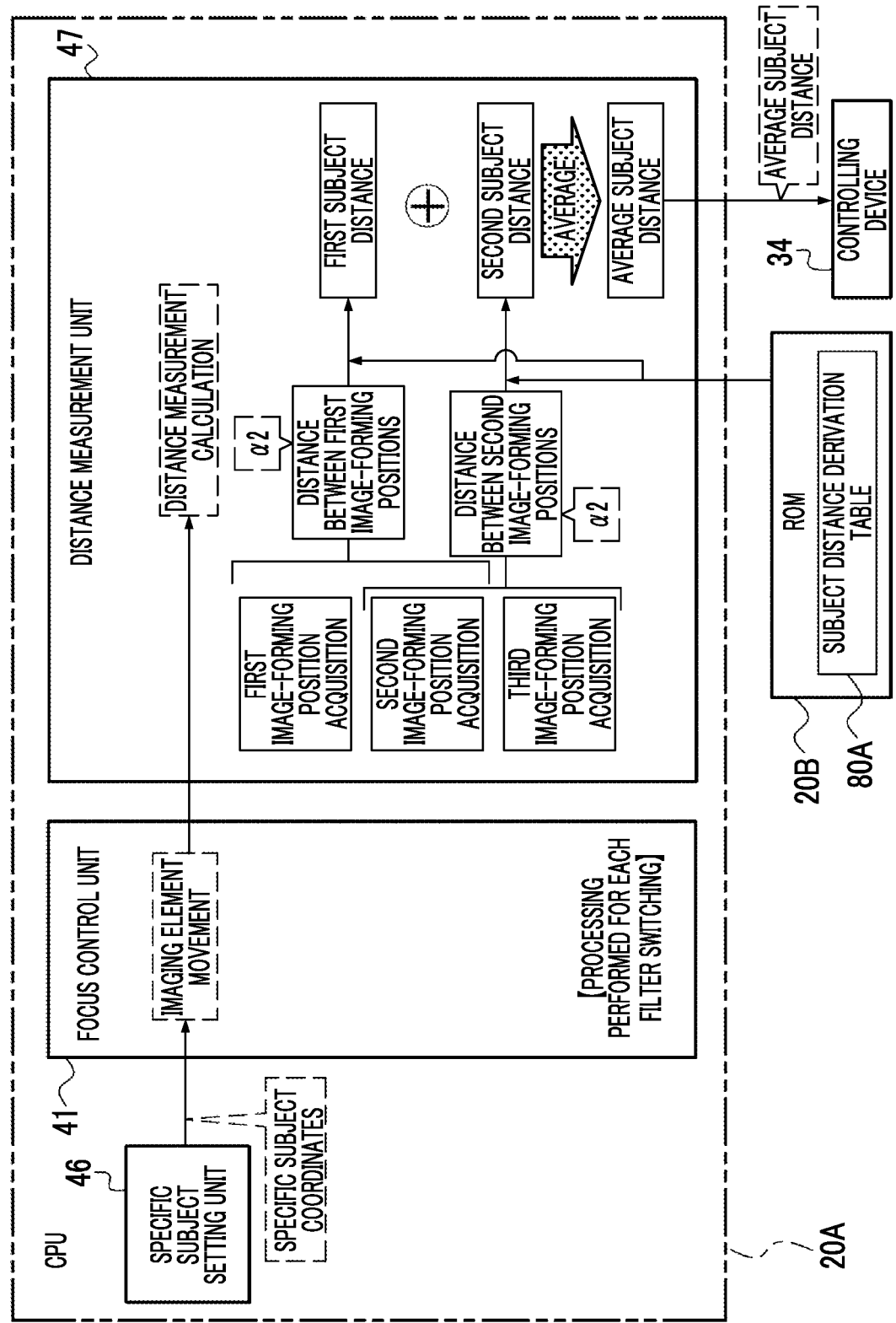
FIG. 20 is a block diagram showing an example of a main part function of a CPU included in an imaging apparatus according to a fifth embodiment.

As shown in FIG. 20 as an example, the distance measurement unit 47 derives the subject distance of the specific subject based on the displacement of the image-forming position. Specifically, in the imaging apparatus 10 according to the present fifth embodiment, a subject distance derivation table 80A showing a relationship between the distance between first image-forming positions $\alpha 1$ and the distance between second image-forming positions $\alpha 2$ and the subject distance is stored in advance in the ROM 20B. The specific subject setting unit 46 outputs the specific subject coordinates to the focus control unit 41. The focus control unit 41 performs the contrast AF to cause the specific subject to be focused each time the optical filter 30B is switched on the optical axis OA, for example.

The distance measurement unit 47 acquires a position of the imaging element 22 (hereinafter referred to as "first image-forming position") in a case where the first optical filter 30B-1 is disposed on the optical axis OA, a position of the imaging element 22 (hereinafter referred to as "second image-forming position") in a case where the second optical filter 30B-2 is disposed on the optical axis OA, and a position of the imaging element 22 (hereinafter referred to as "third image-forming position") in a case where the third optical filter 30B-3 is disposed on the optical axis OA. The distance measurement unit 47 takes a difference between the first image-forming position and the second image-forming position to derive the distance between first image-forming positions $\alpha 1$. Further, the distance measurement unit 47 takes a difference between the second image-forming position and the third image-forming position to derive the distance between second image-forming positions $\alpha 2$.

The distance measurement unit 47 reads out the subject distance derivation table 80A from the ROM 20B. The distance measurement unit 47 derives a subject distance (hereinafter referred to as "first subject distance") corresponding to the distance between first image-forming positions $\alpha 1$ using the subject distance derivation table 80A. Further, the distance measurement unit 47 derives a subject distance (hereinafter referred to as "second subject distance") corresponding to the distance between second image-forming positions $\alpha 2$ using the subject distance derivation table 80A.

The distance measurement unit 47 calculates an average value of the first subject distance and the second subject distance, and outputs the calculated average subject distance as a predicted subject distance of the specific subject to the controlling device 34.

As described above, in the present fifth embodiment, the distance measurement unit 47 predicts the subject distance of the specific subject based on the displacement of the image-forming position. Therefore, with the present configuration, it is possible to contribute to the prediction of the subject distance.

In the fifth embodiment, the first subject distance and the second subject distance are derived based on the distance between first image-forming positions α1 and the distance between second image-forming positions α2, and the average value between the first subject distance and the second subject distance is output to the controlling device 34. However, the technique of the present disclosure is not limited thereto. The distance measurement unit 47 may derive any one of the first subject distance and the second subject distance and output the derived subject distance to the controlling device 34, or may derive three or more subject distances and output an average value of the derived subject distances to the controlling device 34.

Further, in the fifth embodiment, the distance measurement unit 47 derives the subject distance using the subject distance derivation table 80A, but may derive the subject distance using a calculation equation in which the distance between first image-forming positions α1 and the distance between second image-forming positions α2 are set as independent variables and the subject distance is set as a dependent variable, instead of the subject distance derivation table 80A.

Further, in the fifth embodiment, the subject distance of the specific subject is predicted based on the displacement of the image-forming position. However, the technique of the present disclosure is not limited thereto. The distance measurement unit 47 may predict the subject distance of the specific subject based on the contrast of the band image obtained by imaging at least one of the plurality of pieces of band light using the imaging element 22.

Figure 21:
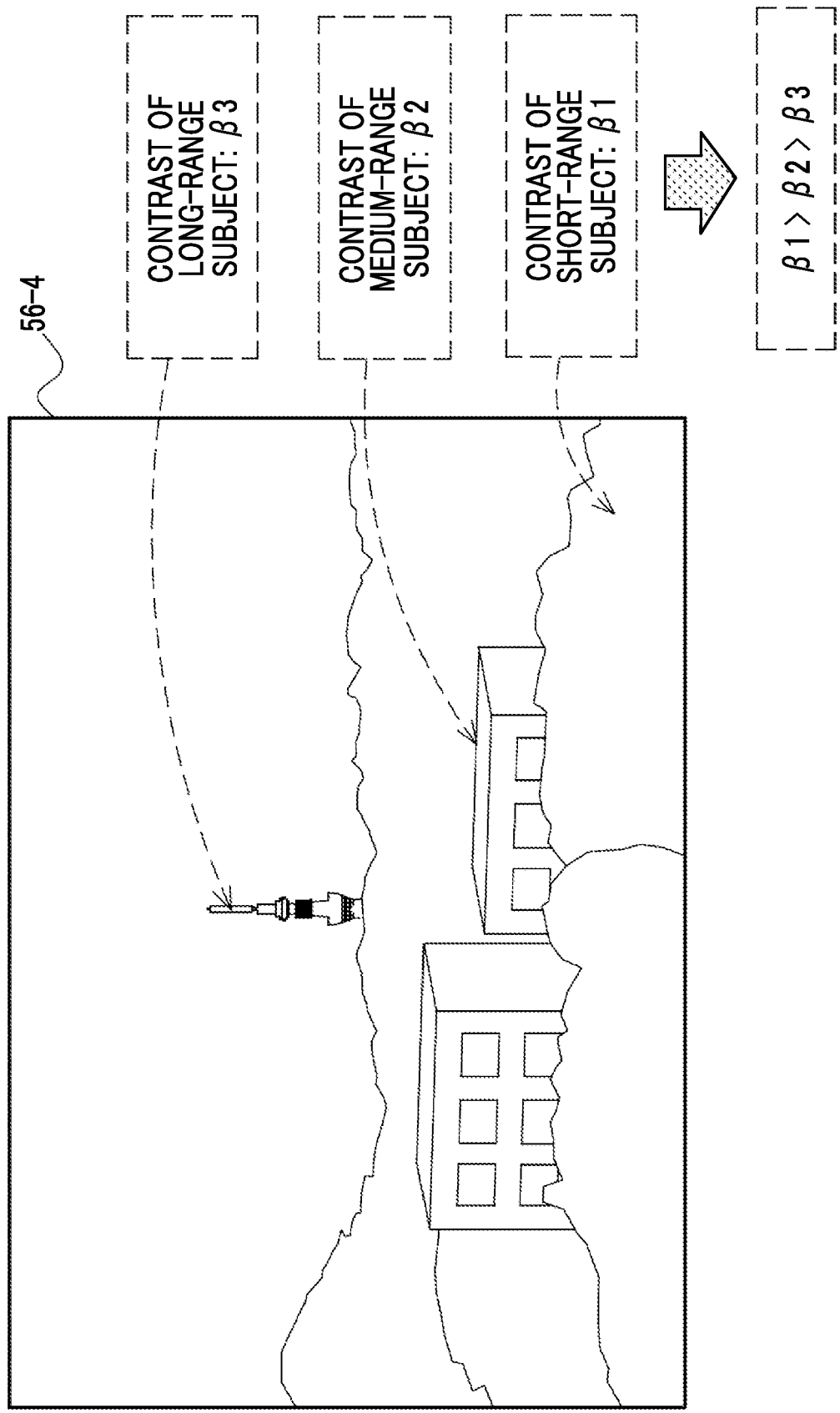
FIG. 21 is an explanatory diagram describing that a contrast varies according to a subject distance in a case where imaging is performed using one type of band light.

As shown in FIG. 21 as an example, in the fourth band image 56-4, a subject having a shorter subject distance is imaged with a higher contrast, for example. That is, in a case where the contrast of the short-range subject S1 is β1, the contrast of the medium-range subject S2 is β2, and the contrast of the long-range subject S3 is β3, a relationship of β1>β2>β3 is established.

Figure 22:
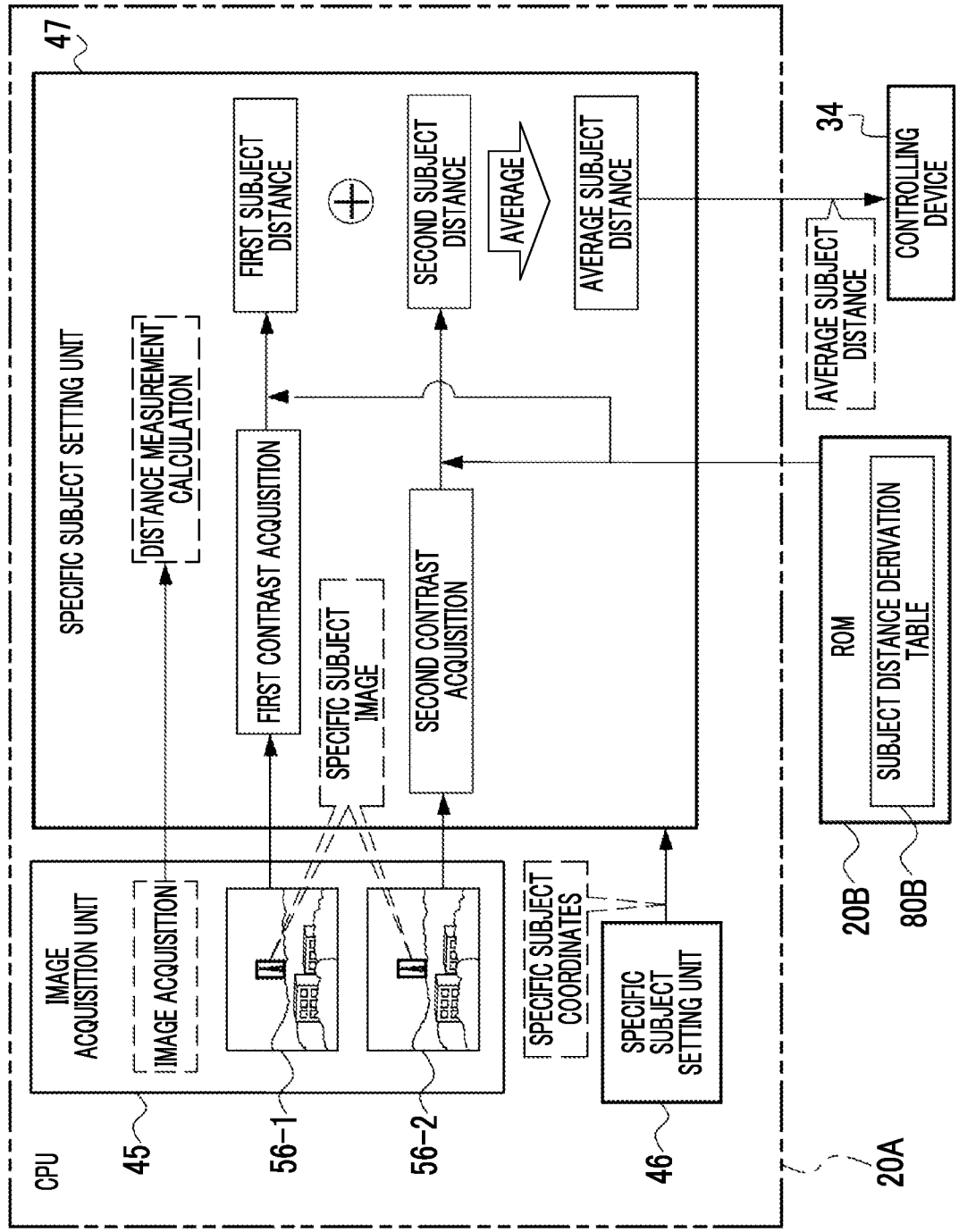
FIG. 22 is a block diagram showing another example of the main part function of the CPU included in the imaging apparatus according to the fifth embodiment.

As shown in FIG. 22 as an example, a subject distance derivation table 80B showing a relationship between the contrast and the subject distance is stored in advance in the ROM 20B for each type of the band light. The image acquisition unit 45 reads out the band image data from the RAM 20C and outputs the readout band image data to the distance measurement unit 47. In the example of FIG. 21, the image acquisition unit 45 outputs the band image data indicating the first band image 56-1 and the second band image 56-2 to the distance measurement unit 47. The specific subject setting unit 46 outputs the specific subject coordinates to the distance measurement unit 47.

The distance measurement unit 47 cuts out the specific subject image 61 from the first band image 56-1 based on the specific subject coordinates input from the specific subject setting unit 46 to acquire a contrast (hereinafter referred to as "first contrast") of the specific subject image 61. Further, the distance measurement unit 47 cuts out the specific subject image 61 from the second band image 56-2 based on the specific subject coordinates input from the specific subject setting unit 46 to acquire a contrast (hereinafter referred to as "second contrast") of the specific subject image 61.

The distance measurement unit 47 reads out the subject distance derivation table 80B from the ROM 20B. The distance measurement unit 47 derives a subject distance (hereinafter referred to as "first subject distance") corresponding to the first contrast using the subject distance derivation table 80B. Further, the distance measurement unit 47 derives a subject distance (hereinafter referred to as "second subject distance") corresponding to the second contrast using the subject distance derivation table 80B. The distance measurement unit 47 may derive the subject distance using a calculation equation in which the contrast is set as an independent variable and the subject distance is set as a dependent variable, instead of the subject distance derivation table 80B.

The distance measurement unit 47 calculates an average value of the first subject distance and the second subject distance, and outputs the calculated average subject distance as a predicted subject distance of the specific subject to the controlling device 34.

Further, in the aspect in which the subject distance of the specific subject is predicted based on the contrast of the band image, in a case where a close subject distance compared to the field of view is predicted, low transmittance band light having lower atmospheric transmittance than other pieces of band light, in the short-wavelength infrared band light, may be used. The reason will be described below.

Figure 23A:
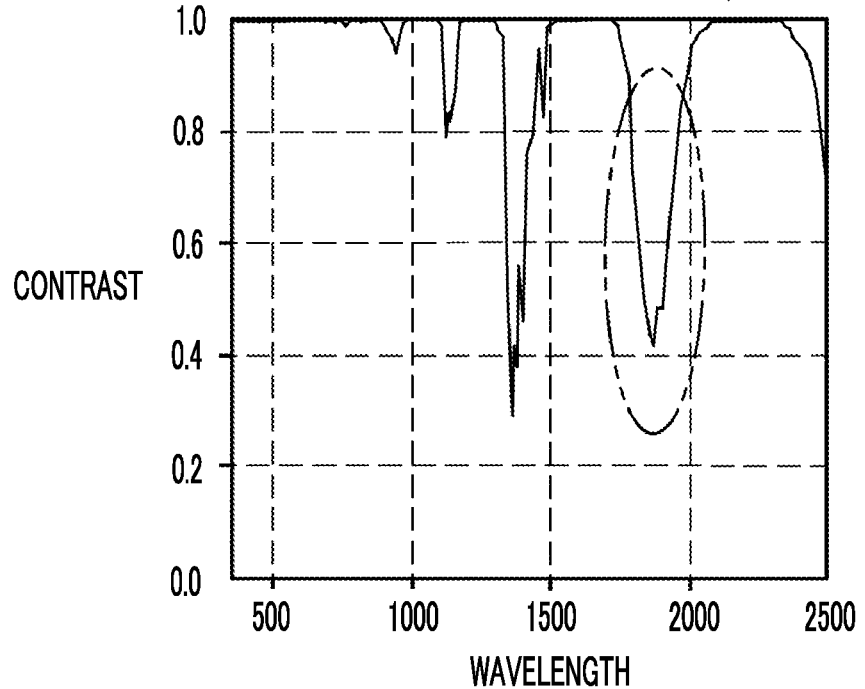
FIG. 23A is a graph showing an example of a contrast of a specific subject image in a case where a field of view is 100 km and a subject distance is 0.1 km.
Figure 23B:
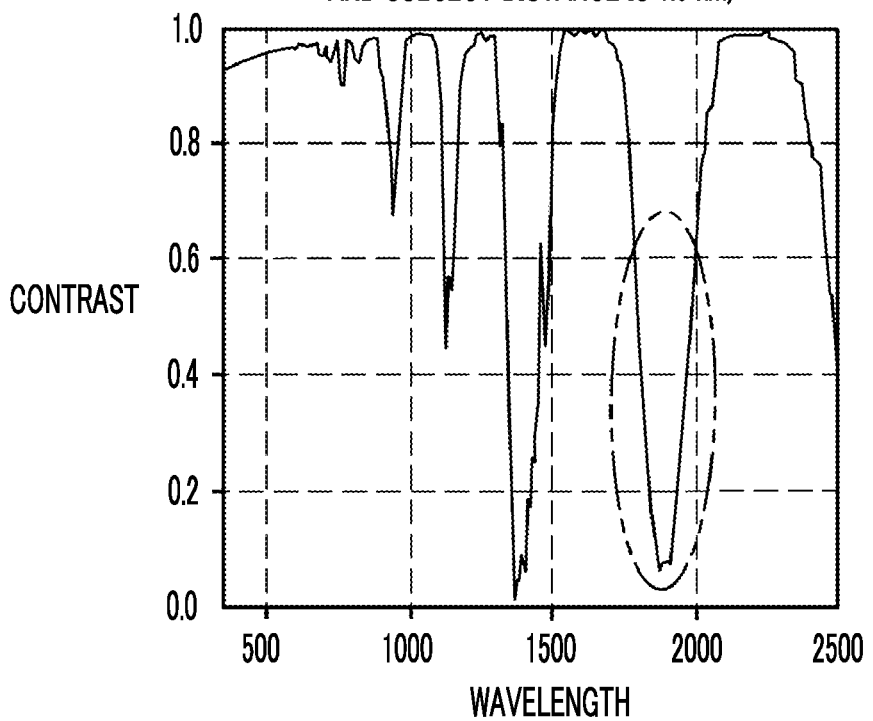
FIG. 23B is a graph showing an example of the contrast of the specific subject image in a case where the field of view is 100 km and the subject distance is 1.0 km.

As an example, FIG. 23A shows the contrast of the specific subject image 61 in a case where the field of view is 100 km and the subject distance is 0.1 km. As an example, FIG. 23B shows the contrast of the specific subject image 61 in a case where the field of view is 100 km and the subject distance is 1.0 km. In the example of FIG. 23A, the subject distance is 1/1000 of the field of view. In the example of FIG. 23B, the subject distance is 1/100 of the field of view. Since the field of view and the subject distance differ by several orders of magnitude, it can be said that the subject distance is close compared to the field of view.

In this case, in a high transmittance band having the atmospheric transmittance higher than other bands, for example, near 1000 nm, near 1250 nm, near 1550 nm, and near 2150 nm, in a short-wavelength infrared band, the contrast of the specific subject image 61 indicating the specific subject at the subject distance of 0.1 km is approximately 1.0, as is apparent from FIG. 23A. Further, the contrast of the specific subject image 61 indicating the specific subject at the subject distance of 1.0 km is slightly lower than 1.0, but still has a value close to 1.0, as is apparent from FIG. 23B.

On the other hand, in a low transmittance band having the atmospheric transmittance lower than other bands, for example, near 1300 nm and near 1900 nm, in the short-wavelength infrared band, the contrast of the specific subject image 61 indicating the specific subject at the subject distance of 0.1 km and the contrast of the specific subject image 61 indicating the specific subject at the subject distance of 1.0 km have significantly different values, as is apparent from FIGS. 23A and 23B.

The distance measurement unit 47 predicts the subject distance using the subject distance derivation table 80B showing the relationship between the contrast and the subject distance. In the subject distance derivation table 80B, the prediction accuracy of the subject distance becomes better as the change in the contrast according to the subject distance is larger. Therefore, in a case where the contrast of the band image obtained by imaging the low transmittance band light is used, it is possible to derive the subject distance with good accuracy as compared with a case where the contrast of the band image obtained by imaging the high transmittance band light is used.

Sixth Embodiment

In the second embodiment, the example of the aspect has been described in which the filter unit control unit 44 selects the band light based on the imaging condition and causes the filter unit 30 to dispose the optical filter 30B causing the selected band light to transmit on the optical axis OA. In the present sixth embodiment, an example of an aspect will be described in which the imaging apparatus 10 comprises an illuminator that irradiates illumination light and the filter unit control unit 44 performs control of causing the filter unit 30 to dispose the optical filter 30B causing band light corresponding to the illumination light to transmit on the optical axis OA. In the present sixth embodiment, components identical to the components described in the first to fifth embodiments are represented by the identical reference numerals as those in the first to fifth embodiments, and the description thereof will be omitted.

Figure 24:
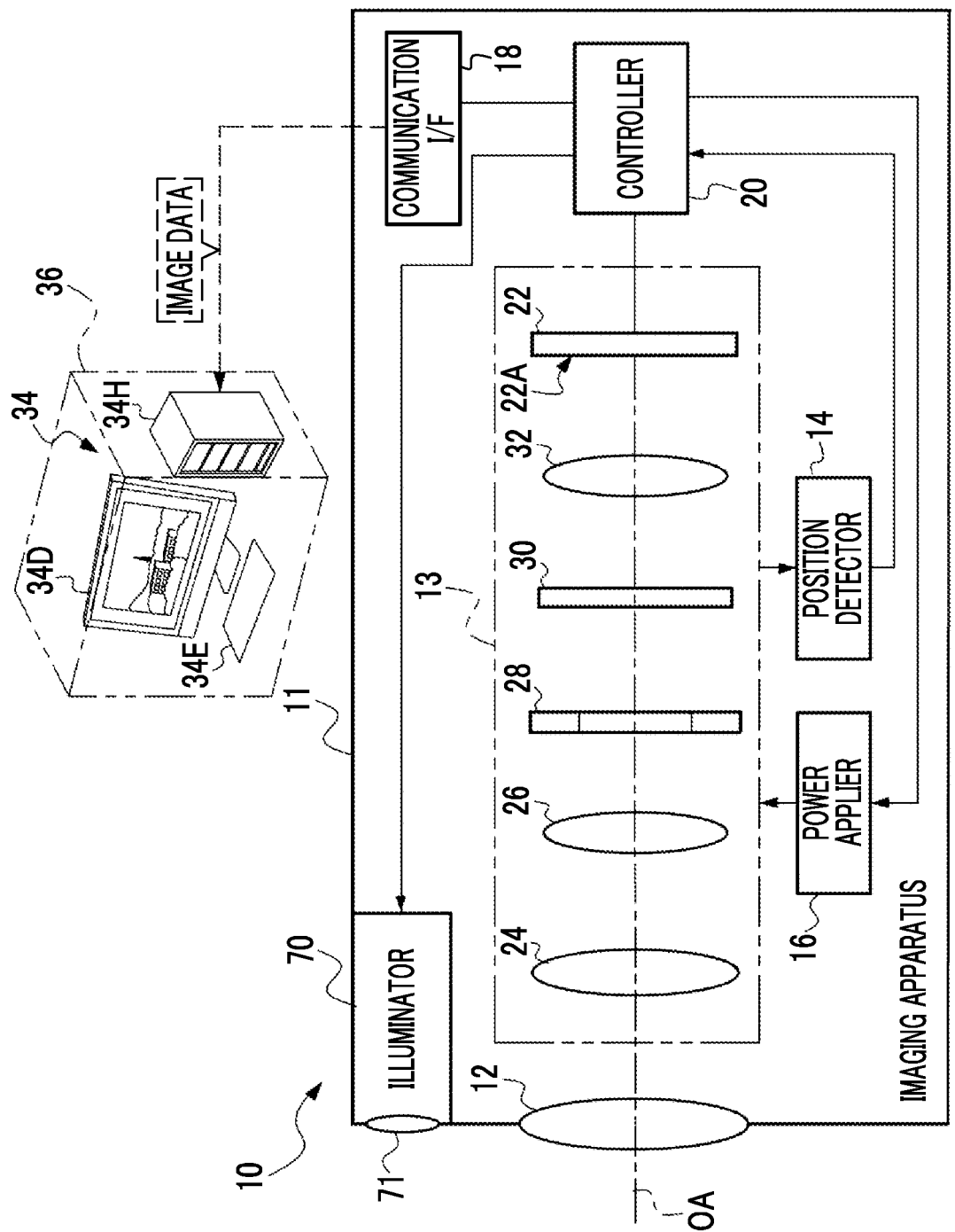
FIG. 24 is a block diagram showing an example of a configuration of an imaging apparatus according to a sixth embodiment.

As shown in FIG. 24 as an example, in the present sixth embodiment, the imaging apparatus 10 comprises an illuminator 70. The illuminator 70 comprises a light source (not shown) and an objective lens 71. As the light source, for example, a semiconductor laser that oscillates laser light of 1550 nm is used. The illuminator 70 is connected to the controller 20. The controller 20 controls turn-on and turn-off of the illuminator 70. The illuminator 70 is an example of an "illuminator" according to the technique of the present disclosure.

In the present sixth embodiment, the CPU 20A reads out an imaging control program 31D (refer to FIG. 5) from the ROM 20B and executes the readout imaging control program 31D to perform the imaging control processing. In the imaging control processing according to the present sixth embodiment, the CPU 20A further operates as an illuminator control unit 49.

Figure 25:
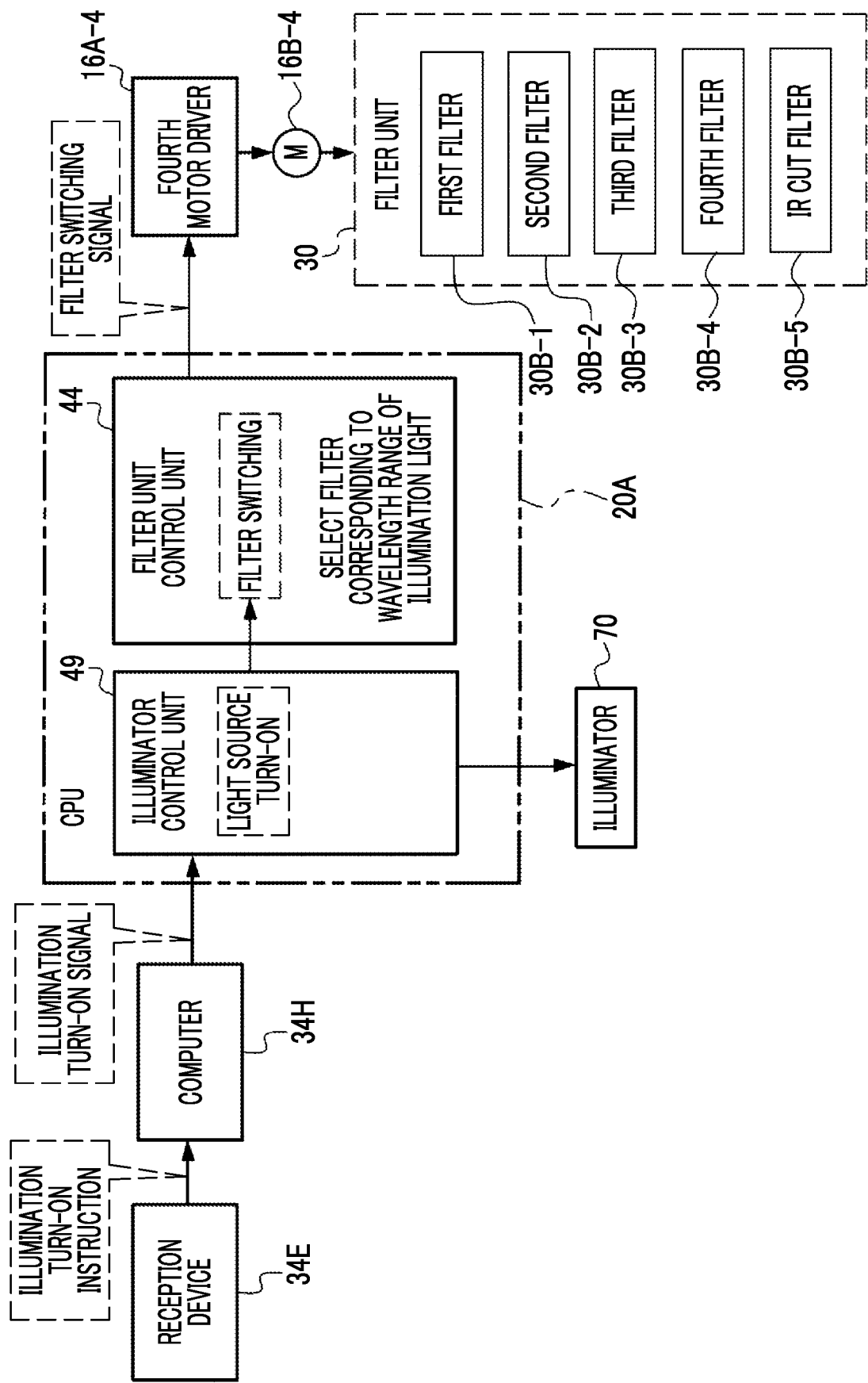
FIG. 25 is a block diagram showing an example of a main part function of a CPU included in the imaging apparatus according to the sixth embodiment.

As shown in FIG. 25 as an example, the reception device 34E outputs an illumination turn-on instruction to the computer 34H in response to the operation by the user. The computer 34H generates an illumination turn-on signal based on the illumination turn-on instruction input from the reception device 34E. The computer 34H outputs the generated illumination turn-on signal to the illuminator control unit 49. The illuminator control unit 49 is connected to the illuminator 70. The illuminator control unit 49 turns on the light source of the illuminator 70 based on the illumination turn-on signal. Accordingly, the illumination light of 1550 nm oscillated from the light source passes through the objective lens 71 and irradiates the subject S.

In a case where the subject S is irradiated with the illumination light by the illuminator 70, the filter unit control unit 44 causes the filter unit 30 to switch the optical filter 30B corresponding to a wavelength range of the illumination light, among the plurality of optical filters 30B, on the optical axis OA. That is, the filter unit control unit 44 generates the filter switching signal for disposing the third optical filter 30B-3 corresponding to the wavelength range of the illumination light of 1550 nm on the optical axis OA, and outputs the generated filter switching signal to the fourth motor driver 16A-4. The fourth motor driver 16A-4 drives the fourth motor 16B-4 according to the filter switching signal input from the filter unit control unit 44. Accordingly, the third optical filter 30B-3 is disposed on the optical axis OA by the power of the fourth motor 16B-4.

As described above, in the present sixth embodiment, in a case where the subject S is irradiated with the illumination light by the illuminator 70, the filter unit control unit 44 causes the filter unit 30 to switch the optical filter 30B corresponding to the wavelength range of the illumination light on the optical axis OA. Therefore, with the present configuration, it is possible to acquire the band image 56 having a large amount of light as compared with a case where the illuminator 70 is not used.

In the sixth embodiment, the wavelength of the illumination light output from the illuminator 70 is 1550 nm. However, the technique of the present disclosure is not limited thereto. The wavelength of the illumination light output from the illuminator 70 may correspond to a wavelength range of designated band light among the first band light to the fifth band light, for example, may be in the wavelength range of near 1000 nm, near 1250 nm, near 2150 nm, or the visible light. Also in this case, with the switching of the optical filter 30B corresponding to the wavelength range of the illumination light on the optical axis OA, it is possible to acquire the band image 56 having a large amount of light as compared with a case where the illuminator 70 is not used.

Further, in the sixth embodiment, the illuminator 70 is built in the imaging apparatus 10, but the technique of the present disclosure is not limited thereto. The illuminator 70 may be a device separate from the imaging apparatus 10.

Seventh Embodiment

In the second embodiment, the example of the aspect has been described in which the filter unit control unit 44 causes the filter unit 30 to perform control of disposing the optical filter 30B that maximizes the contrast of the specific subject image 61, among the plurality of optical filters 30B, on the optical axis OA. In the present seventh embodiment, an example of an aspect will be described in which the imaging apparatus 10 comprises a field-of-view meter 74 that measures the field of view and the filter unit control unit 44 causes the filter unit 30 to perform control of disposing the optical filter 30B causing band light according to the imaging condition to transmit on the optical axis OA, based on the measured field-of-view. In the present seventh embodiment, components identical to the components described in the first to sixth embodiments are represented by the identical reference numerals as those in the first to sixth embodiments, and the description thereof will be omitted.

Figure 26:
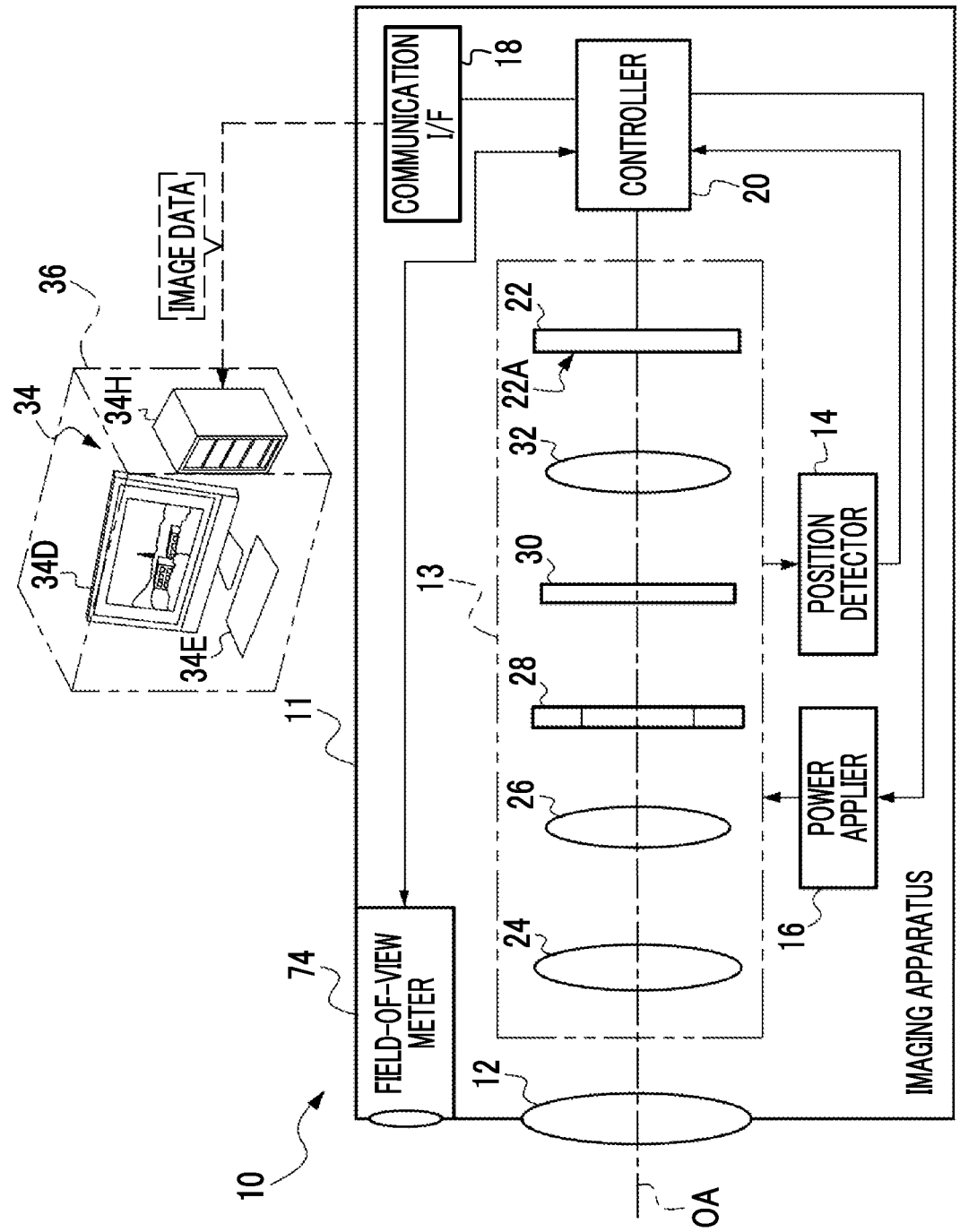
FIG. 26 is a block diagram showing an example of a configuration of an imaging apparatus according to a seventh embodiment.

As shown in FIG. 26 as an example, in the present seventh embodiment, the imaging apparatus 10 comprises the field-of-view meter 74 that measures the field of view of the subject S. The field-of-view meter 74 comprises a projector and a light receiver. In the field-of-view meter 74, the subject S is irradiated with laser light from the projector and the light receiver receives the laser light transmitted through the subject S and attenuated to measure an extinction rate of the subject S. The field-of-view meter 74 outputs a distance to an object having a contrast ratio (for example, about 2%) at which identification by a person is limited, as the field of view, based on the measured extinction rate. The field-of-view meter 74 is connected to the controller 20. The controller 20 controls the filter unit 30 based on the field of view output from the field-of-view meter 74. The field-of-view meter 74 is an example of a "field-of-view meter" according to the technique of the present disclosure.

Figure 27:
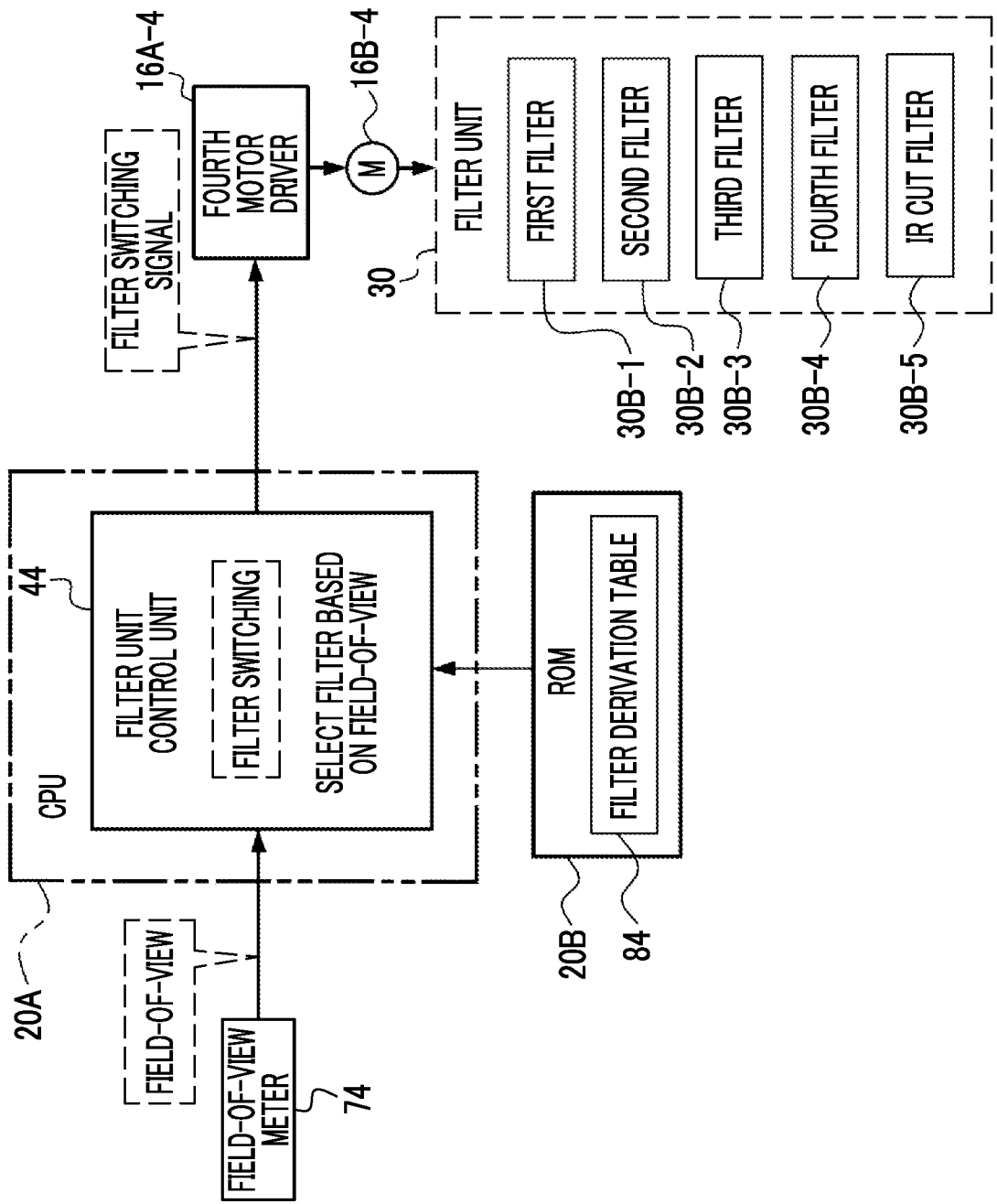
FIG. 27 is a block diagram showing an example of a main part function of a CPU included in the imaging apparatus according to the seventh embodiment.

As shown in FIG. 27 as an example, in the imaging apparatus 10 according to the present seventh embodiment, a filter derivation table 84 is stored in the ROM 20B. The filter derivation table 84 is a list of the transmittance of each piece of band light according to the field of view and the subject distance.

The field-of-view meter 74 outputs the field of view to the filter unit control unit 44. The filter unit control unit 44 reads out the filter derivation table 84 from the ROM 20B and selects the band light having the highest transmittance based on the field of view input from the field-of-view meter 74 and the subject distance. The filter unit control unit 44 generates the filter switching signal for disposing the optical filter 30B corresponding to the selected band light on the optical axis OA, and outputs the generated filter switching signal to the fourth motor driver 16A-4. The fourth motor driver 16A-4 drives the fourth motor 16B-4 according to the filter switching signal input from the filter unit control unit 44. Accordingly, the optical filter 30B corresponding to the selected band light is disposed on the optical axis OA by the power of the fourth motor 16B-4.

For example, the field-of-view meter 74 measures the field of view in a case where the user changes the specific subject, and the filter unit control unit 44 controls the filter unit 30 based on the measured field of view. That is, in a case where the specific subject setting signal (FIG. 9) output from the computer 34H has been received via the communication I/F 18, the controller 20 causes the field-of-view meter 74 to measure the field of view.

As described above, in the present seventh embodiment, the field of view is measured by the field-of-view meter 74 for the subject S. Therefore, with the present configuration, it is possible to image the band light having high transmittance as compared with a case where the field of view measured by the field-of-view meter 74 is not used.

In the seventh embodiment, the field-of-view meter 74 is built in the imaging apparatus 10, but the technique of the present disclosure is not limited thereto. The field-of-view meter 74 may be a device separate from the imaging apparatus 10.

Further, in the seventh embodiment, the field-of-view meter 74 measures the field of view in a case where the user changes the specific subject, but a timing at which the field-of-view meter 74 measures the field of view is not limited thereto. In a case where an angle of view of the imaging apparatus 10 is detected to be changed, the controller 20 may cause the field-of-view meter 74 to measure the field of view. Further, the controller 20 may acquire weather information including the temperature, the humidity, and the like, and may cause the field-of-view meter 74 to measure the field of view in a case where the weather is detected to change exceeding a default value. Further, the controller 20 may cause the field-of-view meter 74 to measure the field of view at every constant time. Further, a brightness sensor may be provided in the imaging apparatus 10, and the controller 20 may cause the field-of-view meter 74 to measure the field of view in a case where ambient brightness of the imaging apparatus 10 is detected to change exceeding a default value. Further, the controller 20 may cause the field-of-view meter 74 to measure the field of view in response to an instruction from the user by operating the reception device 34E.

Further, in the seventh embodiment, the filter unit control unit 44 selects the band light using the filter derivation table 84, but may select the band light using a calculation equation in which the field of view and the subject distance are set as independent variables and the transmittance of each piece of band light is set as a dependent variable, instead of the filter derivation table 84.

Figure 28:
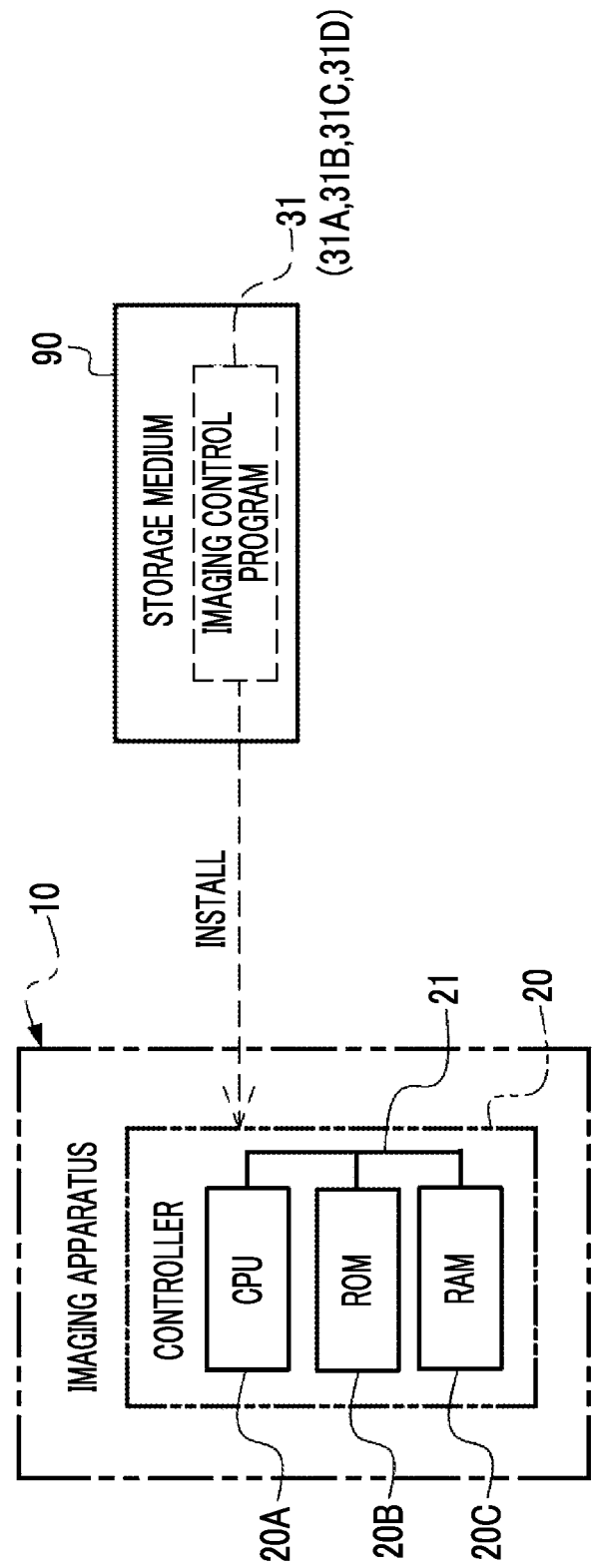
FIG. 28 is a block diagram showing an example of an aspect in which an imaging control program is installed from a storage medium to a computer of the imaging apparatus.

In each of the above embodiments, the example of the aspect has been described in which the ROM 20B stores the imaging control programs 31 and 31A to 31D (hereinafter referred to as "imaging control programs" without reference numerals in a case where it is not necessary to distinguishably describe the programs). However, the technique of the present disclosure is not limited thereto. For example, the imaging control program may be stored in a storage medium 90 as shown in FIG. 28. The storage medium 90 is a non-transitory storage medium. An example of the storage medium 90 includes any portable storage medium such as an SSD or a USB memory.

The imaging control program stored in the storage medium 90 is installed in the imaging apparatus 10. The CPU 20A executes the imaging control processing according to the imaging control program.

Further, the imaging control program may be stored in a storage unit of another computer, a server apparatus, or the like connected to the imaging apparatus 10 via a communication network (not shown), downloaded in response to a request of the imaging apparatus 10 described above, and installed in the imaging apparatus 10.

The entire imaging control program may be not necessary to be stored in a storage unit of another computer, a server apparatus, or the like connected to the imaging apparatus 10 or the ROM 20B, and a part of the imaging control program may be stored therein.

In the example shown in FIG. 28, an example of an aspect has been described in which the controller 20 is built in the imaging apparatus 10, but the technique of the present disclosure is not limited thereto. For example, the controller 20 may be provided outside the imaging apparatus 10.

In the example shown in FIG. 28, the number of CPUs 20A is one, but the controller 20 may comprise a plurality of CPUs. Further, the GPU may be applied instead of the CPU 20A.

In the example shown in FIG. 28, the controller 20 is illustrated, but the technique of the present disclosure is not limited thereto. A device including an ASIC, an FPGA, and/or a PLD may be applied, instead of the controller 20. Further, a combination of a hardware configuration and a software configuration may be used, instead of the controller 20.

As the hardware resource for executing the imaging control processing described in the above embodiment, the following various processors can be used. An example of the processor includes a CPU which is a general-purpose processor executing software, that is, a program to function as the hardware resource for executing the imaging control processing. An example of the processor includes a dedicated electric circuit, such as an FPGA, a PLD, or an ASIC, which is a processor with a circuit configuration specially designed to execute specific processing. A memory is built in or connected to each processor, and each processor uses the memory to execute the imaging control processing.

The hardware resource for executing the imaging control processing may be configured with one of the various processors or may be configured with a combination of two or more processors of the same type or different types (for example, combination of a plurality of FPGAs or combination of CPU and FPGA). The hardware resource for executing the imaging control processing may be one processor.

As a configuring example of one processor, first, there is a form in which one processor is configured of a combination of one or more CPUs and software and the processor functions as the hardware resource for executing the imaging control processing. Secondly, as represented by an SoC, there is a form in which a processor that realizes functions of the entire system including the plurality of hardware resources for executing the imaging control processing with one IC chip is used. As described above, the imaging control processing is realized by using one or more of various processors as the hardware resource.

Further, as a hardware structure of the various processors, more specifically, an electric circuit obtained by combining circuit elements such as semiconductor elements can be used. Further, the above imaging control processing is merely an example. Therefore, it is needless to say that removal of an unnecessary step, addition of a new step, and change of a processing procedure may be employed within a range not departing from the gist.

The contents described and the contents shown hereinabove are specific descriptions regarding the part according to the technique of the present disclosure and are merely an example of the technique of the present disclosure. For example, the descriptions regarding the configurations, the functions, the actions, and the effects are descriptions regarding an example of the configurations, the functions, the actions, and the effects of the part according to the technology of the present disclosure. Accordingly, in the contents described and the contents shown hereinabove, it is needless to say that removal of an unnecessary part, or addition or replacement of a new element may be employed within a range not departing from the gist of the technology of the present disclosure. In order to avoid complication and easily understand the part according to the technology of the disclosure, in the contents described and the contents shown hereinabove, the description regarding common general technical knowledge which is not necessarily particularly described for performing the technology of the present disclosure is omitted.

In the specification, "A and/or B" is identical to "at least one of A or B". That is, "A and/or B" may be only A, only B, or a combination of A and B. In the specification, the same description regarding "A and/or B" is applied also in a case of expressing three or more items with the expression of "and/or".

In a case where all of documents, patent applications, and technical standard described in the specification are incorporated in the specification as references, to the same degree as a case where the incorporation of each of documents, patent applications, and technical standard as references is specifically and individually noted.

What is claimed is:

1. An imaging apparatus comprising:
   an optical element that extracts a plurality of pieces of band light from incident light incident on an optical system;
   a photoelectric conversion device capable of imaging the plurality of pieces of band light extracted from the incident light by the optical element; and
   a processor that is configured to output image data obtained by imaging band light, among the plurality of pieces of band light, selected according to an imaging condition determined based on a field of view by the photoelectric conversion device,
   wherein the plurality of pieces of band light includes at least one of visible light, high transmittance band light among near-infrared light, or high transmittance band light among short-wavelength infrared light,
   at least one of the plurality of pieces of band light is high transmittance band light having higher atmospheric transmittance than other pieces of band light in short-wavelength infrared band light,
   a wavelength of the at least visible light is less than 800 nm,
   a wavelength of the high transmittance band light among near-infrared light is substantially 1000 nm or 1250 nm, and
   a wavelength of the high transmittance band light among short-wavelength infrared light is substantially 1550 nm or 2150 nm.

2. The imaging apparatus according to claim 1,
   wherein the imaging condition is a condition determined based on the field of view and a subject distance and is a condition in which an input light amount to the photoelectric conversion device is maximized.

3. The imaging apparatus according to claim 1,
   wherein the photoelectric conversion device is an image sensor,
   the optical element is a plurality of optical filters that selectively guide the plurality of pieces of band light to the image sensor, and
   the plurality of optical filters are switched on an optical axis of the optical system.

4. The imaging apparatus according to claim 3, further comprising:
   a switching mechanism capable of switching the plurality of optical filters on the optical axis,
   wherein the processor is further configured to
   control the switching mechanism to switch the plurality of optical filters on the optical axis based on the imaging condition.

5. The imaging apparatus according to claim 4,
   wherein in a case where a subject is irradiated, by an illuminator, with irradiation light corresponding to a wavelength range of designated band light, among the plurality of pieces of band light, the processor is configured to causes the switching mechanism to switch an optical filter corresponding to a wavelength range of the irradiation light, among the plurality of optical filters, on the optical axis.

6. The imaging apparatus according to claim 3,
   wherein an optical filter switched on the optical axis among the plurality of optical filters is an optical filter determined according to contrasts of a plurality of specific subject images obtained by imaging, using the image sensor, the plurality of pieces of band light for a specific subject determined in response to an instruction received by a reception device, as a target to be focused.

7. The imaging apparatus according to claim 6,
   wherein the optical filter switched on the optical axis is an optical filter used in a case where the image sensor images the band light corresponding to a specific subject image having a contrast exceeding a default value among the plurality of specific subject images.

8. The imaging apparatus according to claim 3,
   wherein the processor is configured to move at least one of the image sensor or a movable-lens group included in the optical system to correct image-forming deviation due to the switching between the plurality of optical filters.

9. The imaging apparatus according to claim 3,
   wherein the processor is configured to compose a plurality of band images obtained by performing imaging using the image sensor each time the optical filter is switched on the optical axis.

10. The imaging apparatus according to claim 1,
    wherein the optical element is a light separation element having a spectral prism that splits the incident light into the plurality of pieces of band light,
    the photoelectric conversion device includes a plurality of image sensors corresponding to the plurality of pieces of band light, and
    the processor is configured to output image data obtained by performing imaging using an image sensor corresponding to the band light selected according to the imaging condition among the plurality of image sensors.

11. The imaging apparatus according to claim 10, wherein the processor is configured to compose a plurality of images obtained by performing imaging using the plurality of image sensors.

12. The imaging apparatus according to claim 1, wherein the processor is configured to derives a subject distance based on a contrast of a band image obtained by imaging at least one of the plurality of pieces of band light using the photoelectric conversion device or displacement of an image-forming position.

13. The imaging apparatus according to claim 12, wherein the band light is low transmittance band light having lower atmospheric transmittance than other pieces of band light in short-wavelength infrared band light.

14. The imaging apparatus according to claim 1, wherein the field of view is a field of view measured by a field-of-view meter for a subject.

15. An imaging method comprising:
extracting a plurality of pieces of band light from incident light incident on an optical system using an optical element; and
outputting image data obtained by imaging band light, among the plurality of pieces of band light, selected according to an imaging condition determined based on a field of view from a processor, using a photoelectric conversion device capable of imaging the plurality of pieces of band light extracted from the incident light by the optical element,
wherein the plurality of pieces of band light includes at least one of visible light, high transmittance band light among near-infrared light, or high transmittance band light among short-wavelength infrared light,
at least one of the plurality of pieces of band light is high transmittance band light having higher atmospheric transmittance than other pieces of band light in short-wavelength infrared band light,
a wavelength of the at least visible light is less than 800 nm,
a wavelength of the high transmittance band light among near-infrared light is substantially 1000 nm or 1250 nm, and
a wavelength of the high transmittance band light among short-wavelength infrared light is substantially 1550 nm or 2150 nm.

16. A non-transitory storage medium storing a program that causes a computer to execute a process, the computer being applied to an imaging apparatus including an optical element that extracts a plurality of pieces of band light from incident light incident on an optical system and a photoelectric conversion device capable of imaging the plurality of pieces of band light extracted from the incident light by the optical element, and the process comprising:
outputting image data obtained by imaging band light, among the plurality of pieces of band light, selected according to an imaging condition determined based on a field of view using the photoelectric conversion device,
wherein the plurality of pieces of band light includes at least one of visible light, high transmittance band light among near-infrared light, or high transmittance band light among short-wavelength infrared light,
at least one of the plurality of pieces of band light is high transmittance band light having higher atmospheric transmittance than other pieces of band light in short-wavelength infrared band light,
a wavelength of the at least visible light is less than 800 nm,
a wavelength of the high transmittance band light among near-infrared light is substantially 1000 nm or 1250 nm, and
a wavelength of the high transmittance band light among short-wavelength infrared light is substantially 1550 nm or 2150 nm.

* * * * *